United States Patent [19]
Hattori et al.

[11] Patent Number: 6,072,596
[45] Date of Patent: Jun. 6, 2000

[54] IMAGE RECORDING APPARATUS

[75] Inventors: Tuyosi Hattori; Toru Kawabe; Takashi Igarashi; Atsushi Suzuki; Tsuyoshi Haraguchi; Takashi Deguchi; Ken Okauchi, all of Tokyo, Japan

[73] Assignee: Konica Corporation, Tokyo, Japan

[21] Appl. No.: 08/855,233

[22] Filed: May 13, 1997

[30] Foreign Application Priority Data

May 15, 1996 [JP] Japan .................................... 8-120695

[51] Int. Cl.[7] ............................. H04N 1/00; G03G 15/00
[52] U.S. Cl. ............................................. 358/401; 399/385
[58] Field of Search ...................................... 358/401, 298, 358/302, 296, 297, 304; 399/385–387, 389–391; 347/101, 183, 186, 199, 240, 237, 131, 132; 354/354; 346/157; 355/28

[56] References Cited

U.S. PATENT DOCUMENTS

| | | | |
|---|---|---|---|
| 4,066,354 | 1/1978 | Igarashi et al. | 355/28 |
| 5,140,348 | 8/1992 | Jamzadeh et al. | 346/157 |
| 5,307,108 | 4/1994 | Yamanouchi et al. | 354/354 |
| 5,812,176 | 9/1998 | Kawabe et al. | 347/240 |

*Primary Examiner*—Jose L. Couso
*Assistant Examiner*—Duy M. Dang
*Attorney, Agent, or Firm*—Finnegan, Henderson, Farabow, Garrett & Dunner, L.L.P.

[57] ABSTRACT

When a digital image recording means records digital image on an image recording medium based on order information or on digital image data, a computing means calculates digital image layout information, and calculates, based on the digital image layout information, X-cut size information used for cutting the image recording medium in the direction perpendicular to the conveyance direction of the conveyance means and Y-cut size information used for cutting the image recording medium in the direction perpendicular to the cutting direction for the X-cut. A cutting means which cuts the image recording medium into a prescribed size has an X-cut means to cut the image recording medium in the direction perpendicular to the conveyance direction of the conveyance means in accordance with the X-cut size information and a Y-cut means to cut the image recording medium in the direction perpendicular to the cutting direction of the X-cut in accordance with the Y-cut size information.

18 Claims, 42 Drawing Sheets

TO DEVELOPING PROCESS

FIG. 25

| FIRST PRINT HEAD | | SECOND PRINT HEAD | |
|---|---|---|---|
| RECORDING ELEMENT NO. | INCLINATION COEFFICIENT | RECORDING ELEMENT NO. | INCLINATION COEFFICIENT |
| 1008 | 0.0 | 208 | 1.0 |
| 1007 | 0.0 | 207 | 1.0 |
| 1006 | 0.2 | 206 | 0.8 |
| 1005 | 0.4 | 205 | 0.6 |
| 1004 | 0.6 | 204 | 0.4 |
| 1003 | 0.8 | 203 | 0.2 |
| 1002 | 1.0 | 202 | 0.0 |
| 1001 | 1.0 | 201 | 0.0 |

FIG. 26

| FIRST PRINT HEAD | | SECOND PRINT HEAD | |
|---|---|---|---|
| RECORDING ELEMENT NO. | INCLINATION COEFFICIENT | RECORDING ELEMENT NO. | INCLINATION COEFFICIENT |
| 1008 | 0.0 | 208 | 1.0 |
| 1007 | 0.0 | 207 | 1.0 |
| 1006 | 1.0 | 206 | 0.0 |
| 1005 | 0.0 | 205 | 1.0 |
| 1004 | 1.0 | 204 | 0.0 |
| 1003 | 0.0 | 203 | 1.0 |
| 1002 | 1.0 | 202 | 0.0 |
| 1001 | 0.0 | 201 | 0.0 |

FIG. 27

| FIRST PRINT HEAD | | SECOND PRINT HEAD | |
|---|---|---|---|
| RECORDING ELEMENT NO. | INCLINATION COEFFICIENT | RECORDING ELEMENT NO. | INCLINATION COEFFICIENT |
| 1008 | 0.0 | 208 | 1.0 |
| 1007 | 0.0 | 207 | 1.0 |
| 1006 | 0.0 | 206 | 1.0 |
| 1005 | 0.0 | 205 | 1.0 |
| 1004 | 1.0 | 204 | 0.0 |
| 1003 | 1.0 | 203 | 0.0 |
| 1002 | 1.0 | 202 | 0.0 |
| 1001 | 1.0 | 201 | 0.0 |

FIG. 32 ( a )
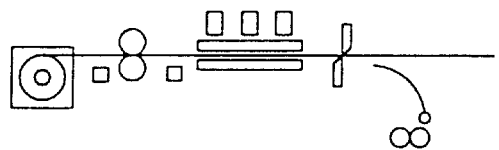
FIG. 32 ( e )
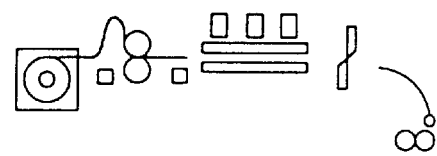
FIG. 32 ( b )
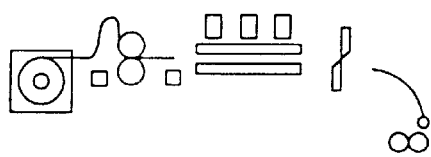
FIG. 32 ( f )
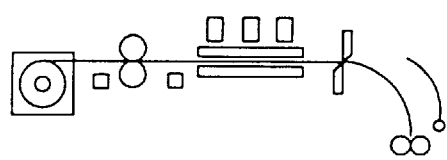
FIG. 32 ( c )
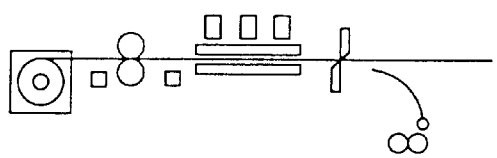
FIG. 32 ( g )
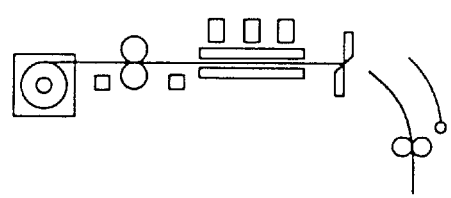
FIG. 32 ( d )
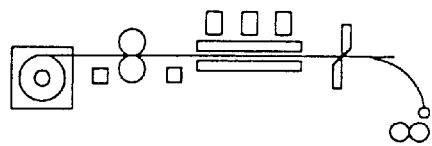
FIG. 32 ( h )
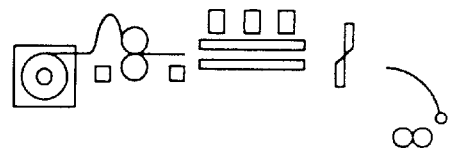

ARRAY UNIT

↓

LIGHT-SENSITIVE MATERIAL
CONVEYANCE DIRECTION

INTEGRAL B/G/R THREE-COLOR
FLUORESCENT TUBE ARRAY

IMAGE RECORDING APPARATUS

BACKGROUND OF THE INVENTION

The present invention relates to an image recording apparatus wherein digital images are recorded on an image recording medium represented by an silver halide light-sensitive material, and the image recording medium is cut to a prescribed finished print size.

In the conventional photo-finishing service, especially the print service from negative films, prints requested by a customer have been made from the negative films brought by the customer, in accordance with requests of the customer in terms of a print size and a quantity of prints.

Recently, in particular, a panoramic size and a hivision size which are different from the conventional sizes have made their appearance, and in addition to that, there still is a demand for a larger size of a customer's favorite image, resulting in increasing variation of print sizes. For coping with the above-mentioned print sizes, several kinds of papers (photographic papers) which differ from each other in terms of width have been prepared in photo-finishing laboratories, and they have been switched depending on an order of a customer.

However, due to the increasing variation of print sizes mentioned above, an amount of jobs to switch to the desired width of paper is increased, which therefore worsens an efficiency of the work of an operator for prints, and requires more space for many cartridges each containing paper of different width, and further, paper rolls with a special width that is rarely requested need to be stored, which has been a problem because it is not preferable from the viewpoint of paper storage space and paper storage stability.

Now, there is considered a method to output prints with various sizes from a large size to a normal size from a paper roll with a single width. However, when a conventional exposure method (an analog exposure method) is employed, it has required a complicated exposure method to repeat exposure while shielding a part of the paper against light. Therefore, the method mentioned above was not used when a large amount of prints are requested.

Incidentally, it has become possible to simply record plural images on a sheet of paper, by conducting image processing such as image composition before imagewise exposure, through a system for recording images on a pixel unit based on a digital signal. Therefore, by recording one image on a sheet of paper when a large size print is requested, and by recording plural images on a sheet of paper when small-sized prints are requested, stock of papers with a single width or a few kinds of width makes it possible to prepare prints having no waste on the paper.

However, even in the system mentioned above, it is still difficult to obtain conventional and common print sizes which are desired by a customer. Namely, there has been no way but to return to a customer a print wherein plural images which are not of a common print size are mixed, or to return to a customer after cutting a finished sheet of paper having thereon plural recorded images by a separate device or manually, for making the print size to be a common print size.

On the other hand, with regard to an image apparatus wherein a light-sensitive material, especially a silver halide light-sensitive material is subjected to imagewise exposure based on certain image information, there has been known a method employing a print head (an array head) having thereon a plurality of recording elements (light sources), as a method having various merits such as those that the apparatus is inexpensive and compact and a large size print can be generated easily.

As the print head mentioned above, there has been proposed an apparatus employing a vacuum fluorescent tube light source called a VFPH (Vacuum Fluorescent Print Head). The vacuum fluorescent tube light source has characteristics that high brightness can be obtained easily, the light source can responds at high speed, and the apparatus can be made thin, and zinc oxide phosphor is used for the fluorescent tube mainly from the viewpoint of durability.

On the other hand, there are some cases where an LED array light source is used as the above-mentioned print head, and for a red color, in particular, it is possible to manufacture, in a photomask method, a high density array that is as high as 300 dpi or 400 dpi. For example, it is possible to employ an arrangement wherein an LED array is used as a red light source and the above-mentioned VFPH is used as a green light source and a blue light source.

However, print making by means of aforesaid array exposure method has the following problems.

Namely, in a conventional analog printer, the exposure time per a printing area is almost constant, and it is possible to make, without having any serious disadvantages in terms of time, prints of normal sizes which are current main products (127 mm×89 mm, 152 mm×102 mm etc.) and large-sized prints (for example, the exposure time for a print whose area is one fourth that of a large-sized print is also one fourth the exposure time for the large-sized print). In the array exposure method, however, when a narrow-width paper roll is used for making normal-sized prints, more disadvantages in terms of time are caused for making normal-sized prints than in making large-sized prints, because exposure is performed without using a part of recording elements.

For example, when making a print having one fourth area of a large print on a paper having one half width, an analog exposure system can make the print with about one fourth exposure time as stated above. In the case of an array exposure system, however, the exposure time is only about one half, and the time which is twice that in the analog exposure system is required, which means that the exposure efficiency obtained is only one half in the analog exposure system.

For the reasons mentioned above, it is necessary to solve the problem of disadvantages in terms of time, and it has been considered therefore that plural images are laid out and composed on a sheet of paper to be outputted so that plural images may be recorded simultaneously in the direction of arrangement of array elements.

As stated above, however, a print wherein plural images are laid out and composed on a sheet of paper makes it difficult to obtain a print in a common size which is requested by a customer. Namely, there still remains the problem that there has been no way but to return to a customer a print wherein plural images which are not of a common print size are mixed, or to return to a customer after cutting, by a separate device or manually, a sheet of paper having thereon plural recorded images in a common print size for making the print size to be a common print size.

The problem to be solved in the invention is that an advantage specific to a digital exposure system that plural images can be recorded in a short period of time in a given layout is canceled out by the complicated work required to obtain common print sizes requested.

SUMMARY OF THE INVENTION

In view of the problems stated above, an object of the invention is to provide an image forming apparatus which makes it possible to return the requested print size correctly and quickly to a customer, without reducing facility of a digital exposure system to record plural images in a short period of time in a given layout.

The object mentioned above can be attained by the following structures.

Structure (1)

A digital image forming apparatus capable of recording a digital image on an image recording medium and of making aforesaid image recording medium to be in a prescribed finished print size, comprising:

a digital image recording means that records aforesaid digital image on aforesaid image recording medium;

a cutting means that cuts aforesaid image recording medium into a prescribed size;

a conveyance means that conveys aforesaid image recording medium to aforesaid cutting means;

a first input means for inputting order information including size information for aforesaid finished print, quantity information and/or print sequence information;

a second input means that inputs digital image data of aforesaid digital image;

a computing means which computes, based on aforesaid order information or aforesaid digital image data, the layout required for aforesaid digital image recording means to record aforesaid digital image on the image recording medium, calculates digital image layout information, and calculates, based on the digital image layout information, the X-cut size information for cutting the image recording medium in the direction perpendicular to the conveyance direction of the conveyance means and the Y-cut size information for cutting the image recording medium in the direction perpendicular to the cutting direction of the X-cut; and a signal processing means that calculates the recording data with which the digital image recording means records on the image recording medium from the digital image layout information and the digital image data;

the cutting means having an X-cut means for cutting the image recording medium in the direction perpendicular to the conveyance direction of the conveyance means, a Y-cut means for cutting the image recording medium in the direction perpendicular to the cutting direction of the X-cut, an X-cut control means that controls the X-cut means in accordance with the X-cut size information, and a Y-cut control means that controls the Y-cut means in accordance with the Y-cut size information.

Structure (2)

In Structure (1), the conveyance means conveys the image recording medium to the cutting means from the image recording means.

Structure (3)

In Structure (2), the image recording medium is a silver halide light-sensitive material, the recording data represent exposure data with which the silver halide light-sensitive material is exposed to light by the digital image recording means, and the digital image recording means has therein an exposure means for exposing the silver halide light-sensitive material to light based on the exposure data and a processing means for processing the exposed silver halide light-sensitive material.

Structure (4)

In Structure (3), the conveyance means conveys the silver halide light-sensitive material to the cutting means from the processing means.

Structure (5)

In Structure (4), the digital image recording means has an array print head on which a plurality of recording elements are arranged.

Structure (6)

In Structure (5), the layout information represents information for arranging plural images on the silver halide light-sensitive material in the direction of arrangement of the recording elements.

Structure (7)

In Structure (1), the computing means computes, based on the order information, the layout wherein the digital image recording means records the digital image on the image recording medium.

Structure (8)

In Structure (1), both the X-cut control means and the Y-cut control means serve also as the computing means.

Structure (9)

In Structure (1), there is provided a conveyance direction changing means which changes the direction of the image recording medium to the direction perpendicular to the conveyance direction during the period from the completion of either X-cut by means of the X-cut means or Y-cut by means of the Y-cut means to the start of remaining cutting.

Structure (10)

In Structure (1), the X-cut means and the Y-cut means represent a die cut blade with which a size of the finished print obtained through cutting is fixed.

Structure (11)

In Structure (1), the Y-cut means has at least one slit blade which is capable of cutting at the requested Y-cut position by moving in the direction perpendicular to the conveyance direction based on the Y-cut size information.

Structure (12)

In Structure (1), the X-cut means serves also as the Y-cut means.

In Structure (1), it is not necessary to prepare recording media with various widths, a print of an image laid out freely through digital image recording can be obtained, whereby multi-sized prints can be made easily, image recording is conducted by layout information based on order information or on digital image data, and the X-cut means and the Y-cut means are controlled based on the layout information. Therefore, it is possible to obtain an image forming apparatus wherein an occurrence of misprint caused by the difference of image size and position between those in cutting and those in recording including erroneous cutting at the center of an image can be prevented, unnecessary margin is less caused, and an accurate print can be formed.

Owing to Structure (2), the image recording means does not need to be provided with a complicated conveyance mechanism needed for conveying multi-sized recording media ranging from a small size to a large size, and it is therefore possible to obtain an image forming apparatus which is inexpensive and is simple in terms of structure.

Owing to Structure (3), it is possible to obtain an image forming apparatus wherein multi-sized prints complying with customers' request can be offered in a common form of a print without preparing silver halide light-sensitive materials with various widths and without necessity of manual cutting.

Owing to Structure (4), the processing means does not need to be provided with a complicated conveyance mechanism needed for conveying multi-sized recording media ranging from a small size to a large size, and it is therefore possible to obtain an image forming apparatus which is inexpensive and is simple in terms of structure.

Owing to Structure (5), it is possible to provide an image forming apparatus wherein high speed exposure capacity of an array print head is not lowered and multi-sized prints can be made, by laying out exposure data so that the maximum width of the array print head may be utilized in an exposure system by means of the array print head.

Owing to Structure (6), it is possible to provide a high speed image forming apparatus wherein one image or one scene can be obtained as a sheet of print at the speed which is several times higher than that in the case where one image or one scene is obtained as a sheet of print by cutting a narrow width paper only in one direction.

Owing to Structure (7), it is possible to obtain an image forming apparatus wherein the number of computing means can be made small and accurate prints can be formed in the simple structure.

Owing to Structure (8), it is possible to obtain an image forming apparatus wherein an X-cut section and a Y-cut section can be arranged freely to an image recording section, and accurate prints can be formed in the simplified mechanical structure.

Owing to Structure (9), it is possible to obtain an image forming apparatus wherein the cutting mechanism does not need to be changed greatly between X-cut and Y-cut, and controls are simplified.

Owing to Structure (10), it is possible to obtain an image forming apparatus wherein a complicated conveyance mechanism does not need to be provided and mechanical structure is simplified.

Owing to Structure (11), it is possible to obtain an image forming apparatus wherein a complicated conveyance mechanism does not need to be provided and mechanical structure is simplified.

Owing to Structure (12), it is possible to obtain an image forming apparatus wherein the number of cutting mechanisms can be made small, and mechanical structure is simplified.

BRIEF DESCRIPTION OF THE DRAWINGS

FIG. 25 is a diagram showing an example of the inclination coefficient.

FIG. 26 is a diagram showing an example of the inclination coefficient.

FIG. 27 is a diagram showing an example of the inclination coefficient.

FIGS. 32 (a)–32 (h) represent a diagram showing procedures of conveyance and exposure for a photographic paper.

DETAILED DESCRIPTION OF THE PREFERRED EMBODIMENT

Examples of the invention will be explained as follows, referring to the diagrams.

Figure 1:
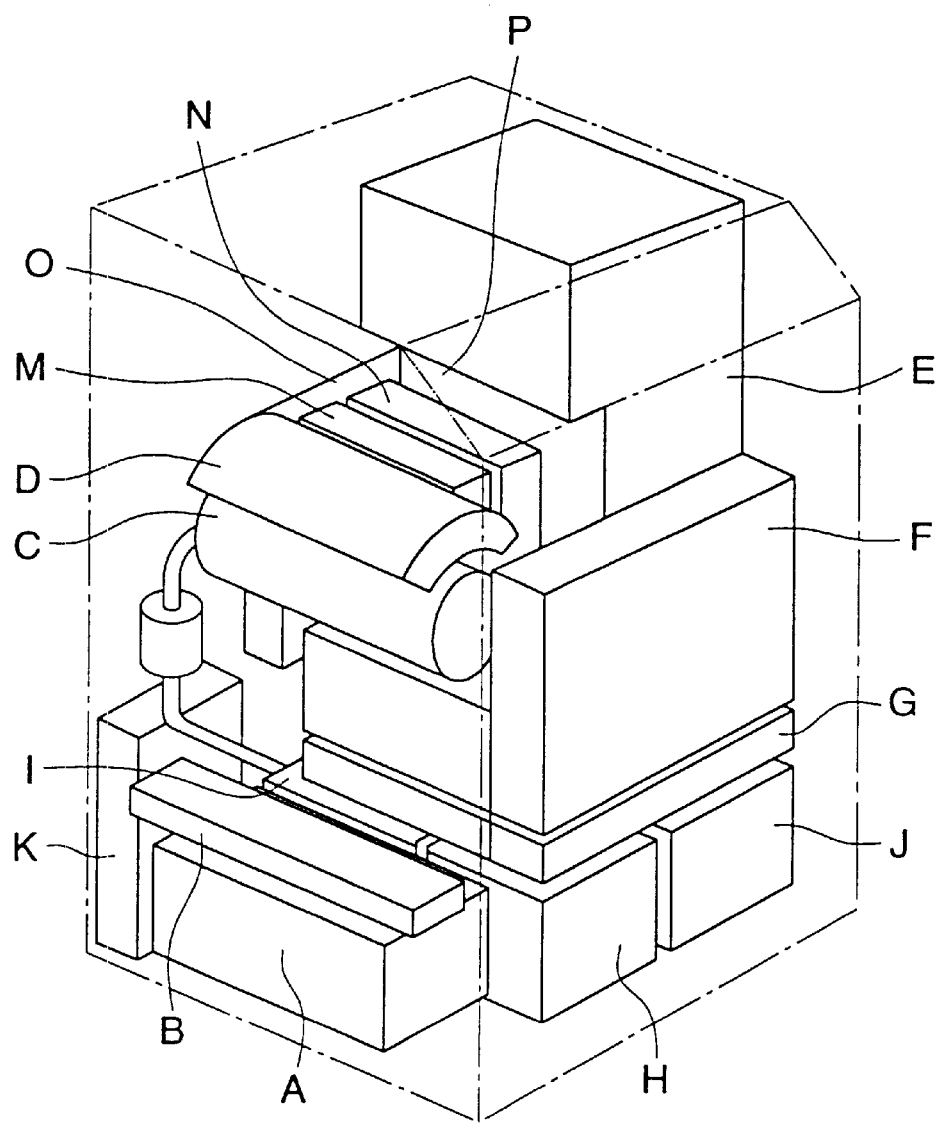
FIG. 1 is a perspective view showing the total structure of an image forming apparatus in the example.

FIG. 1 is a total perspective view of a processing apparatus for silver halide photographic light-sensitive materials (printer processor) wherein an exposure apparatus including a sheet feeding device (photographic printing apparatus) and an automatic developing apparatus including a drying device are arranged integrally.

In FIG. 1, paper cartridge A containing therein a roll-shaped color photographic paper (color paper) representing unexposed silver halide photographic light-sensitive material is set under the exposure apparatus which is composed of suction drum C, print head D (hereinafter referred to also as array head) and others. A photographic paper in the paper cartridge A is drawn out of the cartridge by a prescribed length, and then is cut (X-cut) to a prescribed size by paper cutter B which cuts in the direction perpendicular to the conveyance direction for the photographic paper, to be a sheet-shaped color paper. This photographic paper is conveyed to the exposure apparatus. There is further provided the mechanism which conveys a sheet-shaped photographic paper to the exposure apparatus by means of an unillustrated sheet feeding section.

An embodiment of the invention will be explained as follows, referring to FIG. 2.

Figure 2:
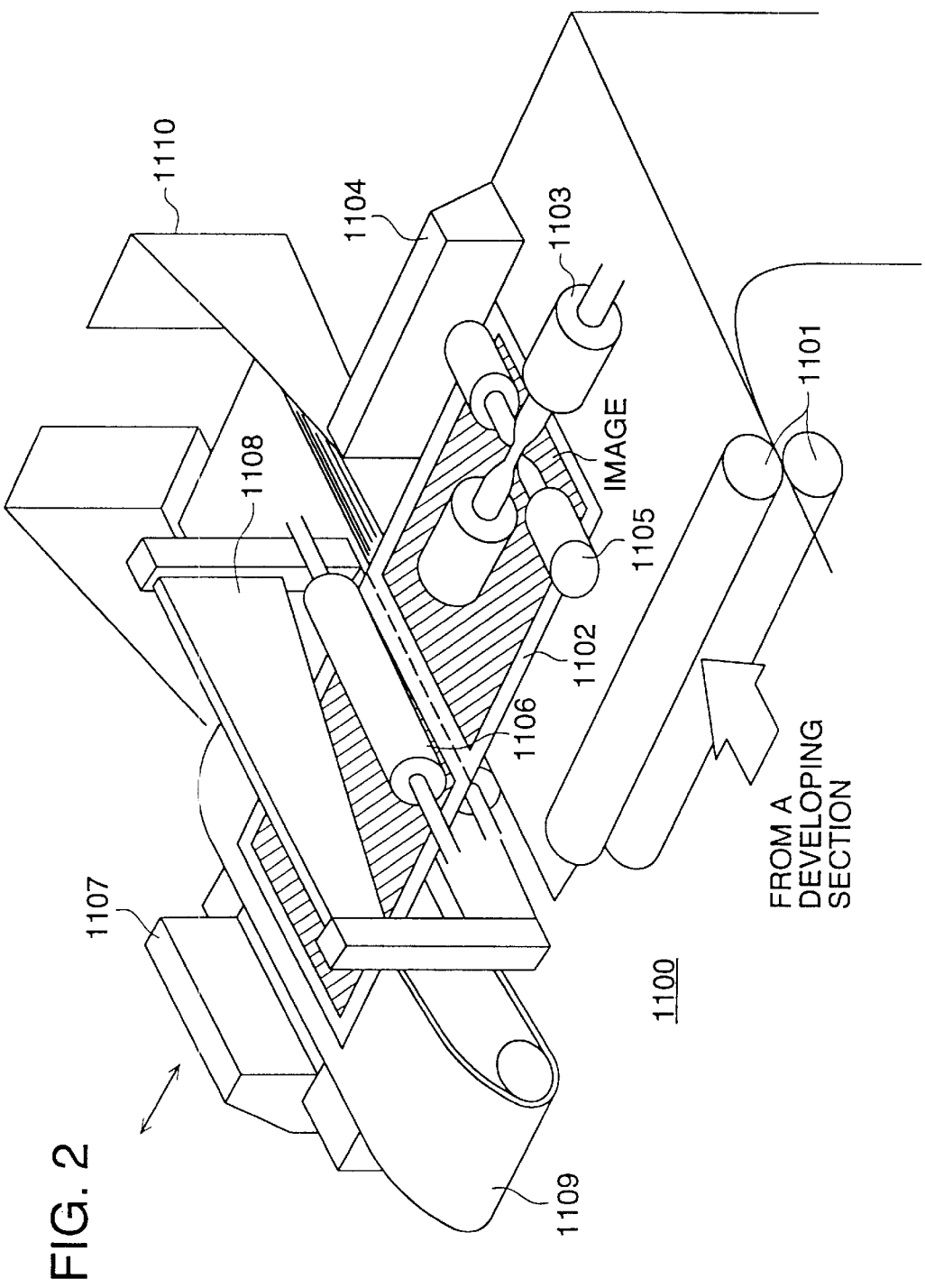
FIG. 2 is a perspective view showing the method for cutting by changing the conveyance direction of a photographic paper.

FIG. 2 shows a method to cut a color paper after changing the conveyance direction for the color paper.

The numeral 1101 represents a conveyance roller which conveys processed sheet-shaped color paper 1102 to Y-cut section 1100 to cut (Y-cut) in the direction perpendicular to the arrangement direction for recording elements of print head D in FIG. 1, namely in the direction that is in parallel with the conveyance direction.

The sheet-shaped color paper 1102 conveyed to the Y-cut section 1100 by the conveyance roller 1101 is further conveyed while being pinched by conveyance roller 1103 until it hits paper positioning plate 1104. Incidentally, in this case, roller 1105 is in its slightly lifted position so that conveyance of the sheet-shaped color paper 1102 may not be disturbed.

The paper positioning plate 1104 is provided with an unillustrated sensor member which senses that the sheet-shaped color paper 1102 hits the paper positioning plate 1104. Based on detection signals of the sensor, the roller 1105 is lowered to pinch the sheet-shaped color paper 1102, and then the roller 1105 conveys the sheet-shaped color paper 1102 in the direction perpendicular to the conveyance direction of the roller 1103. Incidentally, in this case, roller 1103 is in its slightly lifted position so that conveyance of the sheet-shaped color paper 1102 may not be disturbed.

The sheet-shaped color paper 1102 conveyed by the conveyance roller 1105 and roller 1106 hits paper positioning plate 1107 which is provided with an unillustrated sensor member that detects that the sheet-shaped color paper 1102 hits the paper positioning plate 1107. When Y-cutter 1108 is operated based on detection signals of the sensor mentioned above, the sheet-shaped color paper 1102 is cut. After the Y-cutter 1108 is operated, the cut sheet-shaped color paper 1102 is conveyed to container box 1110 through rotation of belt conveyor 1109.

In this case, the paper positioning plate 1107 can move based on Y-cut information described later so that the distance between it to the Y-cutter may be varied. In the present example, a cutting size is controlled by the paper positioning plate 1107. However, it is also possible to control an amount of conveyance for the sheet-shaped color paper 1102 based on Y-cut information, and thereby to conduct Y-cut to the desired size accurately. Incidentally, when there is set a print which does not need Y-cut (large size print or the like), it is also possible not to conduct Y-cut by using a conveyance path which is different from the above-mentioned Y-cut section.

Incidentally, though the present example is of the structure wherein an X-cutter and a Y-cutter are provided separately, it is also possible to employ another structure wherein a print is rotated by 90 degrees after being subjected to X-cut to be subjected again to Y-cut conducted by the same cutter. In this structure, the number of cutters may be reduced.

Next, referring to FIGS. 3 and 4, there will be explained the control for changing the distance from a paper positioning plate to a Y-cutter to obtain the desired cutting size based on print size information.

Figure 3:
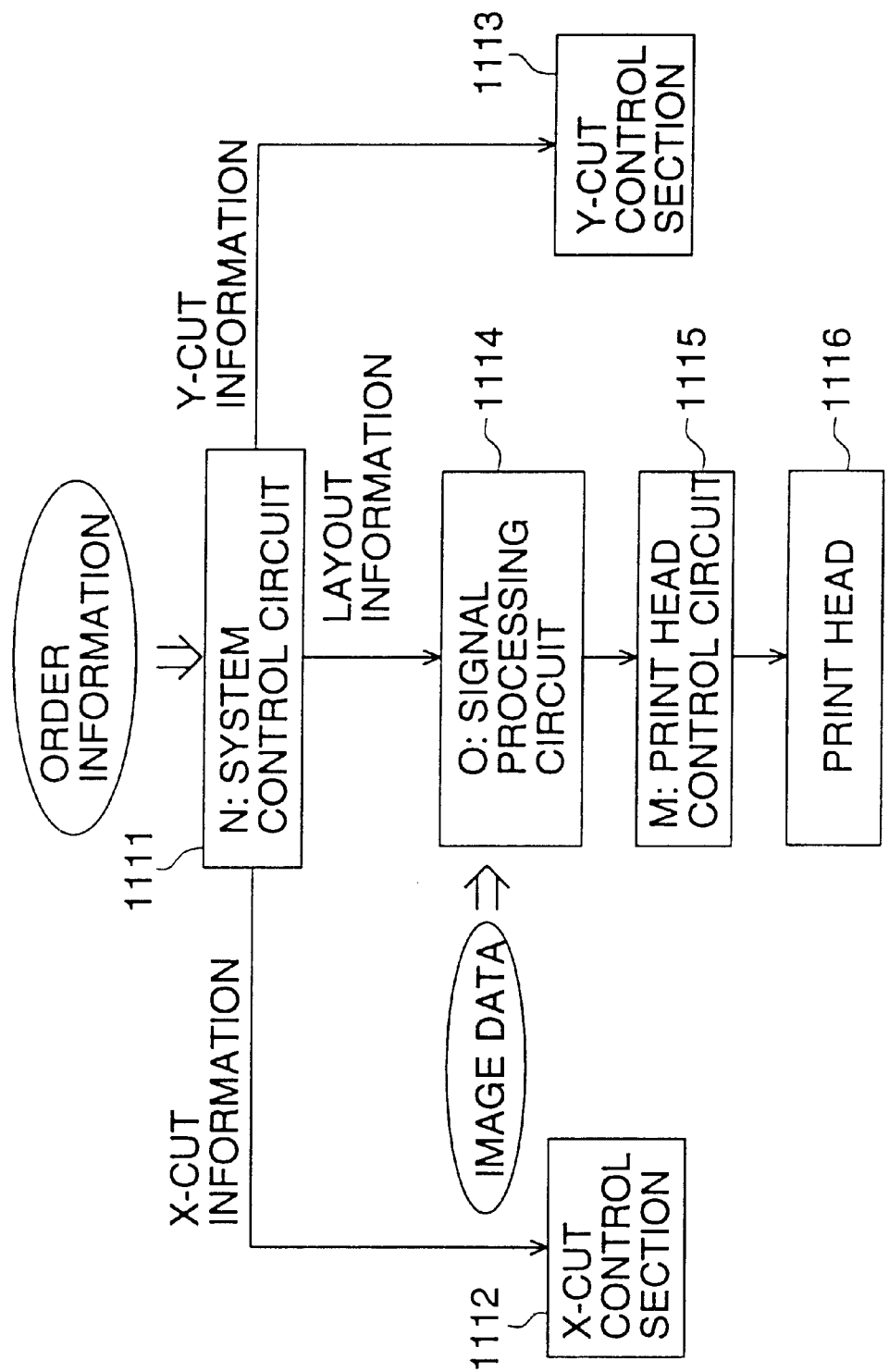
FIG. 3 is a block diagram for controlling the cutting size.

FIG. 3 is a block diagram to conduct the control for cutting the sheet-shaped color paper 1102 to the desired size, by means of the constituting Y-cutter 1108 and paper positioning plate 1107.

A system control circuit represented by the numeral 1111 receives, from each input means which is not illustrated, order information such as finished print size information (for example, information of 254×305 mm size, 89×127 mm size and panoramic size), information of quantity of finished prints and information of the sequence of finished prints, and computes layout of images which are subjected to digital exposure on the sheet-shaped color paper 1102, and further calculates, based on the layout information, the information for cutting in the X and Y directions which makes it possible to obtain the desired print.

Incidentally, in this case, plural images may be subjected to composition to be one layout, and such plural images may be either the same images from the same scene or different images from different scenes, and they can be determined by the print quantity information.

Information of cutting in the X-direction calculated by the system control circuit 1111 is sent to X-cut control section 1112 that drives paper cutter B in FIG. 1. The X-cut control section drives the paper cutter B based on the information of cutting in the X-direction mentioned above.

Information of cutting in the Y-direction calculated, in the same way, by the system control circuit 1111 is sent to Y-cut control section 1113 that conducts control for changing the distance between a paper positioning plate and a Y-cutter. The Y-cut control section 1113 changes the distance between the paper positioning plate and the Y-cutter based on the information of cutting in the Y-direction.

The layout information mentioned above is sent to signal processing circuit 1114 where there is calculated digital exposure data to be sent to print head control circuit 1115 together with image data obtained by a separate inputting means. The digital exposure data are sent to the print head control circuit 1115 to control print head 1116 so that the sheet-shaped color paper is subjected to exposure to light.

Though the system control circuit 1111 calculates X-cut information and Y-cut information after receiving order information in the present example, it is also possible for the X-cut control section and/or Y-cut control section to receive directly aforesaid order information or aforesaid image data, and thereby to calculate X-cut information and Y-cut information.

Though the X-cut information and the Y-cut information are determined in advance based on order information in the present example, it is preferable, from the viewpoint of a change with time of an apparatus, that corresponding relation between the order information and the X-cut information and that between the order information and the Y-cut information are changeable.

As the aforesaid changing method, X-cut information and Y-cut information can be changed directly, or the position for recording digital exposure data on a light-sensitive material can be shifted.

Though the X-cut information and the Y-cut information are exchanged directly as data in the present example, it is also possible to send aforesaid cut information indirectly to a cut control means in a manner that a cutting position mark is exposed on the print, for example.

Though the X-cut information and the Y-cut information are determined by the system control circuit 1111 based on the order information in FIG. 3, the X-cut information and the Y-cut information can also be determined by image data without requiring order information.

In the system control circuit 1111 in this case, there are established a plurality of appropriate magnification changing expressions, for conducting layout of images to be subjected to digital exposure on the sheet-shaped color paper 1102 from image data including information of the number of pixels in the lateral and longitudinal directions. The system control circuit 1111 converts image data to an appropriate magnification, and determines the information of the number of pixels of digital exposure data. Then, it determines the finished print size based on the determined information of the number of pixels and output resolution of the print head, to determine the X-cut information and the Y-cut information.

Figure 4:
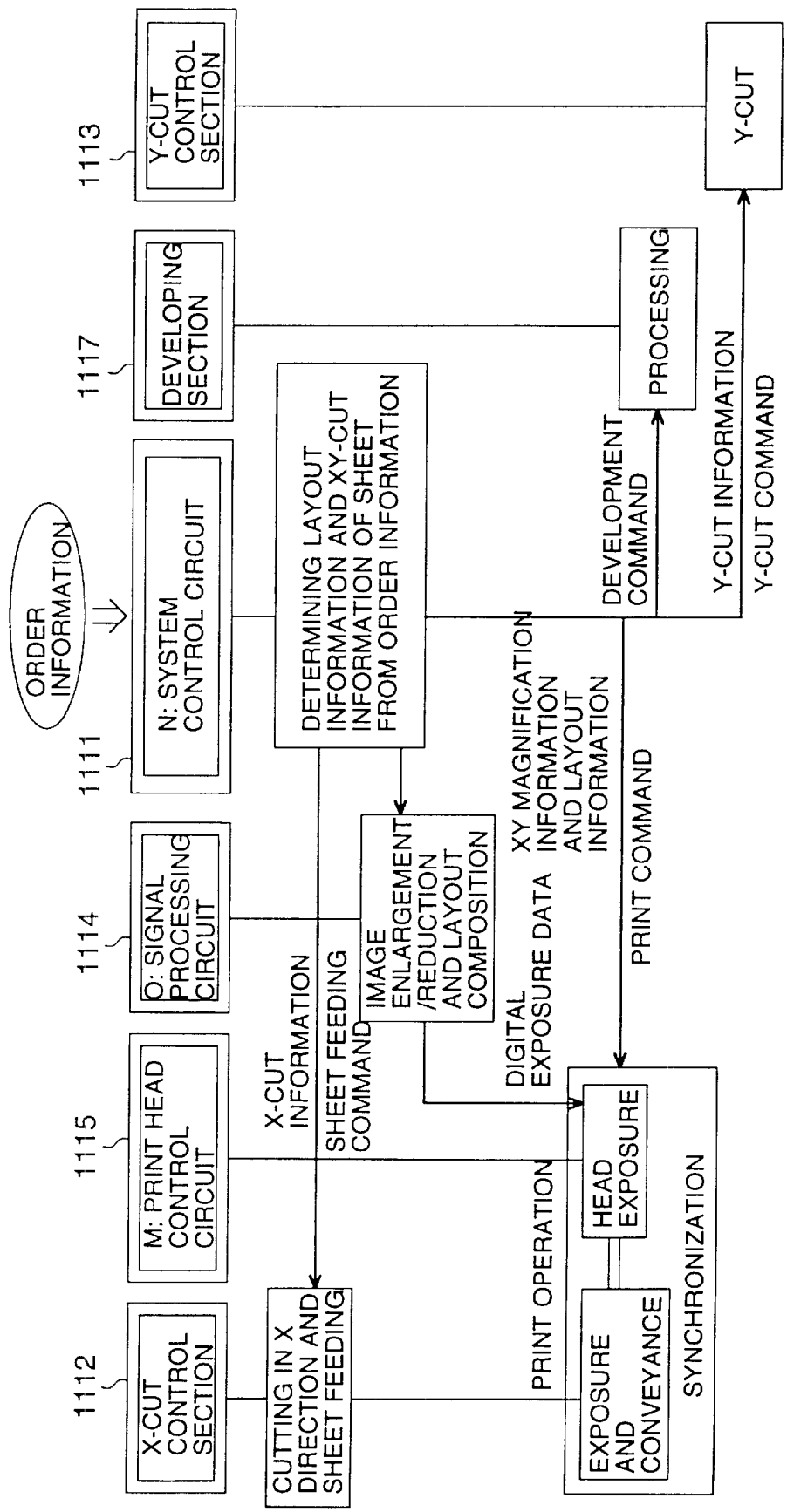
FIG. 4 is a conceptional diagram for operations showing the flow of aforesaid control in actual print making.

FIG. 4 is a conceptional diagram of operations showing the flow of aforesaid control in the actual print making.

The system control circuit 1111 which has received order information first sends X-cut information to X-cut control section 1112 to conduct X-cut as stated above.

Then it sends layout information to signal processing circuit 1114 which, then, receives the layout information and prepares digital exposure data together with image data.

Next, the system control circuit 1111 sends print command to print head control circuit 1115, and the print head control circuit 1115 which has received the print command conducts printing operations based on the digital exposure data.

Then, the system control circuit 1111 sends development command to developing section 1117, and the developing section 1117 which has received the development command develops the sheet-shaped color paper exposed in advance.

Then, the system control circuit 1111 sends Y-cut information to a Y-cut control section and the Y-cut control section conducts Y-cut as stated above based on the Y-cut information.

Due to the operations mentioned above, there is obtained a print wherein plural images are laid out on the sheet-shaped color paper subjected to X-cut, and when this print is subjected to Y-cut, a print in a desired size wherein each image is on one sheet can be obtained surely.

Another embodiment will be explained, referring to FIGS. 5 and 6.

Figure 5:
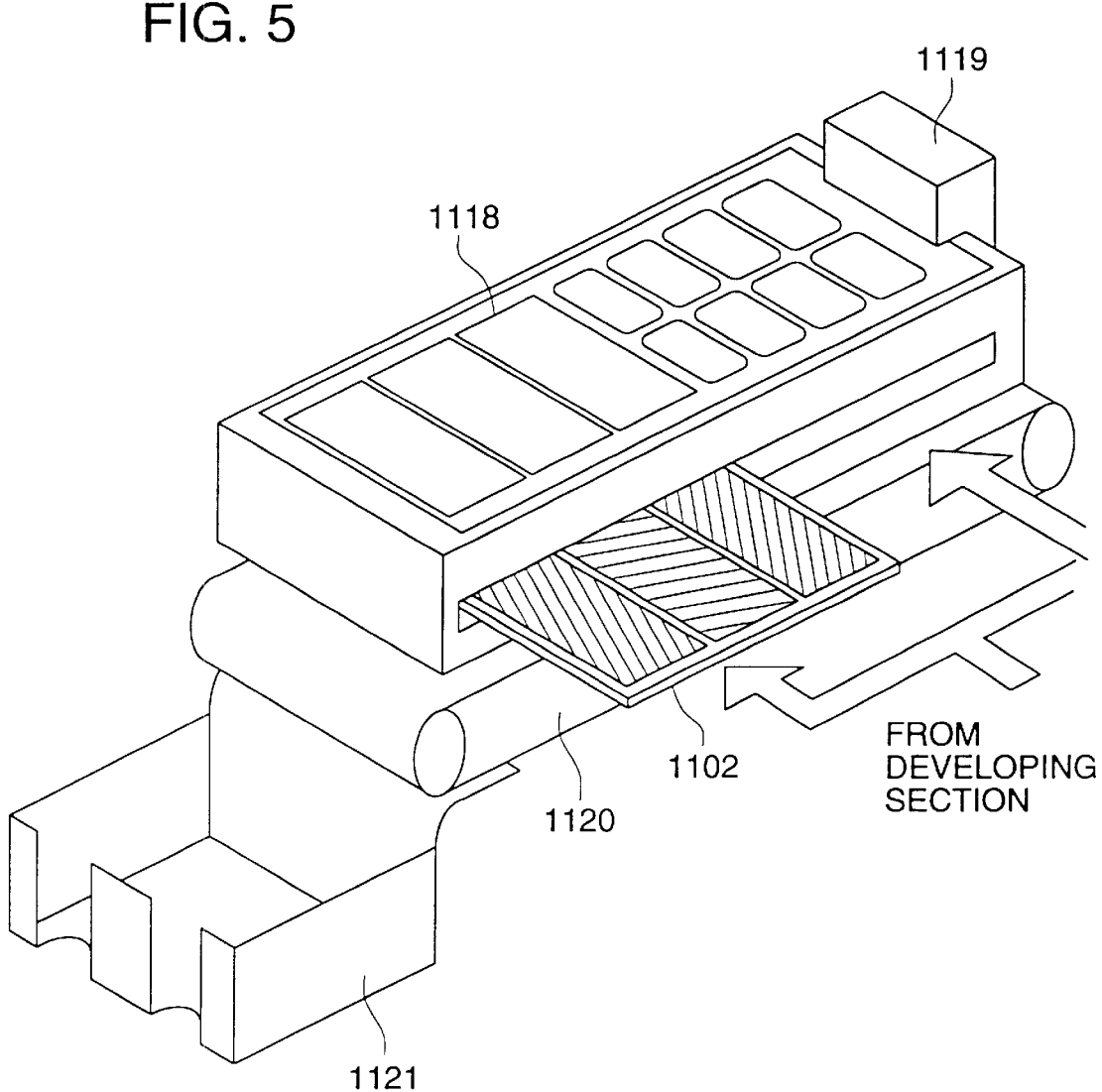
FIG. 5 is a perspective view showing the method of cutting by means of a punching die including Y-cut.

FIG. 5 shows a cutting method by means of a punching blade including Y-cut, which is different from the cutting method wherein the conveyance direction for the sheet-shaped color paper is changed as shown in FIG. 2.

The sheet-shaped color light-sensitive material 1102 which has been developed is distributed, by an unillustrated distributing device, to punching blade 1118 whose cutting size has been established in advance. When an unillustrated sensor detects that the sheet-shaped color paper 1102 is conveyed to the prescribed position, the conveyance therefor is stopped in synchronization with that detection.

After the conveyance has been stopped, the established punching blade 1118 is driven by driving motor 1119, and the sheet-shaped color light-sensitive material 1102 is cut to the desired print size.

After the punching blade is driven, the sheet-shaped color paper 1102 which has been cut is conveyed to container box 1121 by the rotation of belt conveyor 1120.

In the case of the present embodiment, there are two types for the illustrated punching blade 1118, and it is possible to obtain any print size by changing the variation of the punching blade 1118 while adjusting to the desired print size. For example, the punching blade 1118 in FIG. 5 has two types of cutting size, and this can be changed to another embodiment wherein plural sizes are included. With regard to the print obtained after the cutting in this case, it is also possible to cut simultaneously to print sizes of two or more kinds by punching while crossing the point where cutting size is changed, in addition to the same print size for all prints.

Incidentally, when there is set a print which needs no Y-cut (large size print), it is possible to conduct the control for making the print to pass through, without driving the punching blade.

Figure 6:
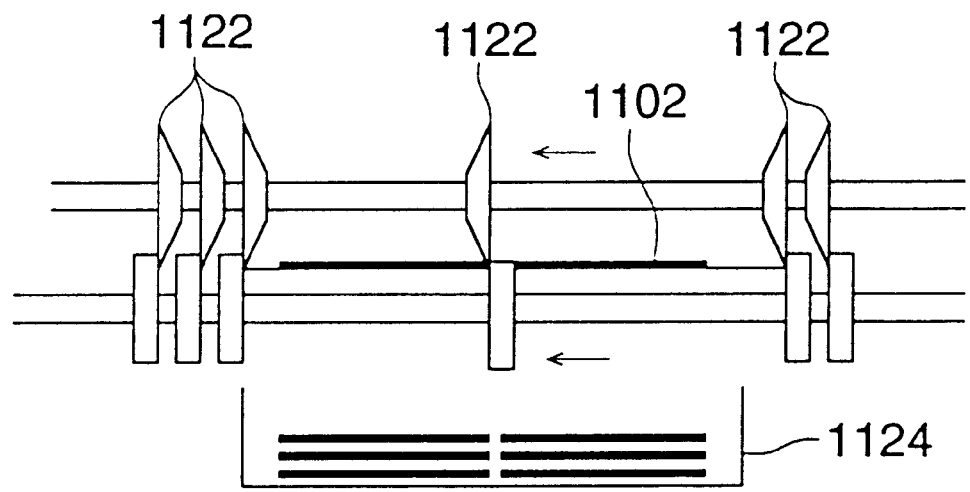
FIGS. 6 (a) and 6 (b) represent a diagram showing the method for conducting Y-cut by providing a slitter blade on the conveyance path for photographic papers.
Figure 6:
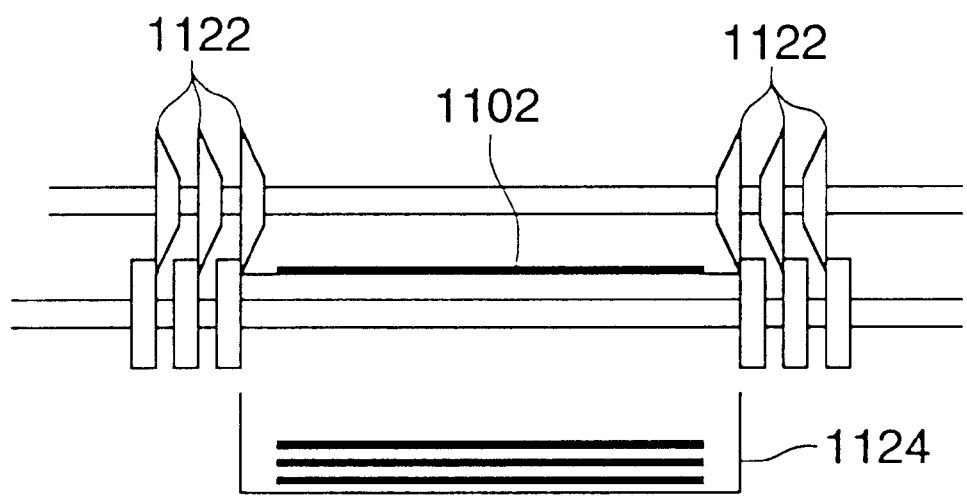

FIGS. 6 (*a*) and 6 (*b*) show the system to conduct Y-cut by providing a slitting blade on the conveyance path for color papers, which replaces the cutting method in FIG. 2 and FIG. 5.

As is shown in FIG. 6 (*a*), before the sheet-shaped color light-sensitive material 1102 which has been developed is conveyed to the Y-cut section of this type, slitting blade 1122 and slitting blade receiver 1123 both movable in the direction perpendicular to the conveyance direction are moved to the desired Y-cut position based on Y-cut information established in advance.

In this case, when the sheet-shaped color light-sensitive material 1102 passes through the Y-cut section, it is cut by slitting blade 1122 simultaneously.

The sheet-shaped color light-sensitive material 1102 which has been cut by the slitting blade 1122 falls in container box 1124 to be contained therein.

Incidentally, as is shown in FIG. 6 (*b*), when there is established a print requiring no Y-cut (large size print), it is possible to conduct control so that the slitting blade 1122 is retracted to the position where it does not come in contact with the sheet-shaped color light-sensitive material 1102.

Though the Y-cut is conducted after the X-cut in aforesaid example, the opposite order is also acceptable. The X-cut and Y-cut may be conducted at any timing such as the timing before development, the timing before exposure or the timing after exposure, without being limited to the timing after development.

Though a print is obtained by applying X-cut and Y-cut to a roll-shaped photographic paper in aforesaid example, it is also possible to obtain a print by laying out and recording plural images on a sheet-shaped photographic paper and by cutting them to a unit of one image by applying thereto only X-cut or only Y-cut.

Next, exposure control mechanism for an array head which can be used for the digital exposure method of the invention will be explained as follows.

In aforesaid exposure apparatus, a photographic paper is supported and conveyed by suction drum C, then, array head D composed of a red light source print head having therein an LED array, a green light source print head having therein a vacuum fluorescent tube array, and a blue light source print head is controlled in terms of exposure in accordance with image data, thus, exposure for each color is conducted on the prescribed position of the photographic paper conveyed at the constant speed of 30 mm/sec during the exposure.

Due to this, there is achieved a mechanism wherein conveyance of a photographic paper is not stopped when the photographic paper is in the position where exposure is possible, even in the case of non-radiation state of the print head. Thus, it is possible to prevent occurrence of "photographic fog" caused by the factors other than visible light, which is a problem specific to light-sensitive materials. Incidentally, the "photographic fog" is remarkable when the print head is a vacuum fluorescent tube.

Incidentally, in FIG. 1, K represents a power supply section, I represents a suction pump, M is a print head control circuit, O is a signal processing circuit, and N is a system control circuit.

A photographic paper which has been exposed to light is conveyed and conducted into developing section E where a color photographic paper is conveyed by a roller conveyance means successively through processing tanks including a color developing tank, a bleach-fixing tank and a stabilizing tank so that color developing processing, bleach-fixing processing and stabilizing processing may be conducted respectively. The photographic paper which has been subjected to each processing mentioned above is dried in an unillustrated drying apparatus, and is ejected to the outside of the apparatus.

In this case, the direction and speed for image recording during exposure and those for entering into the color developing tank are mostly the same, whereby a period of time for each pixel from exposure to entrance into the color developing tank is made identical, so that occurrence of color unevenness caused by an influence of latent-image regression that is a problem specific to a light-sensitive material can be prevented. With regard to the aforesaid time interval, a period of time from exposure to development for any given pixel on a photographic paper is established to the uniformity which is within ±10 sec, preferably within ±5 sec and more preferably within ±1 sec for the average time of each pixel.

Incidentally, in FIG. 1, F represents a chemical supplying section, G is a processing controller section, H is a water tank, J is a waste liquid disposal space and P is a space such as a touch panel display and a media drive.

Now, details of the aforesaid suction drum C and its peripheral equipment will be explained as follows.

Figure 7:
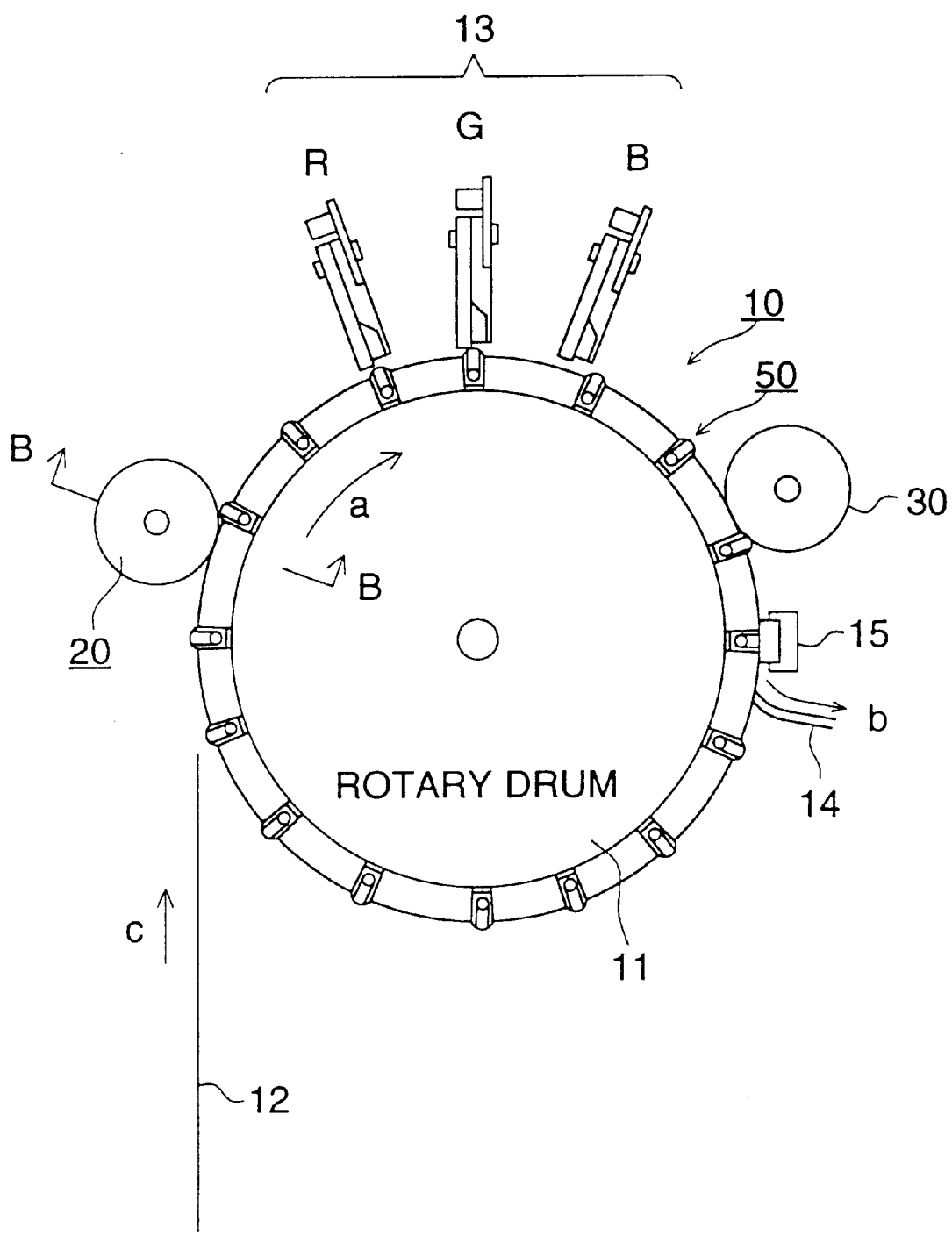
FIG. 7 is a diagram showing a rotary drum and its peripheral devices.

As shown in FIG. 7, exposure apparatus 10 is one to expose sheet-shaped photographic paper 12 while it is being conveyed under the condition that the sheet-shaped photographic paper 12 is sucked and attracted closely, as a member to be attracted, to the circumferential surface of rotary drum 11 (suction drum C) that is rotated in the arrowed direction "a" by an unillustrated driving motor, and the photographic paper 12 is conveyed by the rotary drum 11 in the course of exposure. On the upper portion of the circumferential surface of the rotary drum 11, there are provided nip rollers 20 and 30 which press the sheet-shaped photographic paper 12 to the rotary drum 11, recording head group 13 which optically expose the photographic paper 12 successively to image information corresponding respectively to R (red), G (green) and B (blue) of the three primary colors, magnet 15 that peels the photographic paper 12 off the circumferential surface of the rotary drum 11, and separation claw 14 which separates peeling-aid and separated photographic paper 12 in the arrowed direction "b" to guide them to the following conveyance system.

Figure 8:
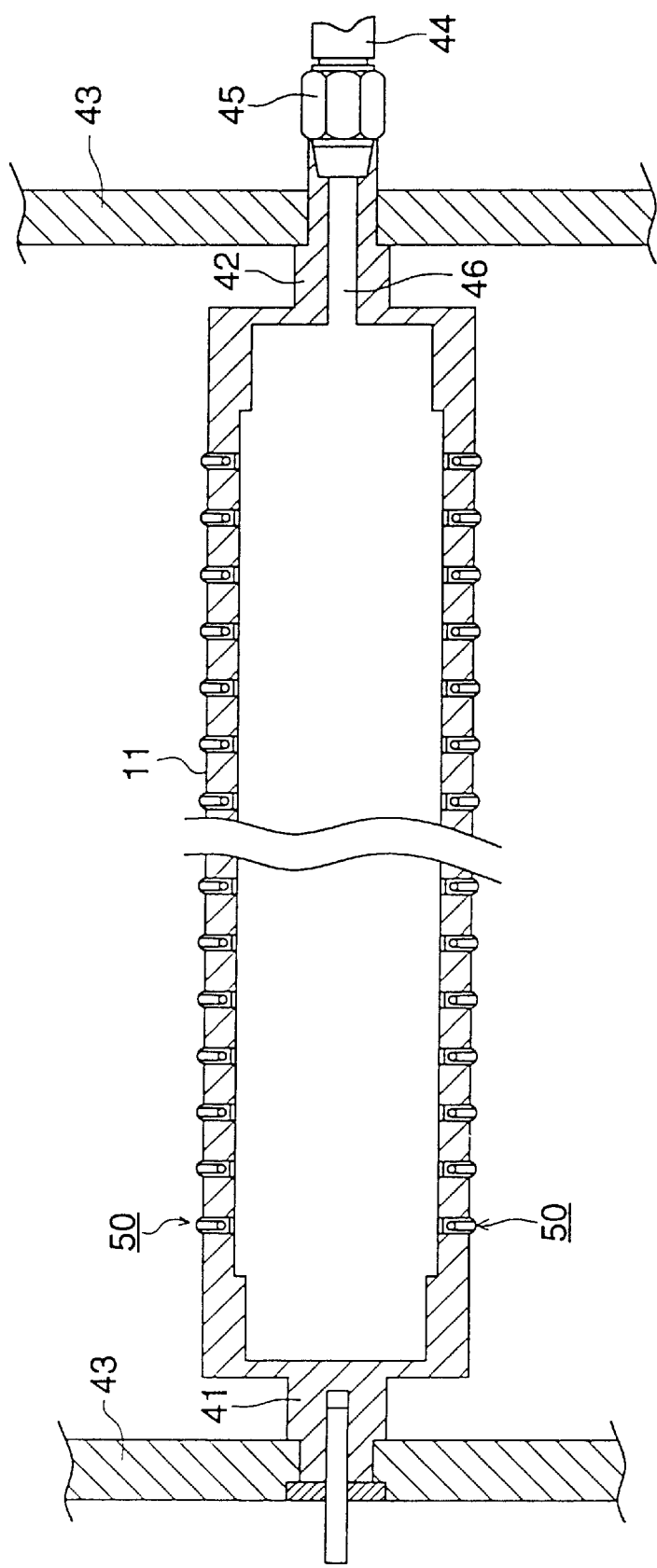
FIG. 8 is a longitudinal section of the rotary drum.

As shown in FIG. 8, the rotary drum 11 has on its both ends rotary shafts 41 and 42, and is pivotally supported on apparatus wall surface 43 rotatably. In the rotary shaft 42, there is provided path 46, and a right end portion of the rotary shaft 42 is connected to suction pipe 44 that is further connected to a vacuum pump (suction pump shown in FIG. 1) to be rotatable each other through link 45. On the other hand, a left end portion of the rotary shaft 42 is connected solidly to rotary drum 11 formed to be hollow in its inside, thus, the vacuum pump is communicated with the inside of the rotary drum 11 through a fluid path including the path 46.

On the circumferential surface of the rotary drum 11, there are provided a plurality of closing valves 50 each having an opening (suction inlet) at prescribed intervals along the entire surface. These closing valves 50 conduct circulation (valve opening) and interception (valve closing) of air between the inside and the outside of the rotary drum 11, and in the area from the nip roller 20 to the magnet 15 along the rotating direction, the state of valve opening is kept only on the portion where there is photographic paper 12, while, the portion where there is no photographic paper 12 in the area from the magnet 15 to the nip roller 20 and in the area from the nip roller 20 to the magnet 15 is kept to be the state of valve closing.

In FIG. 7, when the photographic paper 12 is guided in the "c" direction and it hits the nip roller 20, the photographic paper 12 is pressed against the circumferential surface of the rotary drum 11 by the nip roller 20. In that case, only suction inlets in the area which is pressed by the photographic paper 12 on the circumferential surface of the rotary drum 11 start their suction operation (closing valve 50 is switched to the state of valve opening), whereby the photographic paper 12 is attracted to the circumferential surface of the rotary drum 11 to be in close contact with it. Incidentally, with regard to aforesaid rotary drum, those having no closing valve 50 are also acceptable, and further, those having therein a complicated mechanism controlling suction area are also acceptable. However, by using the closing valves as mentioned above, it is possible to operate only suction holes corresponding to the size or shape of the photographic paper 12, whereby appropriate suction force can be obtained, which is preferable.

When the photographic paper 12 is conveyed to the exposure position by the rotary drum 11 which rotates in the arrowed direction "a", the photographic paper 12 is exposed to color image information by recording head group 13. In this case, on the recording head group 13, there are arranged an R color array type light source, a G color array type light source and a B color array type light source in this order along the direction of rotation of the rotary drum 11. In the case of exposing the photographic paper 12 to color image information, when the photographic paper 12 is conveyed to the prescribed exposure position, R color light based on image information with R color component is subjected to scanning, and R color exposure is made. Then, when the photographic paper 12 is further conveyed so that a portion exposed to R color arrives at the exposure position for G color exposition, G color exposure based on image information with G color component is made, and in succession, the same exposure portion is subjected to B color exposure based on image information with B color component.

As stated above, image output timing for each of R, G and B recording heads is controlled so that the same exposure portion may be subjected to R color exposure, G color exposure and B color exposure. Namely, there is provided a sensor (not shown) which detects the leading edge of photographic paper 12, and the exposure is arranged to be started based on information from this sensor.

Incidentally, as a recording head to be used in aforesaid suction conveyance system, other light source such as one wherein a laser beam is subjected to primary scanning by means of a polygon mirror may also be used in addition to a light source of a array type. Further, though three recording heads which are respectively for R, G and B colors are used as a light source for colors, it is also possible to provide a plurality of recording heads for a specific color, for example, because necessary quantity of light can not be obtained, or a sufficient length in the primary scanning direction can be obtained by only one recording head, or it is possible to use only one recording head.

After the exposure of color image information by means of recording head group 13, rotary drum 11 conveys the photographic paper 12 which then hits nip roller 30. When the leading edge of the photographic paper 12 arrives at the neighborhood of magnet 15 while being pressed to the circumferential surface of the rotary drum 11, closing valve 50 conveyed to the vicinity of the magnet 15 is made to be in the state of valve closing by the magnetic force of the magnet 15, thus, the suction operation ends. Then, the photographic paper 12 is pushed up by a projected member of the closing valve 50 and is peeled off the rotary drum 11, and then is completely separated by separation claw 14. After that, each portion of the photographic paper 12 is peeled off in succession when it is conveyed and arrives at the magnet 15 to be guided toward the following conveyance system in the arrowed direction "b". Thus, it is possible to peels off the photographic paper 12 simply only by applying magnetic force at the desired location.

In the present example, vibrations caused during attraction and separation of light-sensitive materials and fluctuations of negative pressure in the drum are kept to be at a low level in the structure of the example, a part of the light-sensitive material is successively held on a holding stand, while another part thereof is successively exposed to light and still another part is successively peeled off, thus simplification of sequence, shortening of a period of time for output and downsizing of an apparatus are realized.

Next, operations of closing valve 50 will be explained as follows, referring to FIG. 9.

Figure 9:
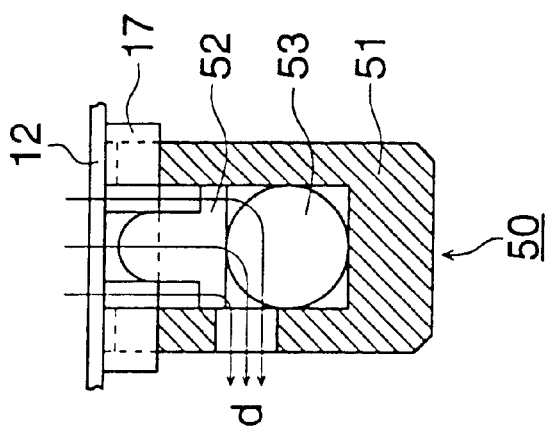
FIGS. 9 (a)–9 (d) represent a diagram showing a control valve provided on the rotary drum.
Figure 9:
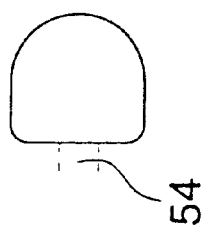
Figure 9:
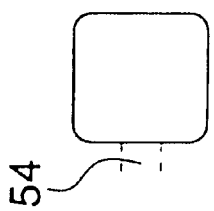
Figure 9:
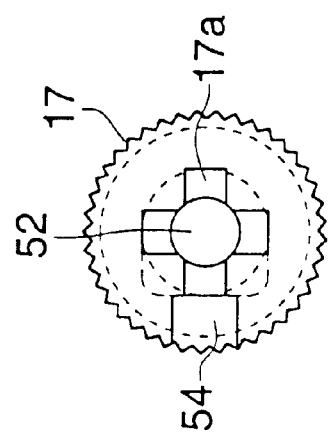

FIG. 9 (a) shows the state of valve closing of the closing valve 50. In the drawing, the closing valve 50 is mounted below pedestal section 17 whose outer end surface is processed to be on the same plane as the outer circumferential surface of the rotary drum 11, and the closing valve 50 is composed of suction inlet 17a serving as an opening, supporting member 51 which functions as a casing of the closing valve 50, projected member 52 which slides on an inner wall of the supporting member 51 and on the end surface of the suction inlet 17a, steel ball 53 which moves along an inner wall of the supporting member 51 and serves as a valve body supported to be movable up and down, and of valve opening 54 provided on the left side, while it is being connected with the inside of the rotary drum 11 to form a suction path for air.

FIG. 9 (b) is a perspective view of the inner wall of the supporting member 51 in FIG. 9 (a) viewed in the arrowed direction "A", and the valve opening 54 is provided on the flat portion in the inner wall of the supporting member 51, which is the easiest way to maintain airtightness when the valve opening 54 is closed by the steel ball 53. The shape of the inner wall of the supporting member 51 may also be one shown in FIG. 9 (c). This shape can further be other shapes such as a circle and others, but the shaped shown in FIG. 9 (b) and 9 (c) are preferable.

When exposure apparatus 10 is in its standby state, a vacuum pump is operating to generate constantly the negative pressure in the rotary drum 11. Therefore, the steel ball 53 is attracted and brought into close contact with the valve opening 54 which represents a valve closing position, and the closing valve 50 is kept to be in its state of valve closing. In that case, the bottom portion of projected member 52 that comes in contact with an upper part of the steel ball 53 is caused to slide on the inner wall of the supporting member 51 so that foreign materials such as dust or the like are prevented from entering. Further, a tip portion of the projected member 52 is protruded outside the suction inlet 17a.

When the photographic paper 12 is guided to the exposure apparatus 10 to come in contact with the rotary drum 11 or is pressed to the rotary drum 11 by nip roller 20, the photographic paper 12 presses down the projected member 52 (first external force), whereby the closing valve 50 is switched to its state of valve opening, and negative pressure for suction generated at the valve opening 54 is guided to the suction inlet 17a as shown with arrowed lines "d". This state is shown in FIG. 9 (d). Namely, when the projected member 52 is pressed down, the steel ball 53 located below the projected member comes off the valve opening 54 which then is opened to create the state of valve opening. In this case, the first external force is established to be greater than the suction force of the steel ball 53 caused by negative pressure. Once the valve opening 54 is opened, the steel ball 53 does not return to the valve opening 54, due to the resisting force from the photographic paper 12, thus the state of valve opening is maintained.

As stated above, the simple structure of the present example which only keeps the projected member 52 to be protruded from the suction inlet 17a makes it possible to receive the external force, and it can be applied to those wherein the suction inlet 17a is urged by suction force when necessary, and the steel ball 53 can maintain its state of valve opening after it is switched by the first external force to the state of valve opening.

In addition, since the projected member 52 is provided on each closing valve 50, it is pressed down for each closing valve 50 covered by the photographic paper 12. Therefore, it is possible that the existence of the photographic paper 12 is detected for each suction inlet 17a and whereby only suction inlets 17a necessary for the size and form of the photographic paper 12 are caused to operate for suction.

When magnetic force of magnet 15 acts on steel ball 53 formed including magnetic substances (second external force), the steel ball 53 is attracted, through its rolling and by negative pressure, to the vicinity of the valve opening 54 while pushing up the projected member 52, and it stops up the valve opening 54 to switch to the state of valve closing, and returns to the state shown in FIG. (a).

As stated above, switching to the state of valve opening conducted by the first external force exerts an action on the photographic paper 12 to be attracted to the suction inlet 17a to be in close contact thereto, and when there is exerted the second external force, the steel ball 53 is switched back to the state of valve closing, and aforesaid action to the suction inlet 17a for the attraction and close contact is released, thus it is possible to hold the photographic paper 12 to be attracted to the suction inlet 17a to be in closed contact thereto or to release it. It is further possible, only by giving the first and second external forces for a short period of time, to switch the steel ball 53 to the state of valve opening or to the state of valve closing, and the structure of the valve can be simple to lower the production cost and to reduce the operation cost. Further, because of the structure wherein the second external force is the magnetic force to attract aforesaid valve body in the direction toward the valve opening, it is not necessary to cause the valve to have therein the magnetic force generating mechanism, thereby a valve can be simple in structure and light in weight. In addition, since a portion where there is no photographic paper 12 and closing valve 50 that is in the state of valve closing maintain the state of valve closing, a simple construction is realized.

If resin is selected as a material of the projected member 52, the production cost can be reduced, while if magnetic substance is selected, the steel ball 53 does not need to be lifted in switching to the state of valve closing, making the operation to be smooth, thus, the material can be selected in accordance with objects. In addition, when the magnetic substance is selected, excellent efficiency for magnetic flux density is obtained. When the projected member 52 is magnetic substance, the steel ball 3 does not need to be magnetic substance, and the structure wherein the steel ball is brought into close contact with the valve opening 54 by the flow of air is also possible. Incidentally, the direction of the valve opening 54 in the present example is perpendicular to the direction of the first and second external force, which realizes smooth opening and closing of the valve.

Next, nip rollers 20 and 30 will be explained, referring to FIG. 10.

Figure 10:
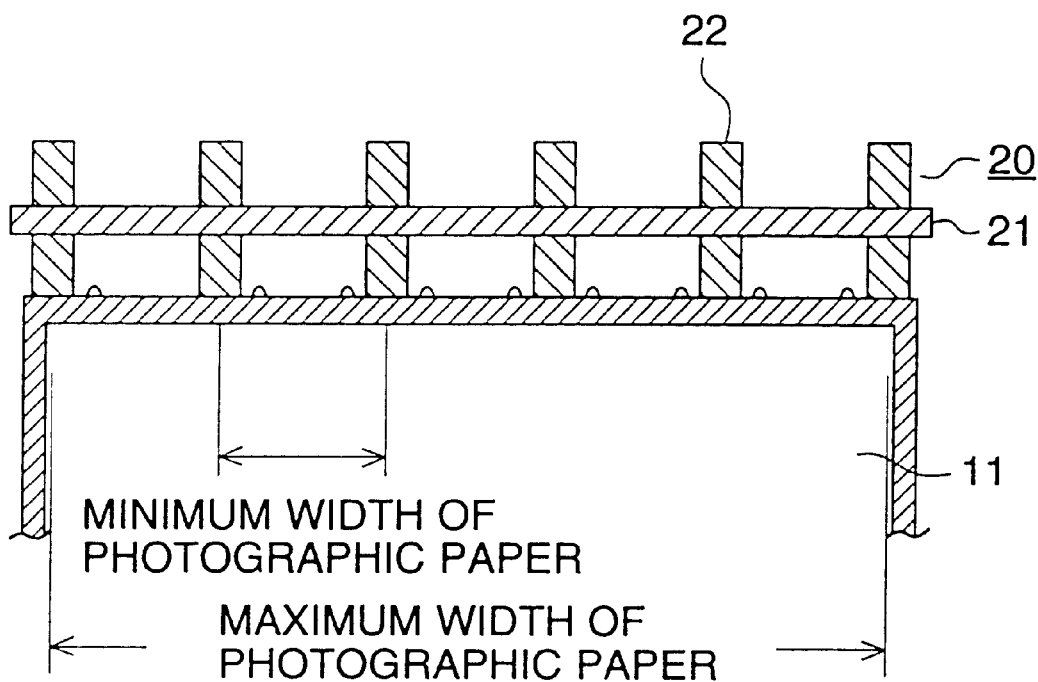
FIG. 10 is a diagram showing mutual relation between a nip roller and the rotary drum.

FIG. 10 is a schematic section of nip roller 20 and rotary drum 11 both viewed in the direction B—B in FIG. 7. The nip roller 20 is composed of rotary shaft 21 and plural rotary rollers 22 serving as a pressing means that is pivotally supported by the rotary shaft, and a distance between two rotary roller 22 at both ends is set to the maximum width of the photographic paper 12 to be used and a distance between two adjoining rotary rollers 22 is set to the minimum width of the photographic paper 12 to be used. Each rotary roller 22 is arranged to be driven for rotation while pressing the rotary drum 11 at the position where it does not the projected member 52. Accordingly, when the photographic paper 12 guided to the exposure apparatus 10 is sandwiched between the nip roller 20 and rotary drum 11 in the above-mentioned structure, only projected members 52 in the area covered by the photographic paper 12 are surely pressed down by pressing force of the nip roller 20 and rotary drum 11 and thereby the photographic paper 12 is held by the suction negative pressure to be in close contact with the suction inlet 17a.

In the method wherein an area of suction inlet group is switched selectively depending on the size of the photographic paper 12 of a regular form type such as A4 (210×297 mm) type or B5 (182×257 mm) type, it has been necessary to stipulate the position to which the photographic paper 12 is guided. However, in the present example, it is possible to make only suction inlets 17a in necessary quantity to conduct suction operation depending on the guided position, a shape and a size, despite how the photographic paper 12 is guided and despite the photographic paper 12 of a non-regular form type. Further, complicated control is not needed because detection of the leading edge or the trailing edge in the conveyance direction of the photographic paper 12 is not necessary.

In the present example, each rotary roller 22 is fixed on rotary shaft 21. However, when this rotary roller is made to be detachable, it is possible to provide it on the portion that comes in contact with projected member 52. Owing to this arrangement, not only a stiff sheet like photographic paper 12 but also a less stiff sheet can be attracted, and yet various sheet sizes can be covered.

Though nip roller 30 is composed, in the same way as in the nip roller 20, of a plurality of rotary rollers 22 which are driven to rotate while pressing rotary drum 11 at the portion that does not come in contact with projected member 52, it may also be structured with a span different from that of the nip roller 20 because it is not necessary to consider the span corresponding to a size of photographic paper 12. Further, the nip roller 30 inhibits a vibration that is generated when the photographic paper 12 is peeled off, which does not adversely affect exposure operations performed by recording head group 13, making it possible that the processing operations and peeling operations are conducted simultaneously.

The suction conveyance section explained above can be applied to a sheet-shaped member such as ordinary paper and a film, in addition to the photographic paper 12. Further, the closing valve 50 provided on the rotary drum 11 in the foregoing can also be employed on a holding stand of a flat plate, without being limited only to the rotary drum 11. In addition, if the surface coming in contact with a light-sensitive material has been matted, light-sensitive materials having a transparent base and those having a translucent bases can be exposed to light.

Next, details of recording head group (array head) 13 in the exposure apparatus 10 will be explained.

Figure 11:
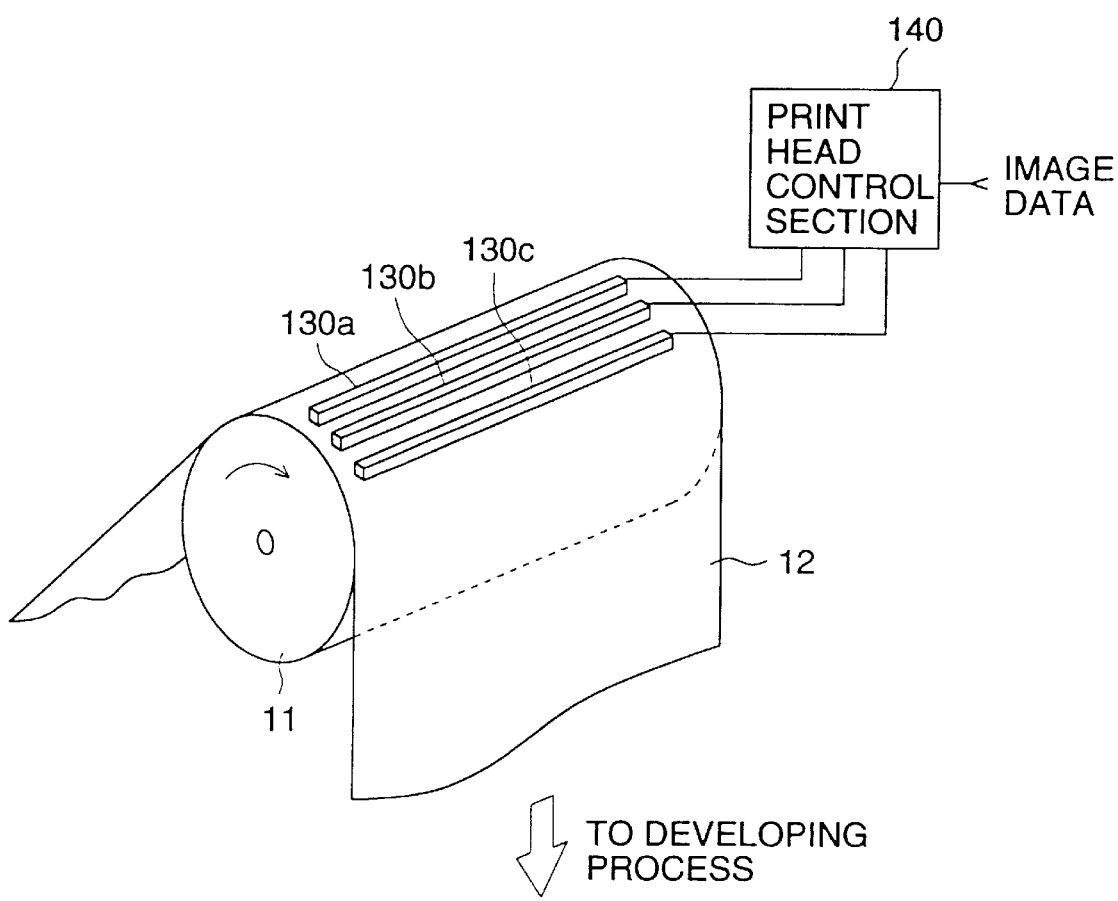
FIG. 11 is a perspective view showing a print head portion.

FIG. 11 is a perspective view showing a schematic structure of exposure apparatus 10 wherein when the photographic paper 12 is conveyed in the arrowed direction by rotary drum 11, red light source print head 130a having an LED array constituting the recording head group 13, green light source print head 130b having a vacuum fluorescent tube array and blue light source print head 130c are subjected to exposure control, depending on image data, by print head control section 140 (print head control circuit M shown in FIG. 1), thus, a prescribed portion on the photographic paper 12 is exposed to light for each color.

Incidentally, on each print head, there are employed plural recording elements arranged to be a shape of an array in a single or plural rows, and red light source print head 130a employs recording elements wherein an LED array with recording element density of 300 dpi is combined with a SELFOC lens array serving as an image forming optical system, while green light source print head 130b and blue light source print head 130c employ recording elements representing a combination of a filter for each color separation and a vacuum fluorescent tube print head having therein a vacuum fluorescent tube array of 300 dpi combined with a SELFOC lens array serving as an image forming optical system. Incidentally, those wherein a vacuum fluorescent tube array is combined with a SELFOC lens array are generally called VFPH (Vacuum Fluorescent Print Head).

In this case, the photographic paper 12 which has been explained above as a roll-shaped one may also be a cut sheet. Further, an image forming optical system of a recording element may also be a roof-mirror lens array, without being limited to a SELFOC lens array.

Figure 12:
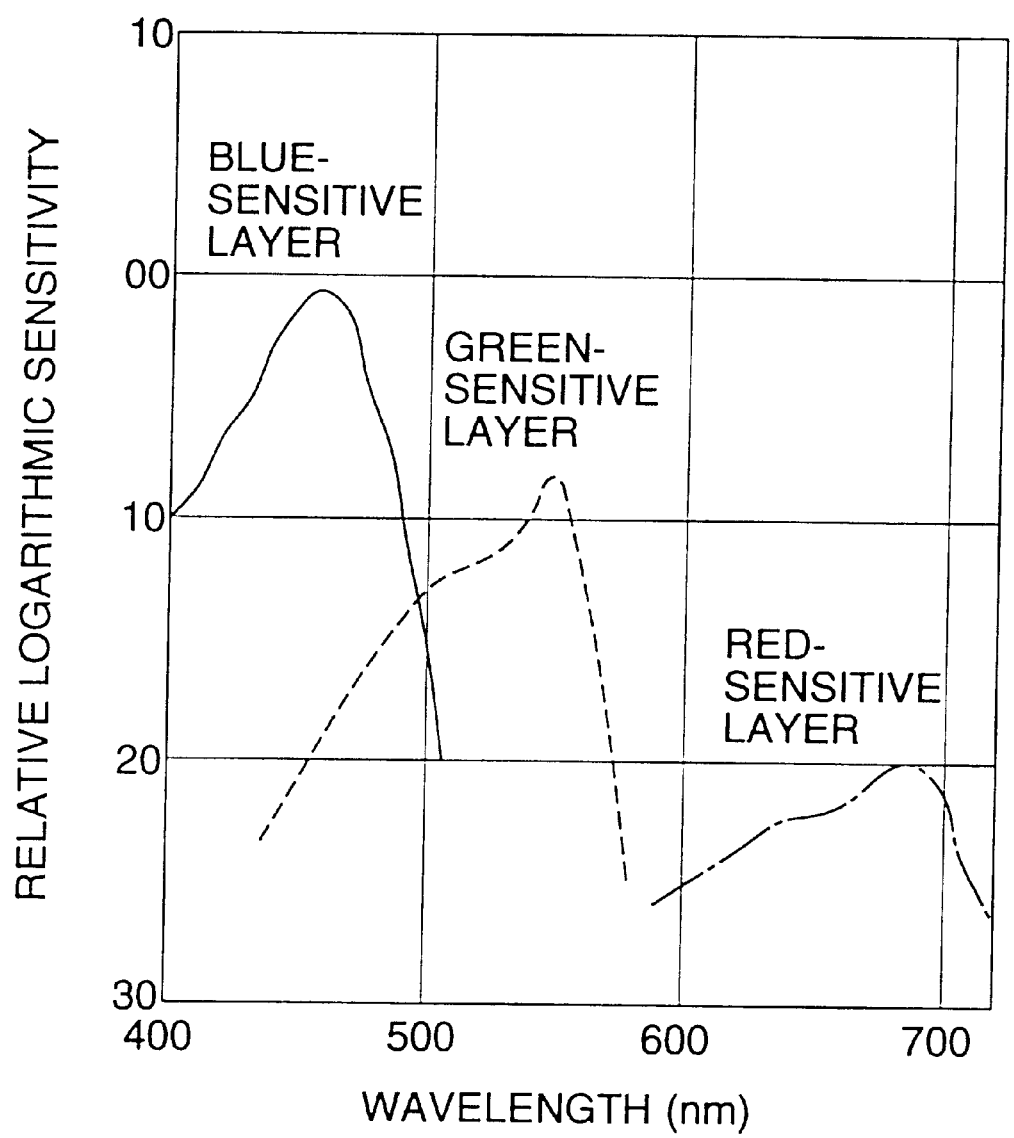
FIG. 12 is a diagram showing the spectral sensitivity characteristics of photographic papers.

FIG. 12 is a diagram showing spectral sensitivity characteristics of photographic paper 12.

As is clear also in this drawing, sensitivity of a green-sensitive layer is lower compared with a blue-sensitive layer, and that of a red-sensitive layer is very low to be only one half that of the green-sensitive layer. This characteristic is specific to a photographic paper, and in light-sensitive materials for photographing such as a color instant film, sensitivity of the red-sensitive layer is practically equal to those of other layers.

Figure 13:
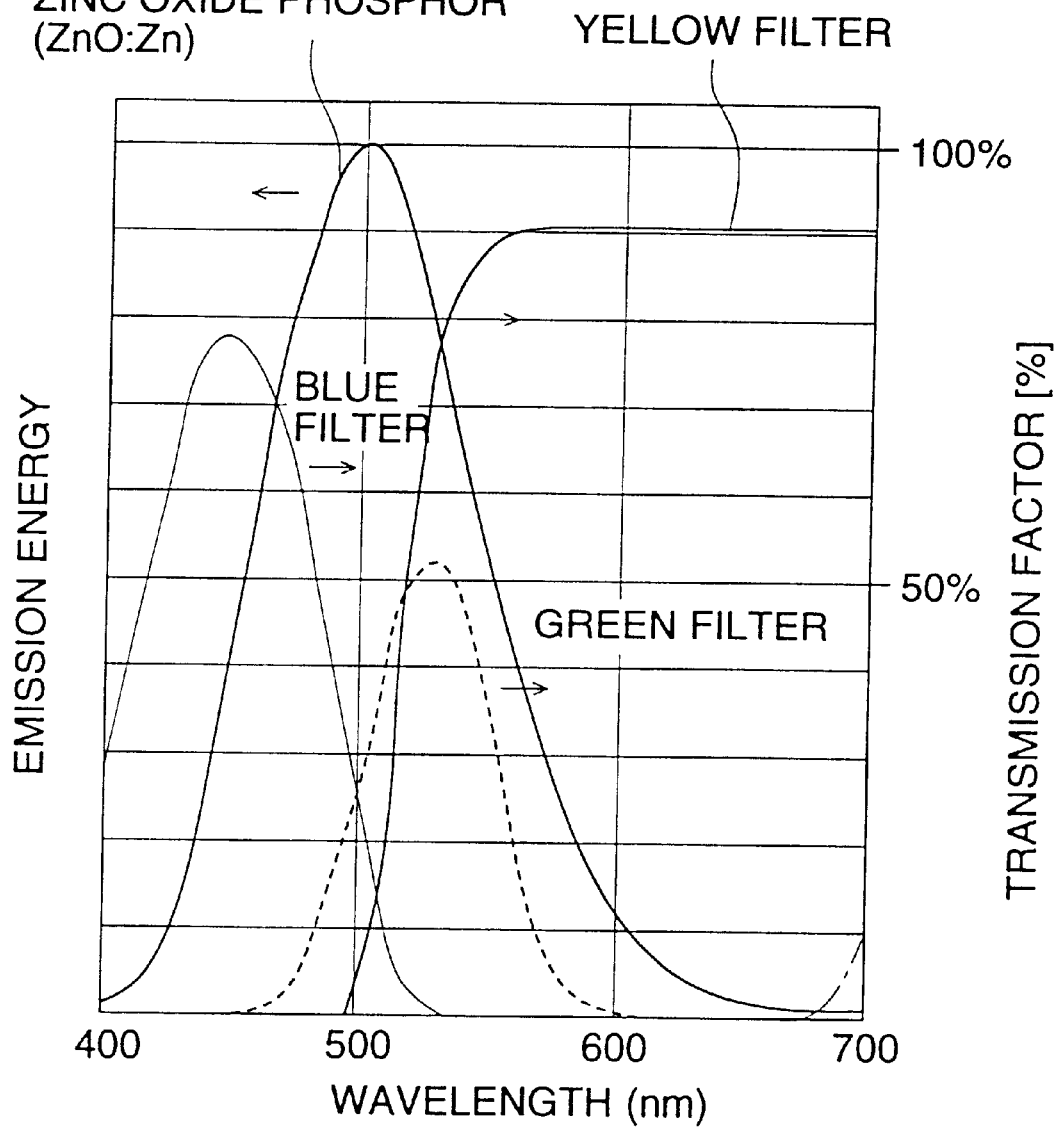
FIG. 13 is a diagram showing radiation energy of a vacuum fluorescent tube array and transmission factors of color separation filters.

FIG. 13 is a diagram of characteristics showing emission energy characteristics of a vacuum fluorescent tube array employing zinc oxide phosphor (ZnO : Zn) and transmission factors of various color separation filters.

In the present example, an LED array and a vacuum fluorescent tube array are combined in an appropriate manner so that color emission characteristics of a recording head may be interpolated, whereby exposure for each color is conducted efficiently and exposure for a color silver halide light-sensitive material is conducted at high speed. In addition, a recording element whose recording element density is 300 dpi is used as a recording array, which therefore makes it possible to realize high image quality and downsizing of an apparatus. In particular, an LED array used for red color exposure and a vacuum fluorescent tube array combined with an appropriate filter to be used for green color exposure and blue color exposure make the high speed exposure recording to be possible and make an apparatus to be inexpensive. Furthermore, even in the case of green color exposure and blue color exposure, there is used a vacuum fluorescent tube array which can secure resolution without using an LED array which causes deterioration of resolution, thus it is possible to realize a small-sized apparatus capable of offering high resolution.

Figure 14:
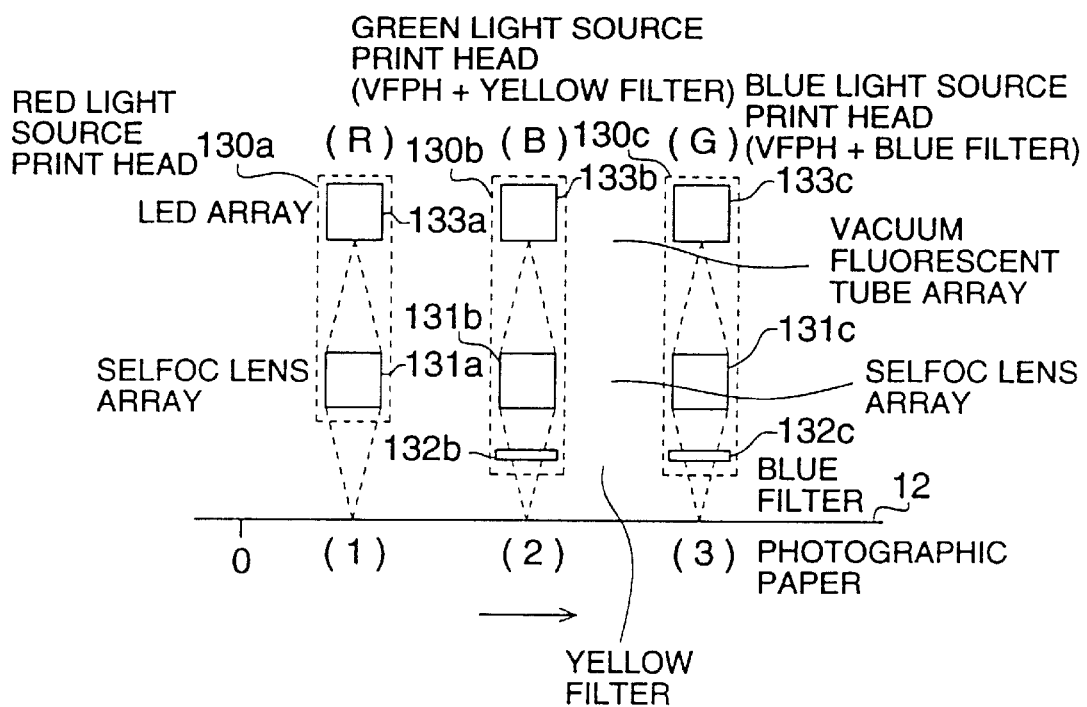
FIG. 14 is a diagram showing the structure of print heads.

Recording operations will be explained in detail as follows, referring to FIG. 14.

Red light source print head 130a having an LED array 133a, green light source print head 130b having a vacuum fluorescent tube array 133b and blue light source print head 130c having a vacuum fluorescent tube array 133c are arranged in the direction of conveyance of photographic paper 12. When these print heads are controlled by print head control section 140 in terms of exposure depending on image data, emission light forms an image on the photographic paper 12 through SELFOC lens arrays 131a, 131b and 131c, and a component of each color is recorded. Incidentally, in green light source print head 130b and blue light source print head 130c, there are respectively inserted yellow filter 132b and blue filter 132c both for color separation. An ND filter or the like may also be added to each print head for the purpose of adjusting a quantity of light.

Yellow filter 32b is used for color separation of a green color for the reason that the yellow filter is higher than the green filter in terms of the transmission factor for green light as understood from FIG. 13. In general, as color separation filters for blue, green and red colors, there are used a blue filter which mainly transmits light in a zone shorter than about 500 nm in terms of wavelength in the area of visible light of about 400–700 nm, a green filter which mainly transmits light in the area of about 500–600 nm and a red filter which mainly transmits light in a zone longer than about 600 nm in terms of wavelength.

Incidentally, aforesaid yellow filter is one which is generally called a yellow filter or a Y filter and is available on the market. For example, LEE filter HT 015 (Y filter) made by LEE Filters Co. in England has transmission factor of 50% or higher at a wavelength of 550 nm, and it can be used preferably. Namely, a filter having the transmission factor of 50% or higher at a wavelength of 550–700 nm and that of 5% or lower at a wavelength of 400–480 nm is preferable. With regard to the blue filter too, LEE filter 181 (B filter) made by LEE Filters Co. in England has transmission factor of 30% or higher at a wavelength of 430 nm, and it can be used preferably. Since a filter which is available on the market can be used as stated above, it is possible to make an apparatus inexpensive.

As shown in FIG. 13, a green filter interposed between wavelength zones for blue and red is of a band-pass type as a necessary consequence, and a peak transmission factor is small to inhibit light leakage for both blue and red, which makes it impossible to take out green light of vacuum fluorescent tube array 133b efficiently. To the contrary, in the case of the yellow filter, it can take out green light of vacuum fluorescent tube array 133b efficiently because the yellow filter transmits light in a zone longer than 500 nm in terms of wavelength.

The yellow filter further transmits also red light simultaneously. However, sensitivity of the photographic paper 12 for red is extremely low as shown in FIG. 12, therefore, there is not emission of a red color. Accordingly, employment of vacuum fluorescent tube array 133b for recording on the photographic paper 12 makes it possible to use yellow filter 132b, resulting in enhancement of exposure efficiency for green and in high speed exposure in high image quality.

Operations for conducting color recording equivalent to one line on a photographic paper will be explained, referring to FIG. 11 and FIG. 14.

First, print head control section 140 sends red image data, green image data and blue image data each being equivalent to one line to print heads respectively. Rotary drum 11 is conveying the photographic paper 12 at a constant speed, and when point "a" on the photographic paper shown in FIG. 14 arrives at an image forming point of red light source print head 130a, the print head control section 140 controls the red light source print head 130a to conduct exposure based on image data, and to record red image data on the photographic paper 12.

Then, as the photographic paper 12 is conveyed in succession, the exposure control identical to the foregoing is conducted, synchronizing with timing for the point "a" to arrive at image forming point (2) of green light source print head 130*b* and timing for the point "a" to arrive at image forming point (3) of blue light source print head 130*c*, and thereby color recording is conducted on point "a". By repeating these operations, it is possible to record a color image on a 2-dimensional basis on a prescribed area of the photographic paper 12.

A distance between each print head and a photographic paper, namely a distance between a photographic paper and a lens surface of a facing SELFOC lens, a distance between a color filter and a photographic paper when the color filter exists, is set to 26 mm which is a preferable distance that makes passage of the photographic paper to be easy and makes it possible to obtain sufficient quantity of light for exposure.

The timing mentioned above is one determined in advance by both an interval between print heads and a conveyance speed for a photographic paper, and this timing is stored in an apparatus in advance. When a change is made on the interval between print heads or on the conveyance speed, the timing mentioned above is also changed.

Figure 15:
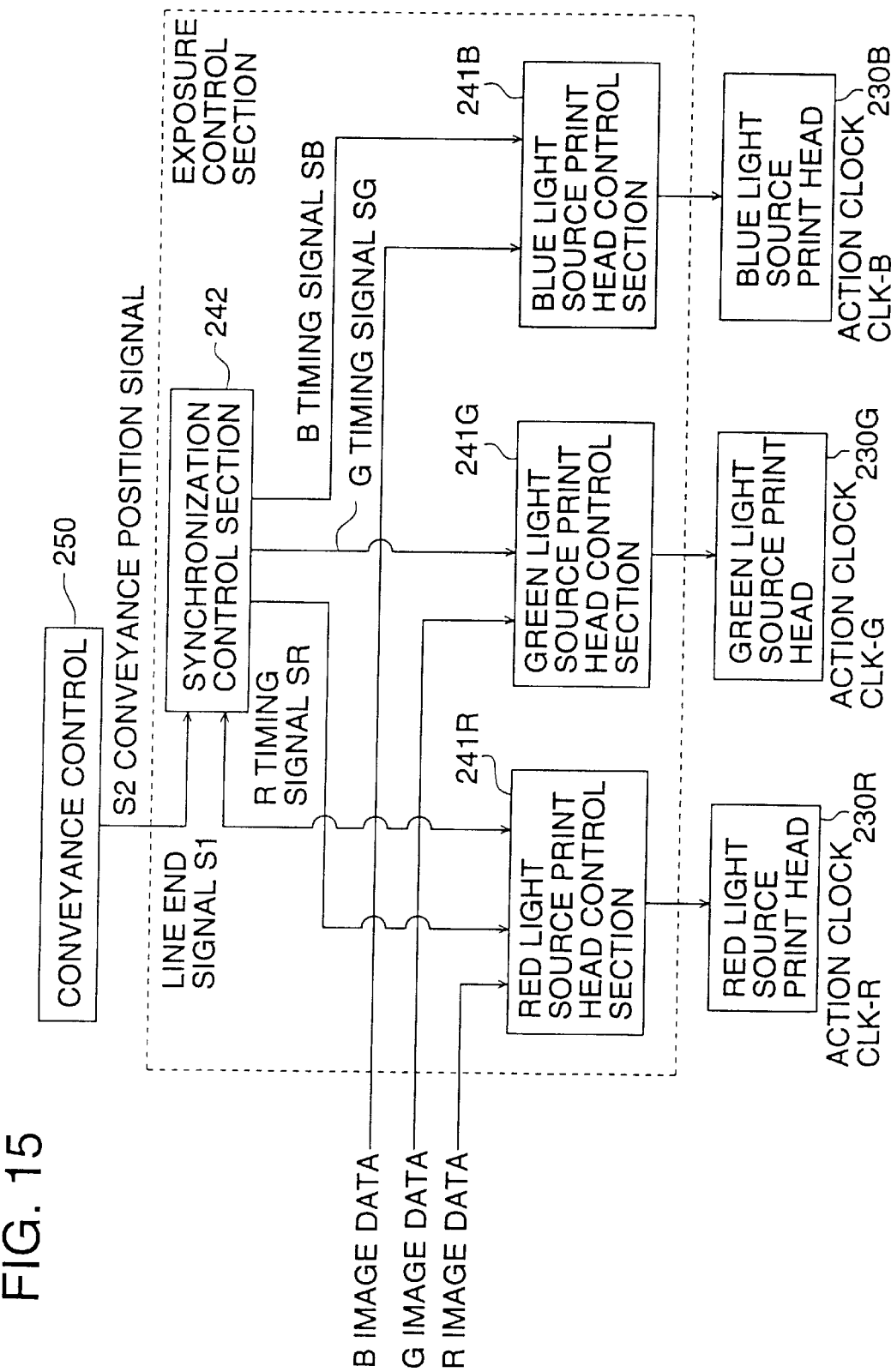
FIG. 15 is a block diagram showing the synchronization control circuit of a print head.

Next, synchronization control for each print head (recording element array) will be explained based on FIG. 15.

Red light source print head 230R is driven by operation clock CLK-R, green light source print head 230G is driven by operation clock CLK-G, and blue light source print head 230B is driven by operation clock CLK-B.

Red light source print head control section 241R, green light source print head control section 241G, and blue light source print head control section 241B generate respectively operation clock CLK-R, clock CLK-G, and clock CLK-B, and each print head is controlled is controlled based on each clock as stated above, so that gradation image based on corresponding image data may be recorded.

Aforesaid operations of each print head control section 241R, 241G or 241B are synchronization-controlled, with each recording for one line timed by R timing signal S-R, G timing signal S-G and B timing signal S-B all coming from synchronization control section 242.

Recording cycle (t0) for one line, in this case, is set to 2.82 msec, assuming that photographic paper P conveyed at a constant conveyance speed of 30 mm/sec is exposed to light under the pixel density of 300 dpi.

Synchronization control section 242 sends, at a cycle of t0, timing signals S-R, S-G and S-B respectively to print head control sections 241R, 241G and 241B for each recording of one line, to control synchronization of three colors for each line.

Figure 16:
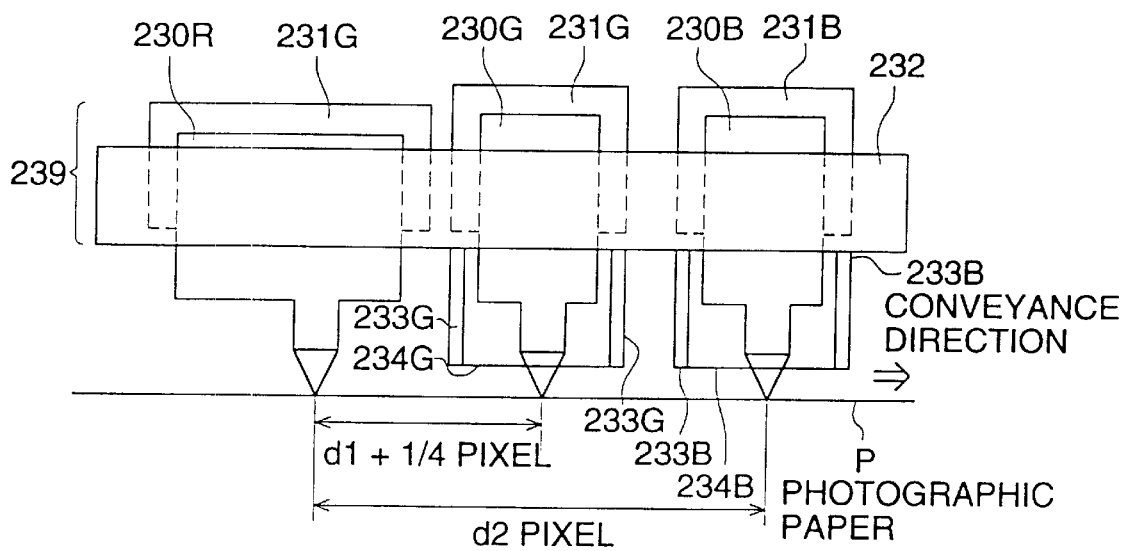
FIG. 16 is a diagram showing how each print head is attached.

Each light source is arranged to be in parallel with each other at intervals shown in FIG. 16 in the conveyance direction for photographic paper P conveyed at a constant speed, to be attached on unit 239. Namely, green light source print head 230G and blue light source print head 230B respectively have a head gap respectively of d1+(¼) pixels and d2 pixels from red light source print head 230R. In this case, d1 and d2 represent an integer, and it is indicated that blue light source print head 230B has a head gap which is a multiple of an integer of a recording pixel pitch (for example, approximately 85 μm in the case of 300 dpi) in the conveyance direction, while green light source print head 230G is deviated from a multiple of an integer by an amount equivalent to ¼ pixel.

Figure 17:
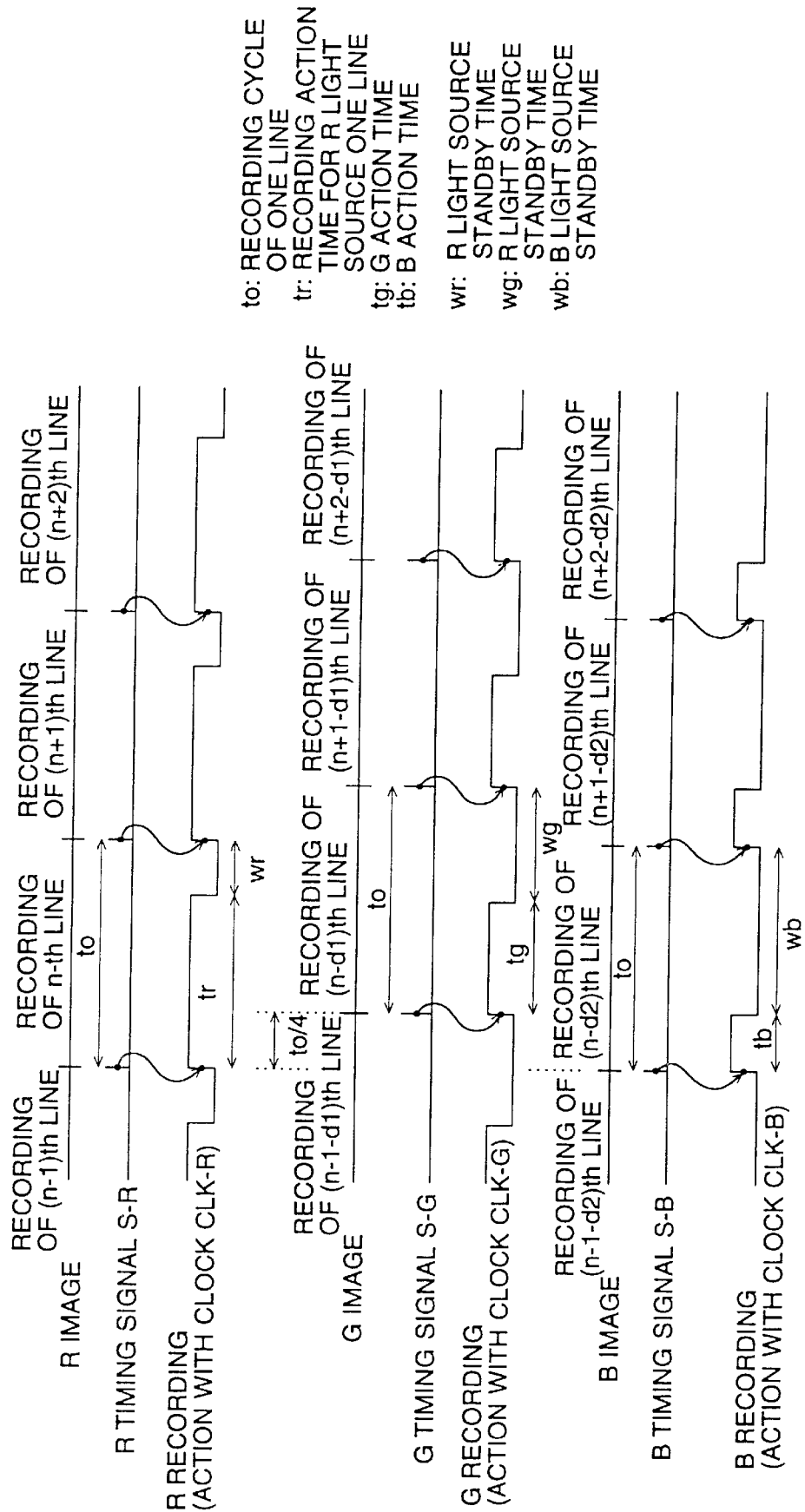
FIG. 17 is a timing chart showing the situation of 3-color synchronization control.

A concrete example of 3-color synchronization control in the aforesaid arrangement of each print head 230 is shown on a timing chart in FIG. 17.

Synchronization control section 242 simultaneously sends R timing signal S-R and B timing signal S-B respectively to print head control section 241 R and 241 B, and sends G timing signal S-G to print head control section 241 G after delaying the timing by t0/4, corresponding to the deviation of aforesaid ¼ pixel.

Due to this, recording operation for one line is started simultaneously for R and B, and it is started for G with delay of t0/4, whereby the recording of each line for each color is started at the same position on photographic paper P.

Incidentally, with regard to image data of one line to be recorded, when recording on n-th line is for R image, it is controlled so that recording on (n−d1)th line is for G image and recording on (n−d2)th line is for B image, corresponding to d1 and d2 each being a multiple of an integer of a recording pixel pitch in aforesaid head gap.

Since it is possible to record with less color-doubling for each one line on photographic paper P by recording images while controlling synchronization for each one line, cycle deviations in recording cycle for one line for each color are not accumulated, and whereby, color images with high image quality which is free from conspicuous color-doubling can be obtained.

Further, even in the case of using a print head wherein operation clocks CLK-R, CLK-B and CLK-G are the same, it is not necessary to adjust the operation clocks to be the same exactly, which makes it possible to reduce the cost of an apparatus.

Since less adjustment between operation clocks is required, it is possible to use print heads having different operation clocks by combining them without increasing the apparatus cost, thereby the degree of freedom for selection of print heads is enhanced, which makes it possible to structure, at a low cost, an apparatus which agrees with a recording medium. In the case of color silver halide photographic paper P, in particular, sensitivity and a wavelength of each light-sensitive layer vary greatly between light-sensitive layers. Therefore, by operating a print head which agrees with sensitivity and a wavelength of each light-sensitive layer with an appropriate operation clock to use the print head in the invention, it is possible to obtain color images with high image quality in which color-doubling is not conspicuous and the best use of high quality of a silver halide light-sensitive material is made.

Though FIG. 17 shows operations wherein synchronization control section 42 outputs timing signals S-R, S-G and S-B so that the recording of each line for each color may be started at the same position, it is not necessary to be limited to the foregoing, and the control which makes the specific timing in the recording of one line to be the same is acceptable.

In particular, when each timing signal is outputted in the manner to make recording positions on photographic paper P corresponding to a half of recording operation time for each line for each color tr, tg and tb, namely corresponding to tr/2, tg/2 and tb/2 to be the same, a position of each color dot for each line can be superposed more accurately, which is preferable because it makes an image to be less in color-doubling and to be of high image quality.

Figure 18:
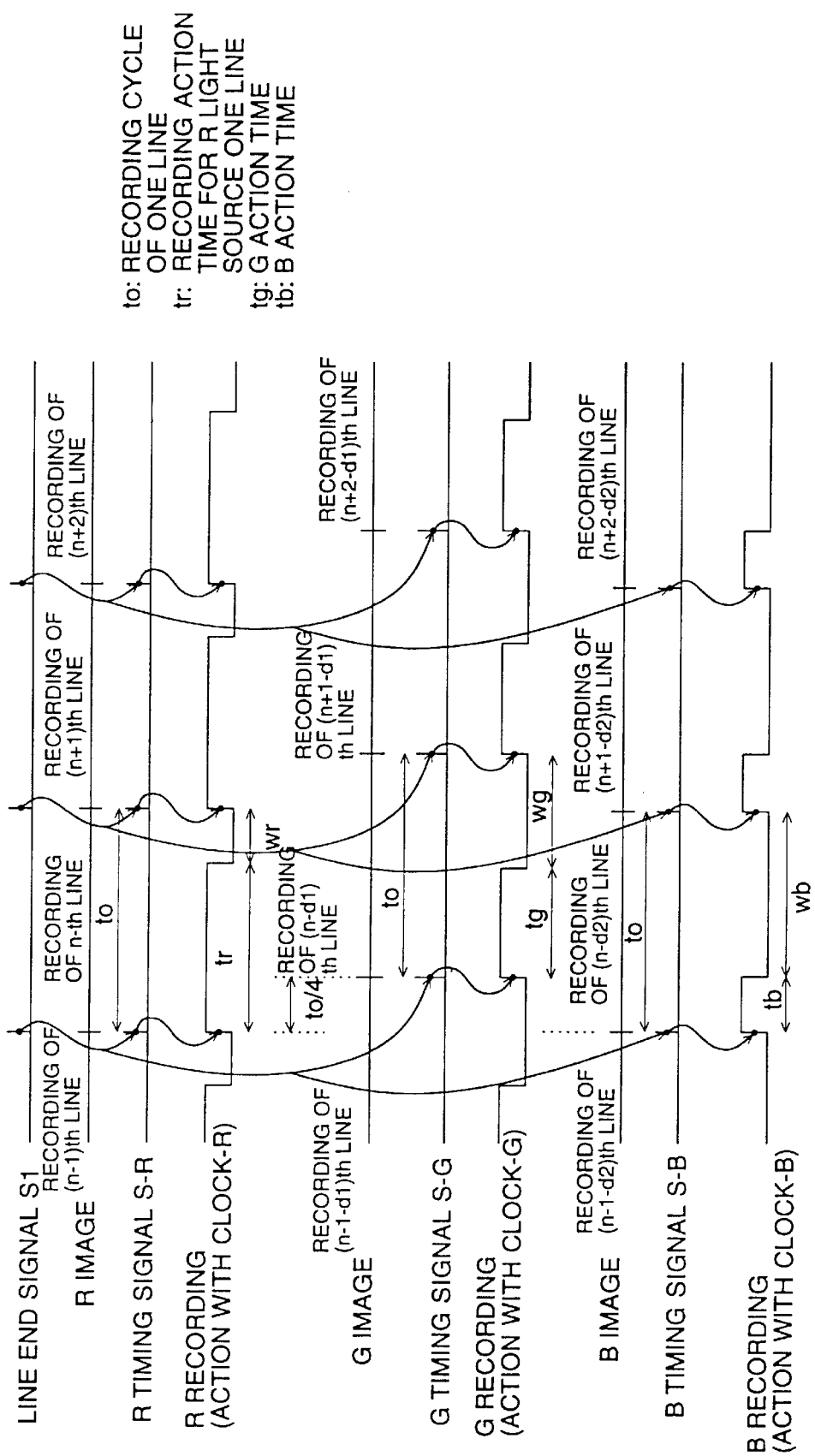
FIG. 18 is a timing chart showing the situation of 3-color synchronization control.

FIG. 18 shows an example wherein output timing for each of timing signals S-R, S-G and S-B from synchronization control section 242 is conducted based on line end signal S1. The line end signal S1 is a signal that is outputted to synchronization control section 242 from red light source print head control section 241R when recording cycle (t0) of red light source print head 230R for one line is ended. In this case, when operation clock CLK-G is changed, standby time Wr is changed, recording duty is changed by changing a period of an enable signal of each bit, and only adjustment of red light source print head control section 241 R is conducted, it is possible to simply adjust the recording cycle (t0) of one line through adjustment of only a single color, under the state that the synchronization control for each color for one line is kept, and color-doubling caused by accumulation of cycle deviations of recording cycle of one line for each color is inhibited, and this is preferable.

Further, when timing signals S-R, S-G and S-B are in the same timing, if S1 is transmitted directly to each print head control section as S-R, S-G or S-B without passing it through synchronization control section 242, it makes the structure to be simple and is more preferable.

When conveyance position signal S2 from conveyance control section 250 is used in place of S1 shown in FIG. 18, exposure can be timed with the position to which photographic paper P is conveyed. It is therefore possible to accurately control an image position for each color, despite unevenness of conveyance speed, which is preferable With regard to the conveyance position signal S2, there is a method to obtain it by detecting a rotation angle of a conveyance roller with a rotary encoder and thereby detecting a conveyance position of a photographic paper for every one line.

Next, another example of the structure of a print head will be explained as follows.

Figure 19:
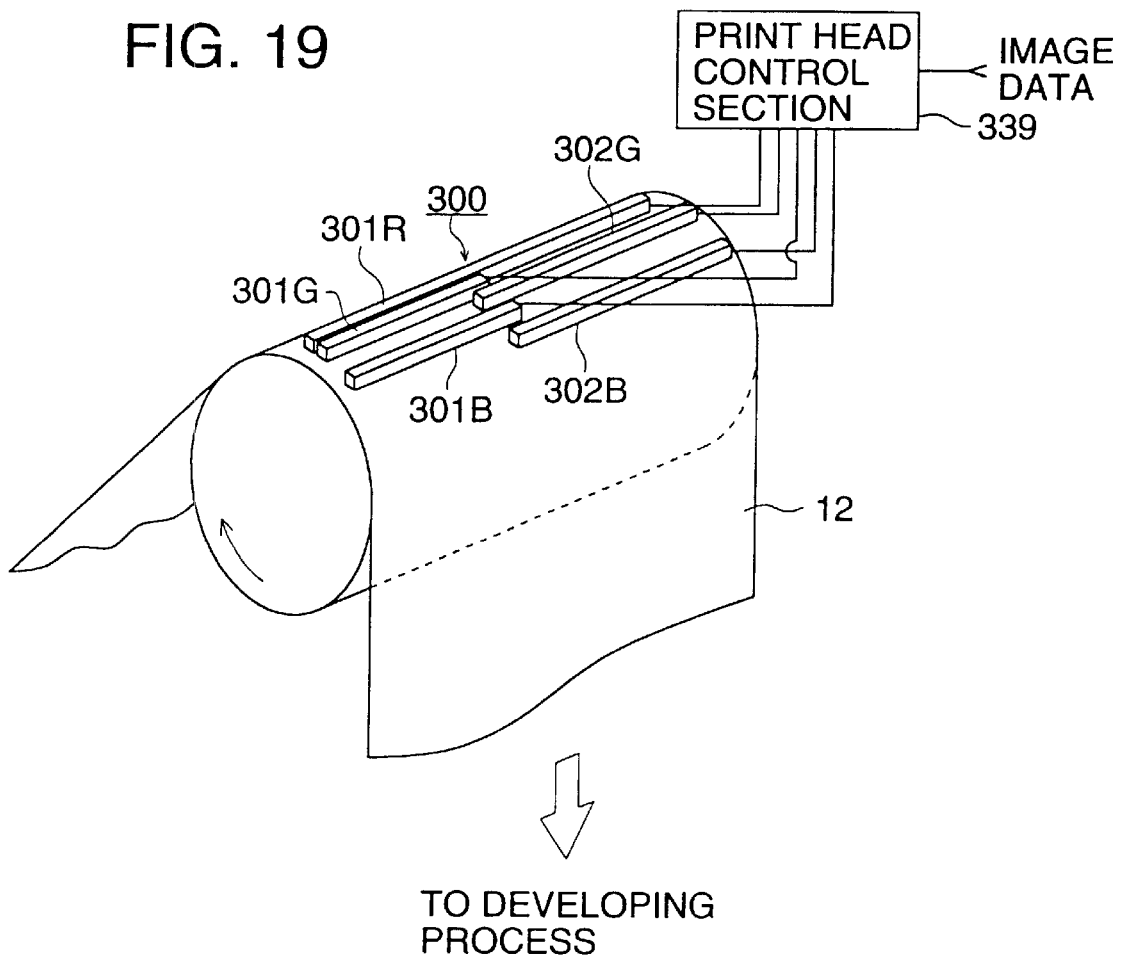
FIG. 19 is a perspective view showing an example wherein print heads of the same color are arranged on a staggered basis.

As shown in FIG. 19, an exposure section for each color can be structured to be in the length sufficient for the recording of one line by arranging, on a staggered basis, a plurality of print heads for the same color each being less than a recording length for one line.

Figure 20:
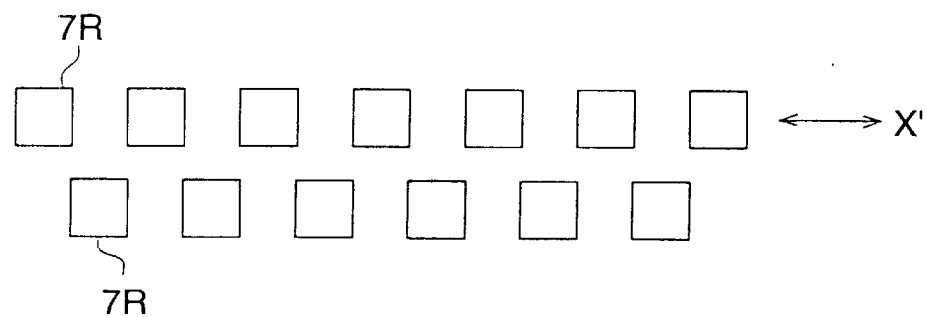
FIG. 20 is a diagram showing a staggered arrangement of recording elements.

In FIG. 19, red color exposure section 300 R is composed of red-color-use print head 301 R employing an LED array wherein LEDs 7 R each representing a recording element are arranged in a line shape. The LED array wherein LEDs 7 R are arranged almost straight is acceptable, and each LED can be arranged on a staggered basis as shown in FIG. 20.

Figure 21:
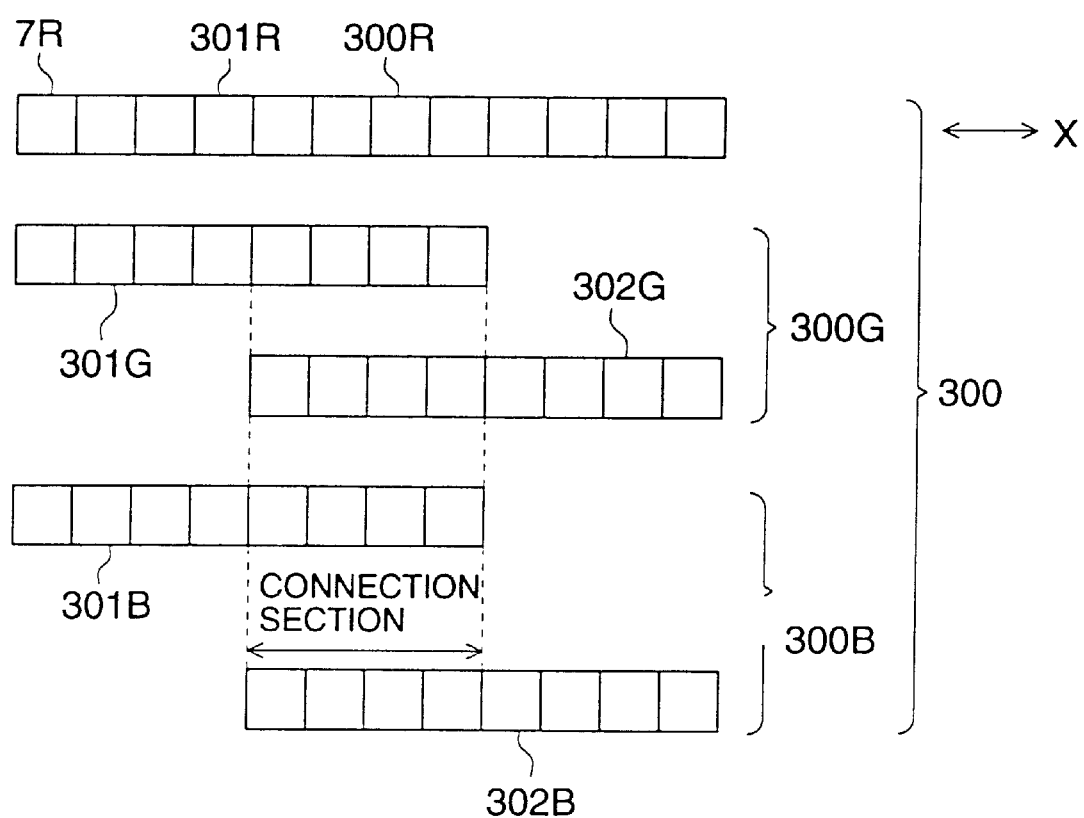
FIG. 21 is a top view showing an example wherein print heads of the same color are arranged on a staggered basis.

On green color exposure section 300 G and blue color exposure section 300 B, there are employed vacuum fluorescent print heads (VFPH) which can easily be subjected to color separation by color filters under the conditions of relatively high brightness and high speed response. Print heads 301G and 302G for green color, and print heads 301B and 302B for blue color are arranged in parallel in a manner that the print head has an area to be overlapped in the line direction for each color (see FIG. 21).

Further, a yellow filter is located in an optical path of each of print heads 301G and 302G for green color, and a blue filter is located in an optical path print head for blue color so that color separation exposure may be conducted.

Due to the arrangement of two print heads for the same color, as stated above, on print head 301G and 302G for green color constituting green color exposure section 300 G, there are position deviation equivalent to a print head interval in the conveyance direction for photographic paper 12 (arrowed direction in FIG. 1) and position deviation in the line direction of the print head. Corrections for these position deviations are carried out by controlling address and bus selector 306 g for green color from CPU 340 G as described later. With regard to the print head for blue color too, CPU 340B of print head control section 339 is used for the control in the same way as in the foregoing. With regard to synchronization of output, it is carried out by conducting the dividing corresponding to the conveyance speed through the use of external clock, and thereby by making emission timing signals. Each element of a vacuum fluorescent print head used in print heads 301G and 302G for green color and print heads 301B and 302B for blue color may be arranged on a staggered basis in the same way as in the LED array.

Figure 22:
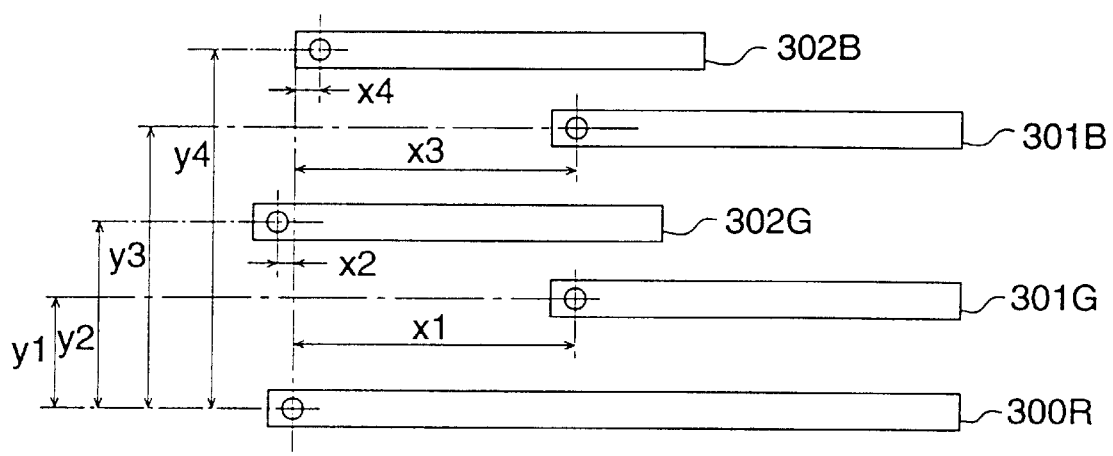
FIG. 22 is a diagram showing data as information of relative positions of print heads.

It is preferable that a positional deviation corresponding aforesaid print head interval (interval in the direction perpendicular to the direction of element arrow) and a positional deviation in the line direction of a print head (element row direction) are stored in advance as a relative position information having characteristics shown in FIG. 22. The line direction (element row direction) is direction "x" in FIG. 21, and even when the recording elements are arranged as shown in FIG. 20, the line direction is direction "x".

In the example shown in FIG. 22, distances to other print heads 301G, 302G, 301B and 302B are stored respectively as y1, y2, y3 and y4 with print head 300R for red color serving as a standard, and distances in the element row direction to the leftmost recording elements of other print heads 301G, 302G, 301B and 302B are stored respectively as x1, x2, x3 and x4 with the leftmost recording element of print head 300R for red color serving as a standard.

Then, when reading of image data is controlled with the standard of the image recording timing in aforesaid print head 300R for red color based on information of positional deviations of other print heads with the standard of aforesaid print head 300R for red color, an image of each color can be recorded without being deviated.

Next, a flow of processing from input of image data into print head control section 339 up to the exposure of photographic paper 12 will be explained as follows.

Figure 23:
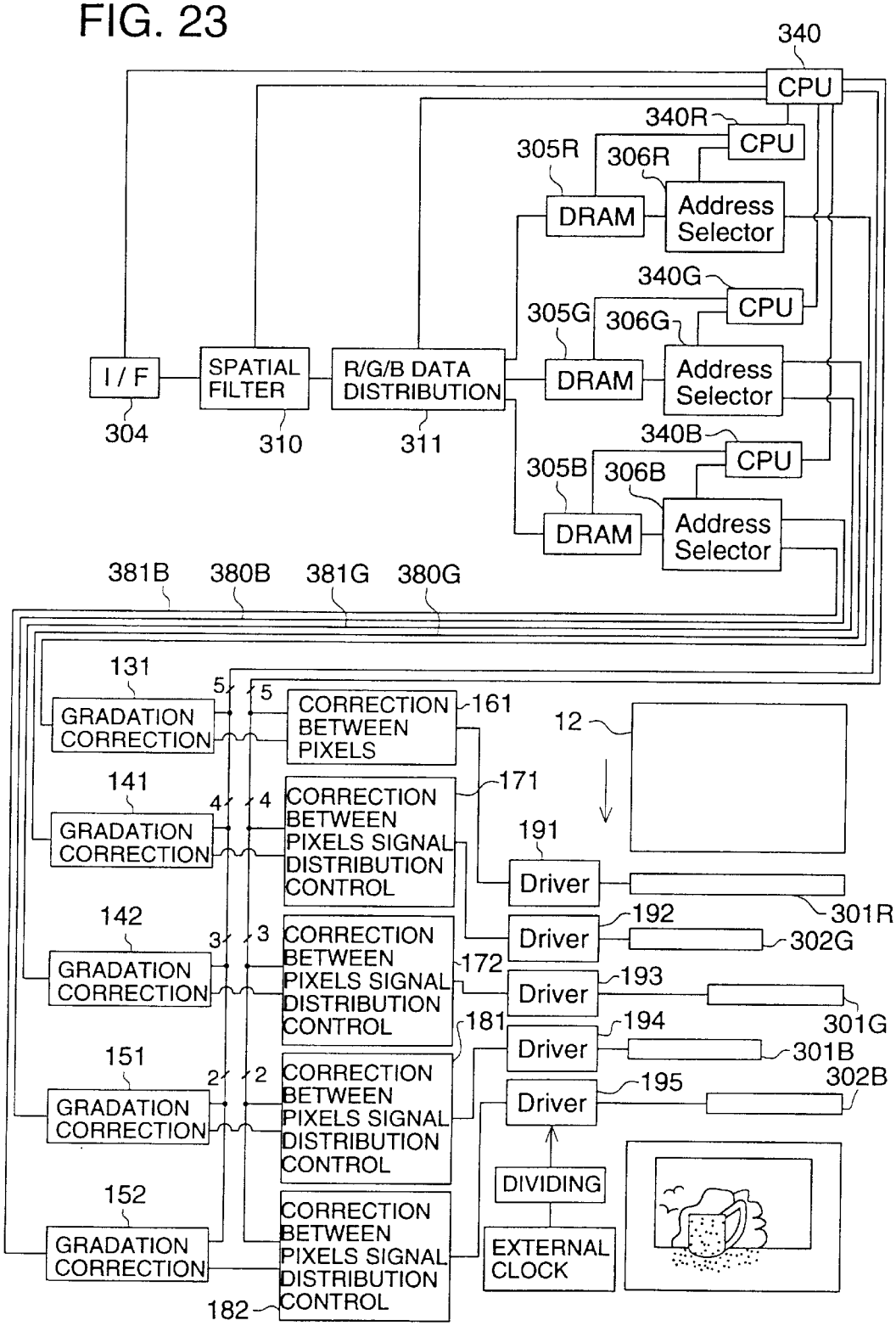
FIG. 23 is a block diagram showing control circuits of the structure wherein print heads of the same color are arranged on a staggered basis.

FIG. 23 is a diagram showing an outline of print head control section 339.

When recording on color photographic paper 12 an image wherein resolution is 300 dpi and 3224 pixels in the primary scanning direction and is 300 dpi likewise and 4960 pixels in the sub-scanning direction, there are inputted image data equivalent to 3224×4960 pixels in I/F 304 for each color. However, the number of pixels in the primary scanning direction can be adjusted by changing the number of elements for overlapped recording of the print head in its connection portion.

In addition to image data, data such as sharpness conversion described later, correction between pixels, signal distribution, correction values such as gradation correction and print head clearance, pixel difference in the line direction of a print head, and the number of overlapped recording elements (number of overlapped pixels) in the connection portion of the print head, are inputted into CPU 340 from I/F 304. Then, when a sharpness conversion value is sent from CPU 340 to spatial filter 310, when necessary, for each color of R, G and B, image data are subjected to sharpness conversion by the spatial filter 310, thus, the image data are stored by R, G and B data distribution circuit 311 respectively in DRAM 305 R, DRAM 305 G and RDRAM 305 B for each of red, green and blue colors.

Next, data equivalent to one line corresponding to the conveyance position (conveyance amount of photographic paper 12) among image data for red color stored in DRAM 305 R are taken out of an address corresponding to DRAM 305 R by address selector 306 R for red color, and the data are sent to gradation correction circuit 131. With regard to image data for green color and image data for blue color, address and bus selector 306 G for green color and address and bus selector 306 B for blue color divide them into image data 380G and 380B each representing 2560 pixels from the forefront address of image data for one line for each color and into image data 381G and 381B each representing those wherein a pixel difference equivalent in the line direction of a print head is advanced from the forefront address of image data equivalent to one line (those obtained by subtracting image data corresponding to pixels on the connection portion of the print head from each of image data 380G and 380B), and image data 380G and 380B are sent respectively to gradation correction circuit 141 and 151, while, image data 381G and 381B are sent respectively to gradation correction circuit 142 and 152. When the same processing as the foregoing is conducted for position deviation in the conveyance direction of print heads 301R, 301G, 302G, 301B and 302B for R, G and B, images for each color can be recorded without being deviated.

Incidentally, these flows are controlled by CPU 340R, CPU 340G and CPU 340B each representing CPU provided for each color. When these image data equivalent to one line for each color are passed through gradation correction circuits 131, 141, 142, 151 and 152 when necessary, gradation correction controls correction between pixels circuit 161, correction between pixels/signal distribution control circuits 171, 172, 181 and 182 depending on gradation correction values sent from CPU 340, and thereby correction between pixels is conducted depending on the gradation correction values and correction values between pixels sent from CPU 340, and signal distribution to plural print heads for each color is conducted.

After that, image signals subjected to correction between pixels are supplied to driver 191 which is an image signal supply means, and image signals subjected to both correction between pixels and signal distribution are supplied to drivers 192, 193, 194 and 195. Depending on signals of image data transmitted, an amount equivalent to position deviation at the initial and terminal portions in the conveyance direction (a portion having thereon no image signal is displayed) is compensated by supplying 0 data equivalent to each line from CPU 340R, 340G and CPU 340B which control for each color, thus, a photographic paper is exposed to light by a print head for each color.

If the correction data between pixels mentioned above represent a value which corrects variation of an amount of emission for each element by being multiplied by image data, it is possible to reduce the cost through multiplication with an inclination coefficient described later, without dividing the correction circuit into a circuit for correction between pixels and a circuit for signal distribution.

When calculating a value of correction between pixels, it is preferable that the power supply is turned off for arrays other than the array to be calculated. However, when two arrays for exposure in the same color are arranged in parallel in the primary scanning direction on a staggered basis as shown in FIG. 19, if a value of correction between pixels can be determined under the state that sub-exposure on one side has been given, a correction value wherein an influence of remainder is considered can be determined.

As stated above, due to an arrangement wherein a correction value of image data is established based on results of detection of a quantity of light of each recording element, conditions for driving a recording element for original image data are changed as a result. Namely, even when the emission time (exposure time) for image data is constant, when a fall of a quantity of light is detected, for example, if the emission time is determined after original image data are corrected to image data in which the emission time is set to be longer, the emission time is extended to compensate a fall of a quantity of light as a result, and thereby energy for initial exposure for image data can be secured.

In this case, it is also possible to use an arrangement in which a quantity of light is changed, by changing characteristics of emission time for image data. Further, with regard to a method of changing driving conditions for compensating a change in a quantity of light, it is not necessary to be limited to the change of aforesaid emission time (exposure time), and it is possible to change driving voltage for a print head or to change driving current so that necessary exposure energy may be obtained with the same emission time.

Next, a method of preparing an inclination coefficient will be explained.

Figure 24:
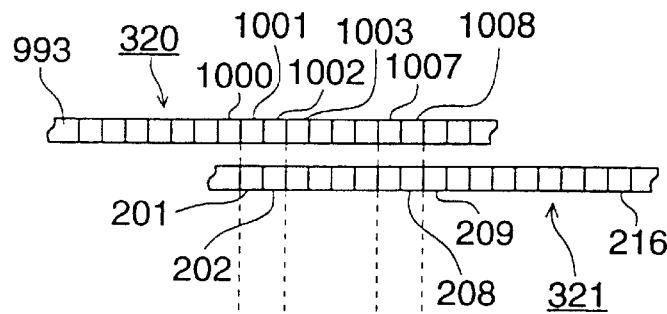
FIGS. 24 (a)–24 (d) represent a diagram showing how an overlapped portion in the case where print heads of the same color are arranged on a staggered basis is corrected (inclination coefficient).
Figure 24:
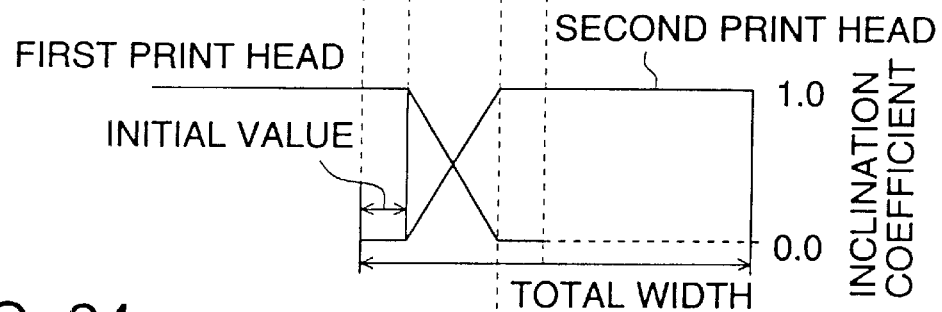
Figure 24:
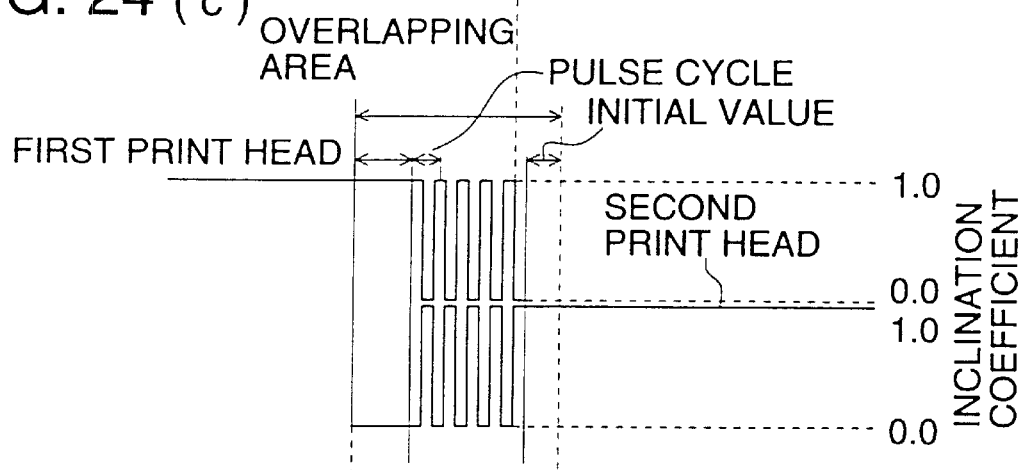
Figure 24:
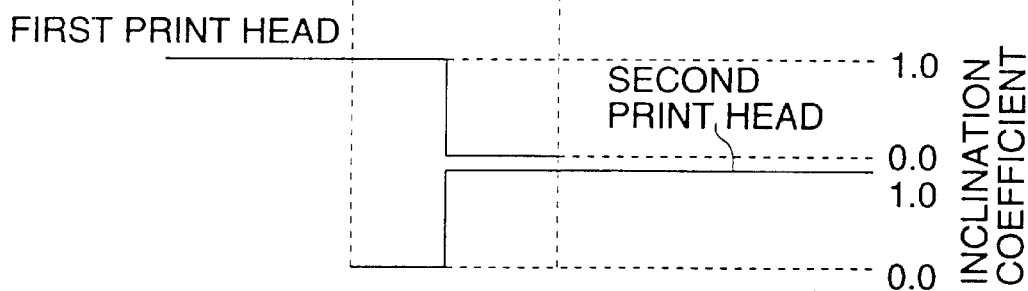

An inclination coefficient is prepared so that signals to be distributed to each recording element of each print head may be inclined as shown in FIG. 24 (*b*). Let it be assumed that Id represents an amount of exposure of a certain pixel on a connection portion of a print head, Id1 represents an amount of exposure of aforesaid pixel of first print head 320 after signal distribution, and Id2 represents an amount of exposure of aforesaid pixel of second print head 321 after signal distribution.

The inclination coefficient is established in a way that it is increased or decreased monotonously in the line direction of the print head on the area where the print head on the connection portion is overlapped, and it is established as a multiplication coefficient ranging from 0.0 to 1.0 for image data. By changing an amount equivalent to 4 pixels to be of a linear type in an overlapped area for 8 pixels in FIG. 24 (*b*), the inclination coefficient shown in FIG. 25 can be obtained. In this case, Id1=inclination coefficient 1×Id and Id2=inclination coefficient 2×Id are satisfied.

Though Id is established to 1.0 in FIG. 24 (*b*), when the same pixel is distributed to two print heads such as the first print head 320 and the second print head 321 for the exposure, reproduced pixel density sometimes varies to be high or low depending upon switching characteristics of print heads, even when an amount of exposure is the same as far as a value is concerned compared with an occasion for exposing with one print head. In this case, it is possible to reproduce the pixel density which is the same as that in the case of exposing with one print head, by setting Id to be smaller or larger according to circumstances.

When the control is conducted so that an output signal to a recording element on the portion where print heads are overlapped is made to be smaller in the direction of an adjoining print head, namely, an amount of exposure is made to be smaller in the direction from recording element 1001 to recording element 1008 that is the direction of the second print head 321 in the case of the first print head 320, it is possible to record a large-sized image at low cost without any deterioration of sharpness on the overlapped portion, with no print head having a long recording length and with no feeling of difference of reproduced gradation between two print heads. Further, it is possible to prevent deterioration of sharpness caused by the positional deviation between print heads in the longitudinal direction of a print head of recording element, namely the positional, deviation in the longitudinal direction of a print head between recording element 1001 of first print head 320 and recording element 201 of second print head 321. With regard to the sharpness deterioration caused by positional deviation of a recording element, the positional deviation of recording elements ranging in size from −0.025−+0.025 mm is allowable under the human visual test in the case of resolution of 300 dpi.

In the case of resolution of 300 dpi, extreme discontinuity of density can be prevented with a size of 100 pixels or more, namely about 8 mm or more representing a portion where connection portions are overlapped, and image recording without feeling of a difference of reproduced gradation can be carried out with 200 pixels or more, namely about 16 mm or more, and more preferably with 600 pixels or more, namely about 50 mm or more, and the positional deviation of recording elements up to 0.05 mm is allowable under the human visual test.

FIGS. 26, 27 show concrete inclination coefficients of those shown in FIGS. 24 (c) and 24 (d).

When there is a recording element row turned on and off whose inclination coefficient varies from 0.0 to 1.0 in a print head as shown on recording elements Nos. 204 and 205 in FIG. 26 and recording elements Nos. 204 and 205 in FIG. 27, a recording element that exposes an adjoining pixel moves completely from the second print head to the first print head. Therefore, when a position of each print head and an amount of emission of each print head are not adjusted precisely, white streaks or black streaks appear on a recorded image, after exposure.

Next, correction between pixels in recording image data of 256 gradations and a method of obtaining output signal Sx of each recording element after distribution of signals will be explained in the following S—1–S—10, referring to FIG. 28.

Figure 28:
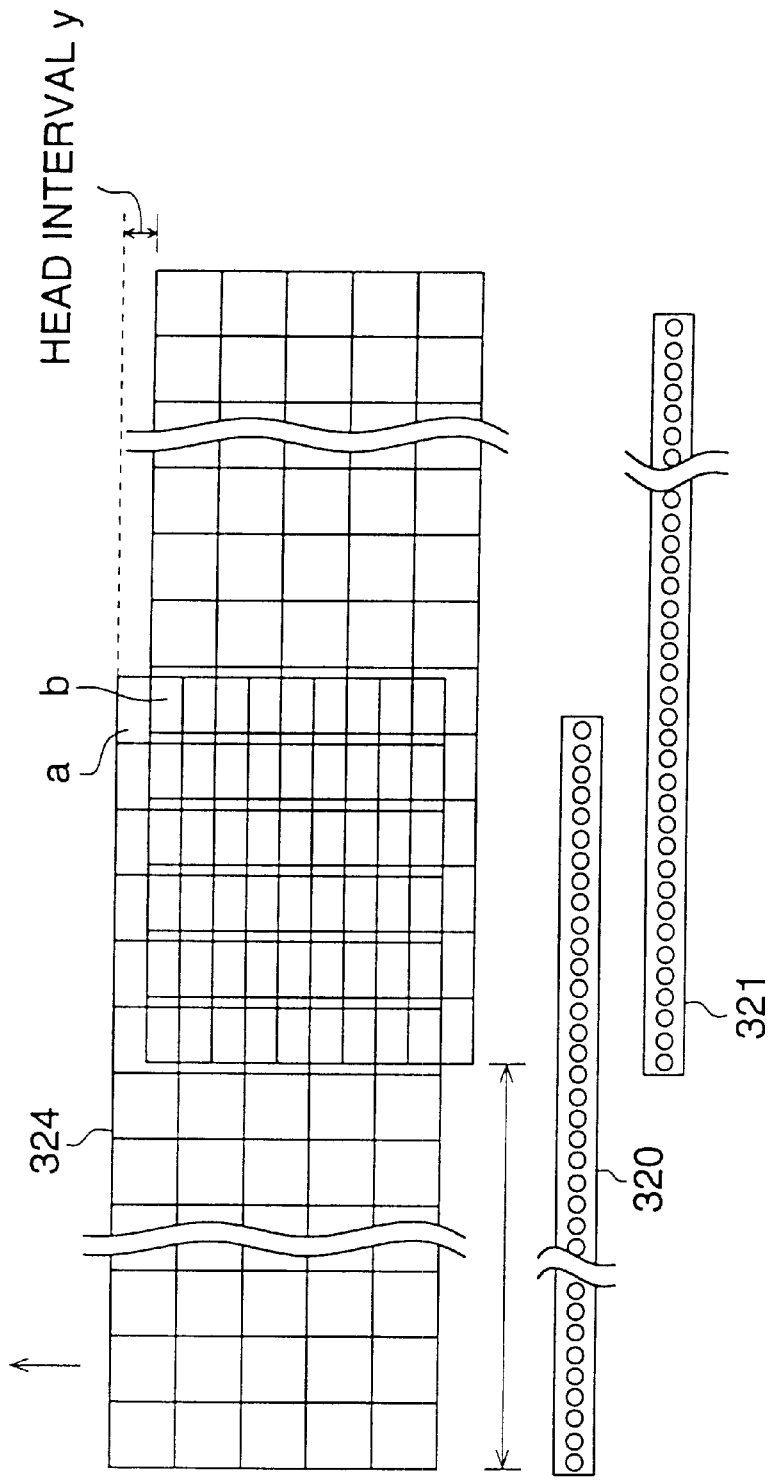
FIG. 28 is a diagram showing how the correction between pixels is obtained.

(S—1) The first print head 320 and the second print head 321 are arranged so that they are overlapped to a certain extent and photographic paper 2 is exposed to light by each print head, and thereby a plotting chart shown in FIG. 28 is outputted. Incidentally, it is necessary to arrange each print head to be in parallel with the other side.

(S—2) A length of a difference of output positions for address 0 of the first print head 320 and the second print head 321 is measured, and it is assumed to be pixel quantity x.

(S—3) The symbol x is corrected and output is made again under the condition that two lines are overlapped to the utmost extent, and head positions are adjusted mechanically so that a width of a line may look visually not to be deviated from the other side.(so that a line does not look to be thick).

(S—4) Head distance y (pixel quantity in this case) which is a positional deviation in the sub-scanning direction between the first print head 320 and the second print head 321 is obtained by means of a plotting chart.

(S—5) To synchronize the first print head 320 with the second print head 321, the delay time for the start of exposure or the pixel quantity of the second print head 321 for the first print head 320 is obtained.

(S—6) An overlapping area where both print heads are overlapped at a connection portion of the print head is established to prepare an inclination coefficient which will be described later.

Figure 29:
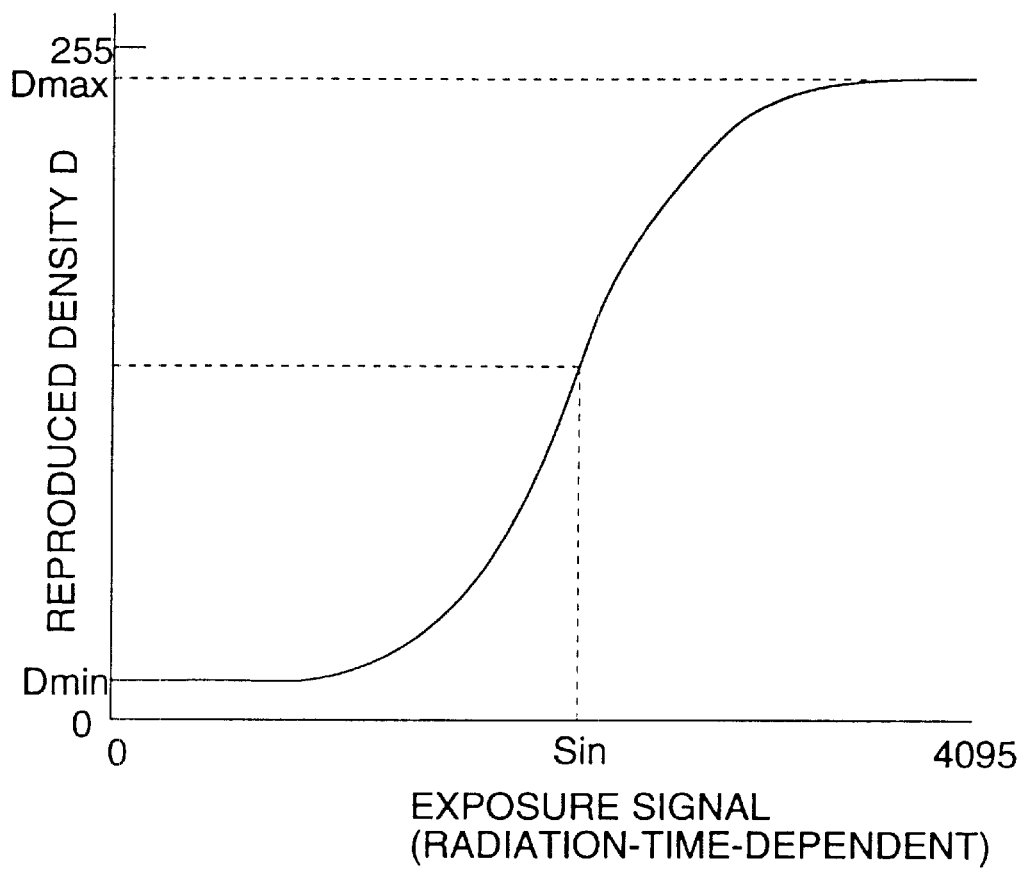
FIG. 29 is a diagram showing the mutual relation between an exposure signal and reproduced density.

(S—7) A Sin—D curve representing the relation between an exposure signal (Sin) which is an output signal of a recording element shown in FIG. 29 and density (reproduction density D) of a photographic paper which is a light-sensitive material is obtained For each recording element of each print head.

(S—8) Maximum value Dmax of reproduction density D is defined, and the reproduction density D is divined into 256 density steps (8 bits), and exposure signal Sin (corresponding to exposure time in this case) corresponding to each step is obtained from FIG. 29 which is a Sin—D curve obtained in aforesaid (S—7).

Figure 30:
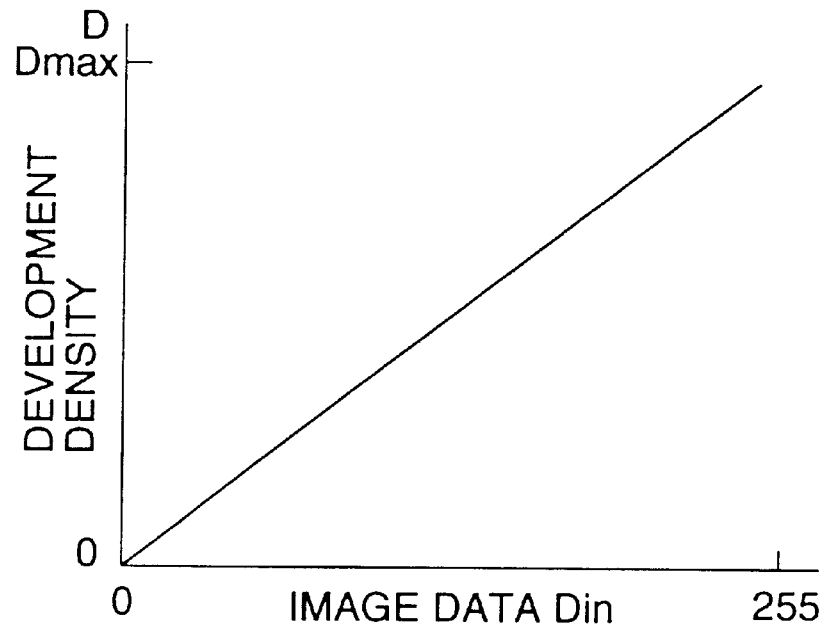
FIGS. 30 (a) and 30 (b) represent a diagram showing the mutual relation between image data and reproduced density.
Figure 30:
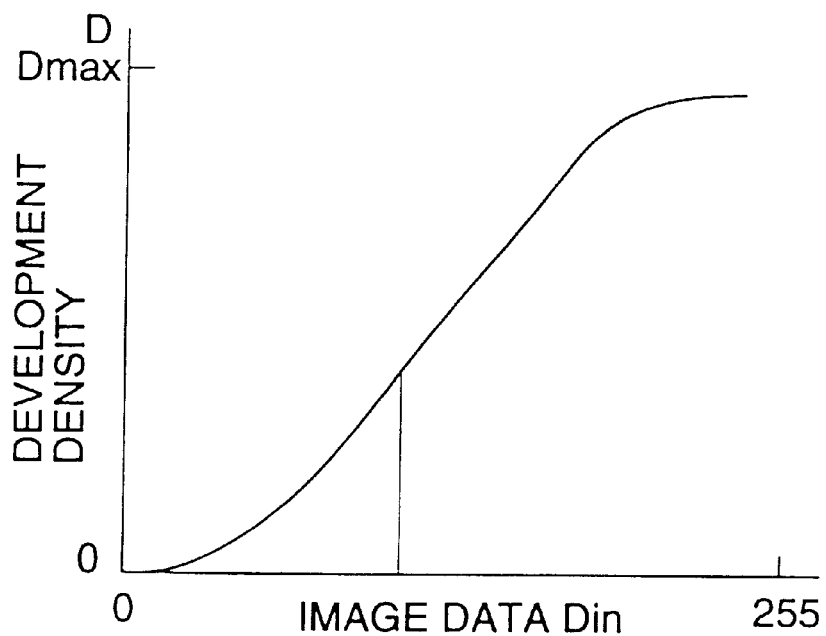

(S—9) A Din—D curve is prepared so that arbitrary reproduction density D may be obtained for image data Din, and a value of Sin is obtained from Sin—D curve in FIG. 29. By preparing this for 0–255 of Din, a gradation conversion table is prepared. Incidentally, it is possible either to make the Din—D curve to be linear for input signal Din as shown in FIG. 30 (a), or tc change Din as shown in FIG. 30 (b) by considering that the Din corresponds to a logarithm of an amount of exposure, so that the Din matches characteristics of a silver halide light-sensitive material representing a recording medium.

(S—10) Output signal Sx of each recording element after correction between pixels and signal distribution is obtained through the following expression.

Din:8 bit→Sin:12 bit (from the gradation conversion table)

Sx=Sin x inclination coefficient x data of correction between pixels

However, Sx has resolution at a level of 4096 covering 0–4095.

When there are two or more print heads for one color, this gradation conversion table is established so that two Din—D curves are the same.

Further, before recording, it is possible to set a gradation correction value and to set the reproduction density for image data with a value of correction between pixels, for one print head, so that image data reproduction density characteristics of two print heads may agree with each other.

Next, in an image recording apparatus shown in FIG. 19, a width of an area where print heads 301G and 302G for green color and print heads 301B and 302GB for blue color are overlapped was changed, and the first print head and the second print head were arranged as shown in FIG. 24 (a). With an address of a recording element on the end of the first print head 320 opposite to the second print head being 0, an address is increased in the direction toward the second print head 321. An address of a recording element on the end in the same direction of the second print head, namely of a recording element on the end at the first print head side is assumed to be 0.

Figure 40:
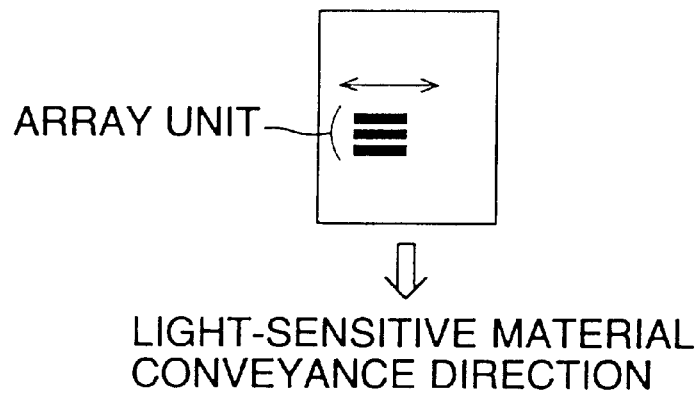
FIGS. 40 (a) and 40 (b) represent a diagram showing the mechanism wherein the direction for conveying a photographic paper is in parallel with the direction of a row of array unit elements.
Figure 40:
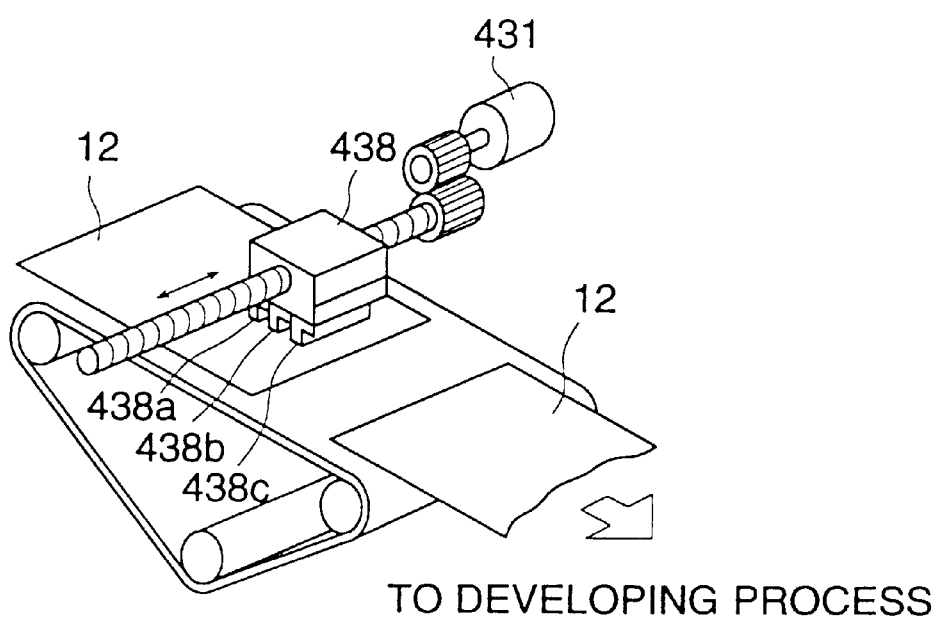

An overlapping area is changed to 100 pixels, 200 pixels, 300 pixels, 400 pixels, 600 pixels, 800 pixels, and 1000 pixels, and image recording of 300 dpi was performed on a silver halide light-sensitive material respectively with inclination coefficients having forms shown respectively in FIGS. 24 (b), 24 (c) and 24 (d). FIG. 40 shows an example wherein an overlapping area represents 200 pixels and an inclination coefficient has a form shown in FIG. 24 (b).

When inclination coefficients take forms shown respectively in FIGS. 24 (c) and 24 (d) as a result of changing the overlapping area to the foregoing in the case of FIGS. 24 (b)–(d), black spots or black streaks, or white spots or white streaks were caused when positions of print head 301G, 302G for green color and print head 301B, 302B for blue color are not registered accurately. However, if the inclination coefficient takes a form shown in FIG. 24 (b), when an overlapping area is 100 pixels, namely about 8 mm, it was possible to prevent occurrence of unnatural white lines and black lines, though the density jump was visually observed slightly. When the overlapping area was 100 pixels or more, namely about 16 mm or more, discontinuous density and deterioration of sharpness which was especially concerned were not observed visually on a connection portion of print heads 301G and 302G for green color and on a connection portion of print heads 301B and 302B for blue color. In particular, in the case of the overlapping area of 600 pixels or more, namely of 50 mm or more, density difference between print heads was not observed visually even when gradation reproduction between print heads was not conducted accurately. Compared with these, when the overlapping area is less than 100 pixels, namely less than 8 mm, continuity of density is poor.

Even when providing print heads for the same color on a staggered basis, it is possible to conduct, on photographic paper P, the recording with less color-doubling and less deviation of connection position for print heads for the same color for each line by conducting synchronization control for each line identical to the foregoing. Therefore, cycle deviation of recording cycle for one line of each print head is not accumulated, thus, it is possible to obtain color images with high image quality wherein deviation of connection position is not conspicuous.

When a silver halide color light-sensitive material is used as a recording medium, in particular, gradation characteristic is soft, and gradation of recorded images is made to be of a density modulation type due to image blur in exposure and processing. Therefore, even when outputting timing signals Sa, Sb and Sc without correcting the deviation from a multiple of an integer of a line interval corresponding to recording pixel density in an interval for arrangement of each recording head as shown in FIG. 24, color-doubling caused by phase deviation of recording cycle of one line for each color is not conspicuous, and images with high image quality can be obtained in a simple method, which is especially preferable.

However, when conducting image recording by the use of plural print heads, resolution in the primary scanning direction is not always the same exactly for each print head, and errors are caused, in resolution in many cases. In such a case, deviation and blur of images are caused for each color, and image quality is greatly deteriorated. In this case, it is possible to prevent image deviation and image blur for each color by using a method disclosed in TOKKAIHEI 8-52078.

Incidentally, in general, concerning a manufacturing method for print heads, there exists a mechanical tolerance of 50 $\mu$m–1 mm for a distance from a reference hole or a reference plane of a print head to the position of a pixel that emits light actually. On the other hand, for example, when an image containing on its edge portion much high spatial frequency components such as a black character is formed on a color light-sensitive material by giving exposure thereon with several light sources, exposure positions for the light sources need to be exactly the same with each other. Accordingly, it is necessary to adjust the aforesaid mechanical tolerance through some means.

Therefore, when employing a plurality of print heads as stated above, an assembly for inspection with which a relative position between print heads and a focusing position are adjusted is prepared in advance, and is fixed in one unit. Then the unit is mounted at the reference position on an exposure section. By making the print head to be a unit as stated above, it is possible to mount or replace the print head, skipping complicated adjusting works. Further, if a unit of a print head is fixed with a liquid which hardens such as adhesives, the print head and the unit are completely integrated solidly, namely, the relative position of each print head is fixed to be constant, and deviation of the relative position caused by installation or external vibration can be prevented, which is preferable. In addition, by measuring a distance and position of a print head at the moment of inspection assembly, it is possible to know in advance the parameters necessary for setting up an exposure section such as an amount of image deviation in apparatus setting up, thus, the setting up can be made efficient greatly. Further, when there is provided mechanism for correcting a warp of a print head in a unit, a yield of print heads is improved, which is more preferable.

With regard to the timing for unit replacement, it is so constituted that a pattern of an image causing the maximum emission time (the number of times) in ordinary image outputting is exposed to light, then the image obtained through processing is measured, and when a value of the measurement is not higher than the prescribed density value established in advance, signals for demanding the replacement are generated to request a user to replace.

Incidentally, in print heads respectively for green and blue, anode voltage is set to 23.5 V and grid voltage is set to 40 V with a reference of cathode voltage. When a ratio of voltage between anode and cathode to voltage between grid and cathode ranges from 0.3 to 0.7, it is possible to obtain an image having less density unevenness.

Though the mechanism wherein a photographic paper is brought into close contact with the circumferential surface of a drum to be conveyed and held is employed in the example mentioned above, it is possible to employ, as a method to hold a photographic paper, the method wherein the exposure surface of the photographic paper is pushed against a transparent member such as glass by a certain pressing means, and its preferable example will be explained on reference to FIGS. 31 and 32.

Figure 31:
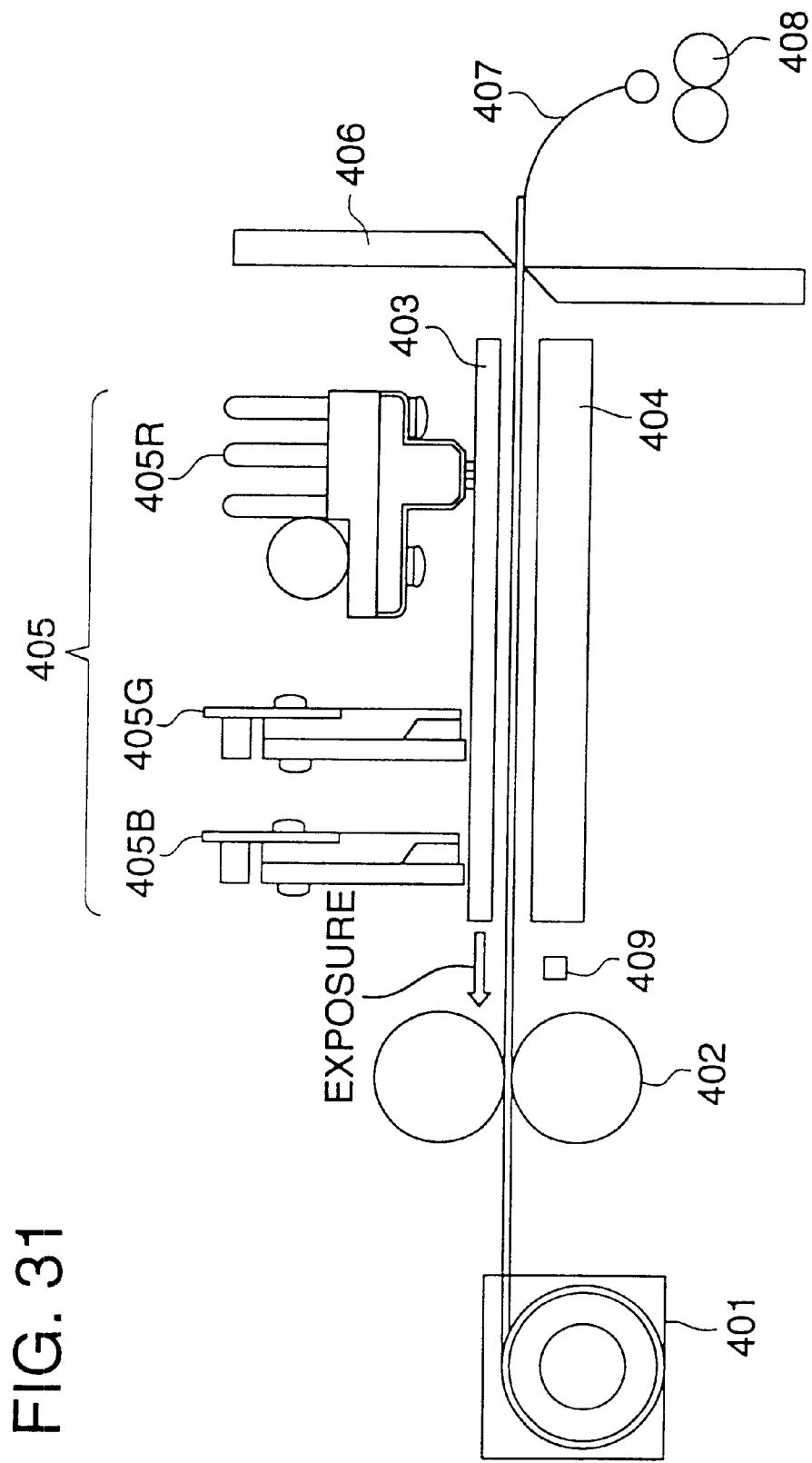
FIG. 31 is a diagram showing the structure for conveying a photographic paper.

In FIG. 31, a roll-shaped color photographic paper for photographic use is housed in magazine (paper cartridge) 401 which is loaded in the main body. A photographic paper housed in the magazine 401 can be conveyed by driving roller 402 toward an exposure section and can be pulled back from the exposure section to the magazine 401.

In the exposure section, when pressure plate 404 is moved upward from fixed glass 403 in FIG. 31, a photographic paper to be inserted into a gap between the glass 403 and the pressure plate 404 is brought into close contact with the lower surface of glass 403, whereby it is exposed to light by print head 405 composed of print head 405 R for red having therein LED array arranged at the upper part of the glass 403, print head 405 G for green having therein a vacuum fluorescent tube array and print head 405 B for blue.

On the downstream side of the exposure section, there is provided paper cutter 406, and an exposed portion cut by the paper cutter 406 after exposure is guided by flap plate 407 to conveyance roller 408, and then guided by the conveyance roller 408 to a developing unit where automatic developing is conducted.

Now, procedures for conveyance and exposure will be explained in detail, referring to FIG. 32.

(a) First, when the magazine 401 is loaded in the main body, a photographic paper is drawn out of the magazine 401 under the state wherein a gap formed between the glass 403 and the pressure plate 404 with the pressure plate 404 located at the standby position at the lower part in FIG. 32 is widened, and the forefront portion of the photographic paper which is not suitable for exposure is cut by the paper cutter 406.

(b) Then, the photographic paper whose forefront portion is positioned at the paper cutter 406 is returned by the driving roller 402 to the position where the tip of the photographic paper is detected by original point detection sensor 409 provided between the driving roller 402 and the exposure section.

(c) When a command for exposure is generated, the photographic paper is fed out for a described length by the driving roller so that exposure may be made beginning with a base end side of the photographic paper with the forefront portion of the photographic paper as an exposure end point.

(d) After the photographic paper is fed out by a prescribed length, exposure is made while returning the photographic paper gradually with the driving roller 402 under the state wherein the pressure plate 404 is moved upward and thereby the photographic paper is pressed against the glass 403.

(e) When the exposure is completed and the photographic paper is returned to the position where the forefront portion of the photographic paper is detected by the original point detection sensor 409, the pressure plate 404 is lowered and thereby the state of pressure contact is released.

(f) After the state of pressure contact is released, the photographic paper is conveyed by the driving roller 402, under the state wherein the flap plate 407 is lifted, so that a base end side of the exposed portion of the photographic paper may reach the paper cutter 406.

(g) After the conveyance is completed, the exposed portion is cut by the paper cutter 406, and the photographic paper thus cut is fed out toward a developing unit by conveyance roller 408 while being guided by the flap plate 407.

(h) After completion of cutting and conveyance, the photographic paper is returned to the standby position where the forefront portion of the photographic paper is detected by the original point detection sensor 409 to wait the command of exposure.

The arrangement mentioned above makes the photographic paper which once passed through the exposure section to be exposed to light while it is returned. It is therefore possible to expose a photographic paper to light while feeding it stably.

In the arrangement wherein the photographic paper is pressed against the glass plate 403, and only the photographic paper is conveyed, a force in the direction opposite to the conveyance direction for the photographic paper caused by kinetic friction is applied for sure on the gap between the photographic paper and glass and on the gap between the photographic paper and the pressure plate 404. In the case that a certain conveyance means which is in charge of conveying the photographic paper does not agree with glass in terms of position as in the aforesaid arrangement, when the photographic paper is returned toward the conveyance means, the direction of the conveyance force resisting the kinetic friction force and the direction of the kinetic force are opposite each other to pull the photographic paper each other, with regard to the conveyance of the photographic paper conducted by the conveyance means. A paper member such as a photographic paper tends to be flat when it is pulled from its both ends. Accordingly, conveyance that is relatively stable is possible even for the narrow gap such as that between glass 403 and pressure plate 404.

However, when the direction for conveying the photographic paper by the conveyance means is represented by the direction to push out from the conveyance means, the conveyance force and the kinetic friction force are in the directions to push the photographic paper from its both ends, and when the stiffness of the photographic paper can not resist that force, the photographic paper can not keep its flatness, resulting in curling. At the position of glass 403, the force to curl is applied in the direction perpendicular to the plane wherein the photographic paper is conveyed, resulting in the increased frictional force. Between the conveyance means and a glass position, it is not possible to convey unless a certain means to inhibit curling is provided.

However, providing a means to inhibit curling causes kinetic friction at the place of the means, which is disadvantageous. Therefore, it is difficult to convey stably. In particular, the photographic paper has its stiffness which is strong to a certain extent, and its kinetic friction force varies greatly depending on humidity. Accordingly, it is preferable that the direction for conveyance of the photographic paper in the course of exposure is the direction to return the photographic paper toward the conveyance means.

In aforesaid example, the number of glass plates used is only one. It is especially preferable that a common glass plate is used for plural print heads from the viewpoint of detection of jamming and others. However, it is also acceptable that each print head has its own transparent member.

Incidentally, though a cutter flap plate is located at the position shown in FIG. 32 in aforesaid example, it may naturally be located between a conveyance roller and glass.

Further, in the structure of the example mentioned above, a photographic paper is exposed to light while it is being conveyed in the form of a roll, and it is cut after exposure to be conveyed to a developing unit, which has a merit that paper dust produced in paper cutting is not carried over to an exposure section.

However, when a roll paper is cut after exposure, accurate cutting on a boundary portion of an image is difficult and an edge portion of a preceding or succeeding image is included accidentally, which requires belt-shaped cutting, resulting in a problem of waste of a photographic paper.

It is therefore possible to employ an arrangement wherein a roll-shaped photographic paper is first cut and then is exposed to light. In this arrangement, a photographic paper in necessary amount only is fed to an exposure section, and a preceding or succeeding image can not be protruded to be exposed to light, which is free from waste of a photographic paper and is sometimes advantageous.

Figure 48:
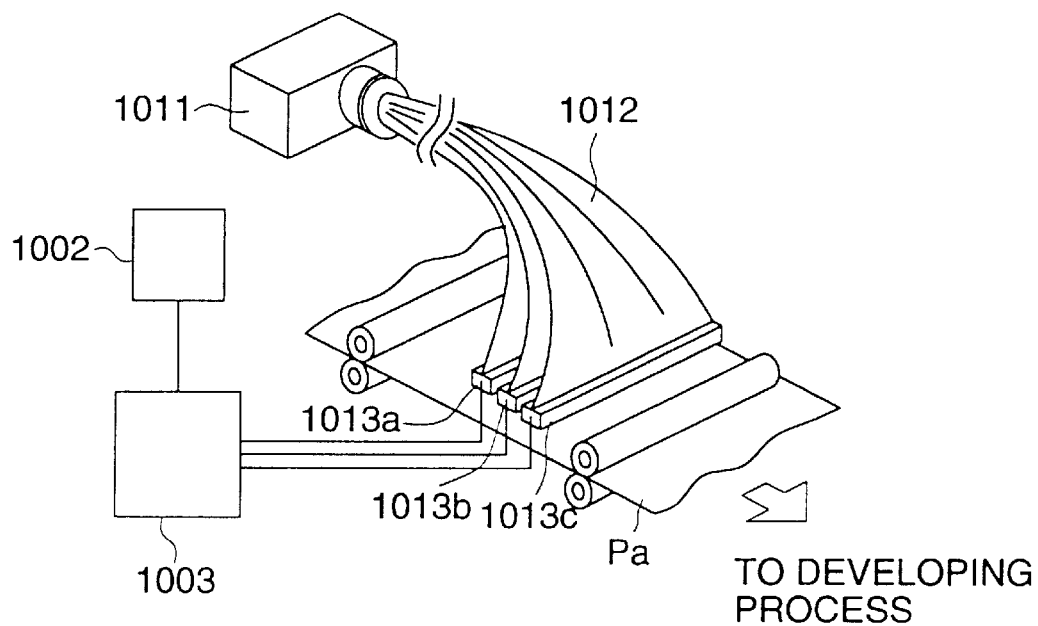
FIG. 48 is a perspective view showing another example of an exposure section where the correction between pixels is made.

Exposure by means of a drum shown in the first example is generally used in the case of conveyance of a cut sheet, while the second example is for a roll sheet. In the case of a roll sheet, two pairs of opposing rollers may be used as shown in FIG. 48. In addition, in a method wherein a photographic paper is held by a transparent member, it is possible to employ a method shown in FIG. 33 as a preferable example of conveyance of a cut sheet, as shown in the second example.

Figure 33:
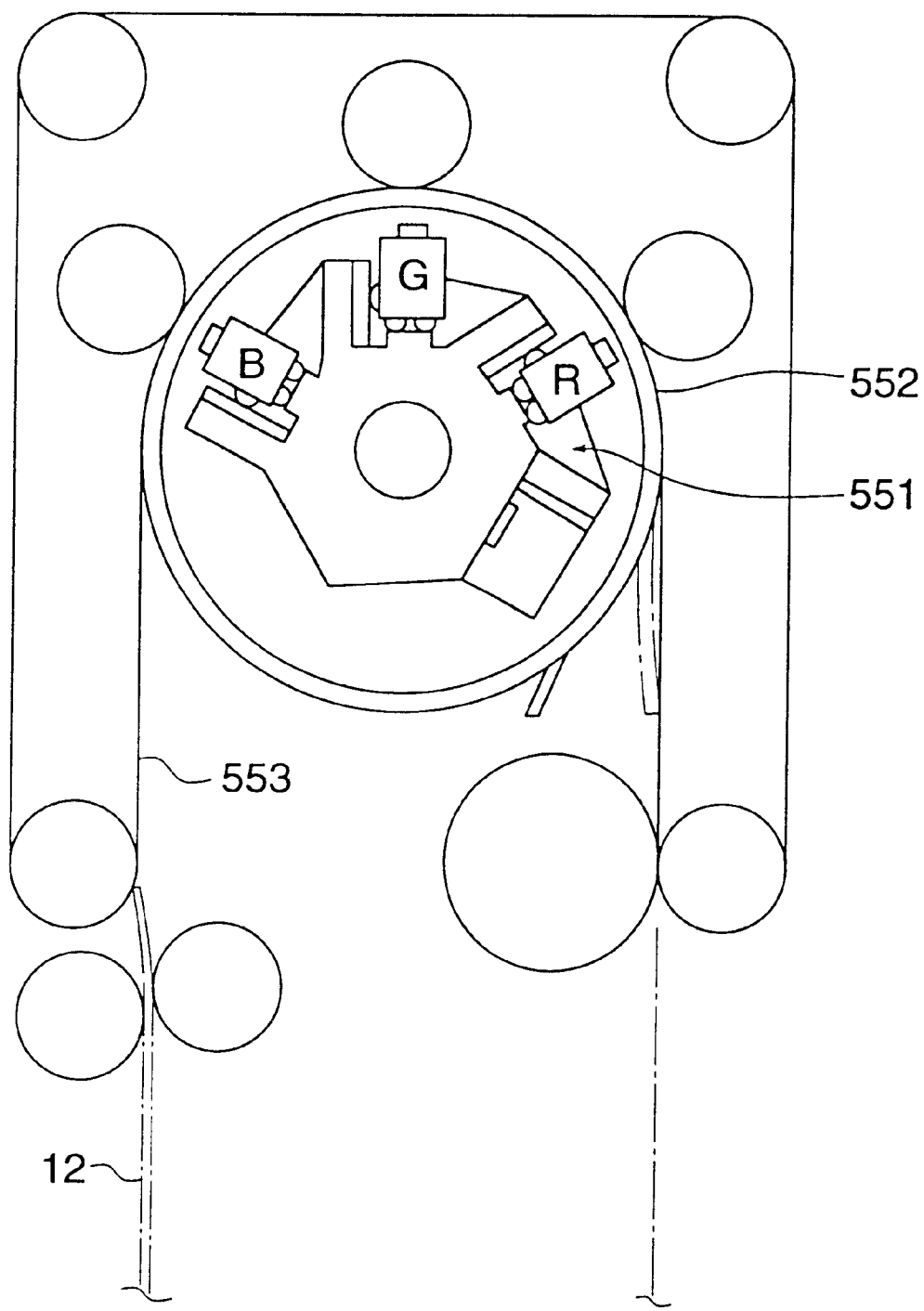
FIG. 33 is a diagram showing an exposure section where exposure is made from the inside of a drum.

In FIG. 33, print head 551 is arranged inside drum 552 to emit light outwardly for exposure. In that case, drum 552 is made of material transmitting light such as transparent resins like glass or acrylic fiber. Photographic paper 12 is held between the external surface of the drum 552 transmitting light and belt 553 without sleeve to be conveyed and exposed to light simultaneously. In that case, the drum 552 is preferable for conveyance of photographic paper 12. From the viewpoint of sure conveyance of photographic paper 12, it is further possible to use an arrangement wherein the belt 553 is moved at the same speed as that for the drum 552.

The following is another conveyance method for the occasion wherein a roll-shaped photographic paper is cut and then is exposed to light.

Figure 34:
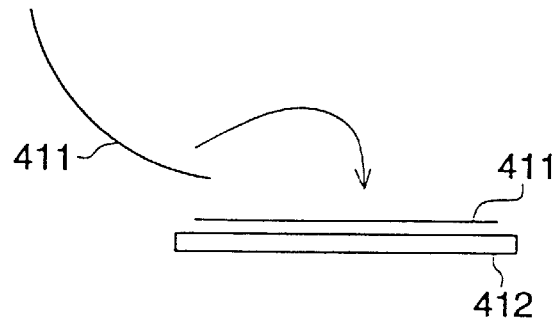
FIGS. 34 (a)–34 (c) represent a diagram showing another example of procedures of conveyance and exposure for a photographic paper.
Figure 34:
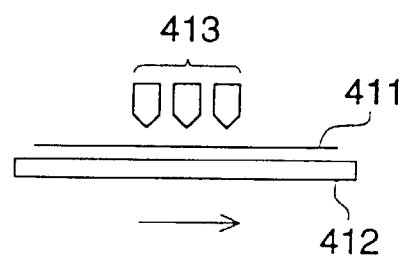
Figure 34:
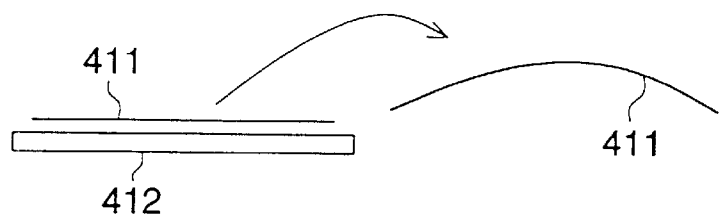

For example, as shown in FIG. 34, (a: holding) cut photographic paper 411 is fixed on holding stand 412 by various means including suction, and (b: exposure) recording element array 413 and holding stand 412 are moved relatively in the sub-scanning direction while making the recording element array 413 to conduct primary scanning for exposure so that two-dimensional exposure may be made. Then, (c: ejection) exposed photographic paper 411 is separated from the holding stand 412 to be carried over to the conveyance system for conveyance to a developing unit.

Figure 35:
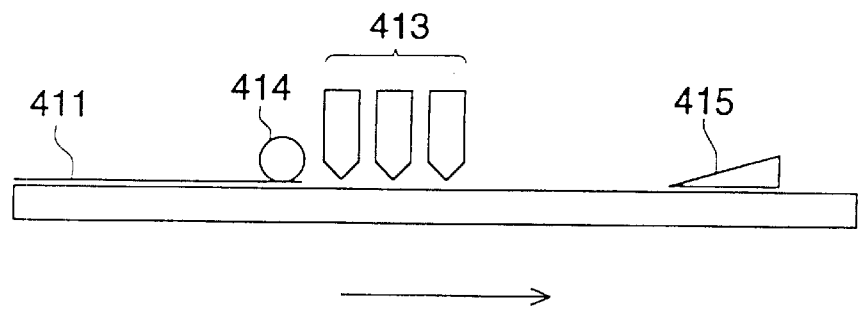
FIG. 35 is a diagram showing another example of procedures of conveyance and exposure for a photographic paper.

Further, it is also possible to employ the structure wherein cut photographic paper fed to holding stand 412 is pressed against the holding stand 412 by roller 414 as shown in FIG. 35, then, exposure by means of recording element array 413 is conducted in succession for the photographic paper in its close contact, and exposed portions are separated from the holding stand 412 in succession by separation claw 415 to be carried over to the conveyance system for conveyance to a developing unit.

When using the structure shown in FIG. 34, it is preferable that a portion at the holding stand 412 side is fixed and a portion at the recording element array 413 side is moved in the sub-scanning direction. In the structure shown in FIG. 36, photographic paper 411 is held to be in close contact with holding stand 412 by suction force of vacuum pump 416, and male screw 417 is extensively supported rotatably on the holding stand 412 in the sub-scanning direction. This male screw 417 is engaged with a female screw provided on unit 418 of recording element array 413 to form a feed screw (ball screw), and when the male screw 417 is rotated by motor 419, the unit 418 can be reciprocated in the sub-scanning direction.

Figure 36:
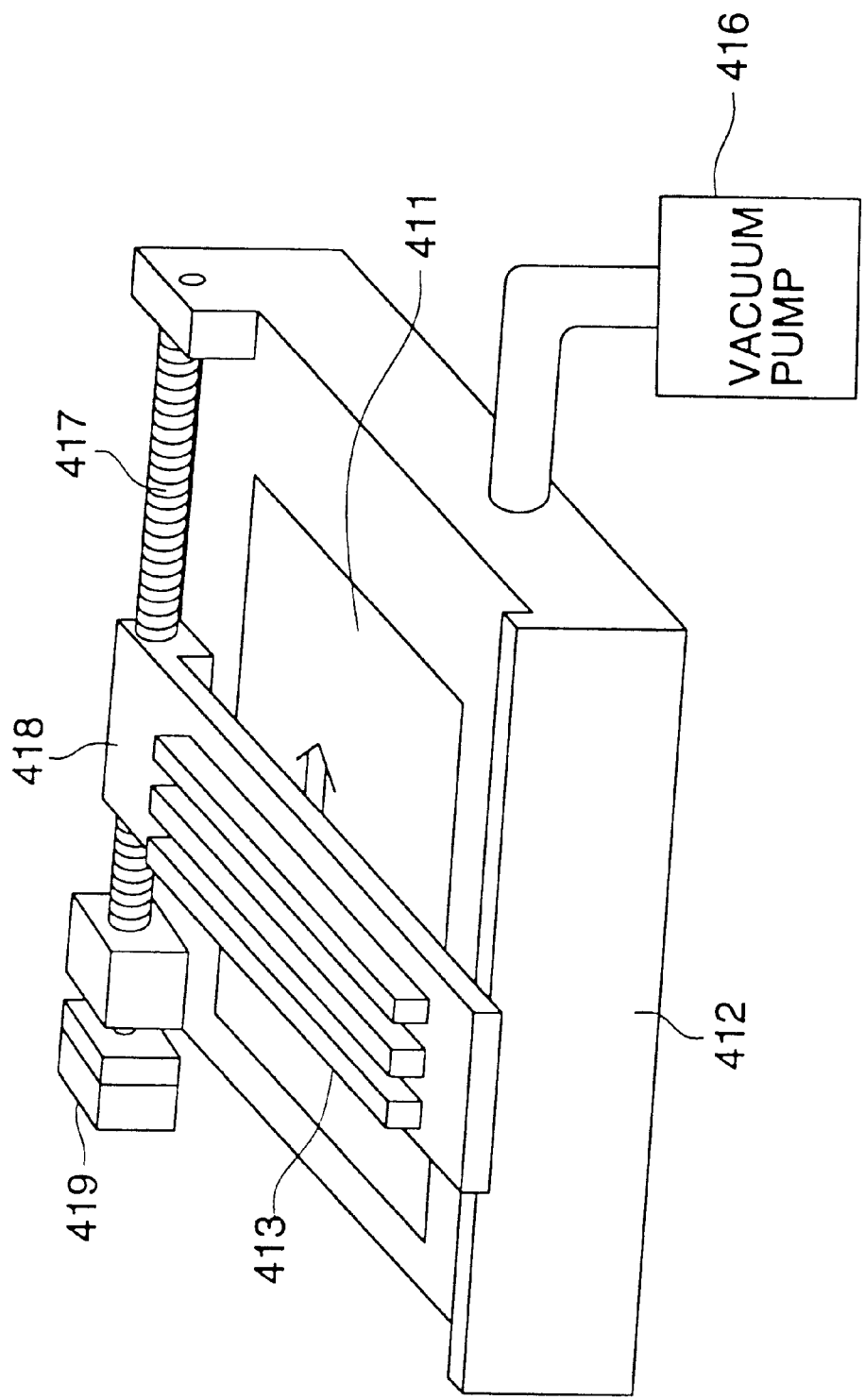
FIG. 36 is a perspective view showing the mechanism for moving an array unit.

In the structure shown in FIG. 36, a photographic paper is exposed to light while it is held to be close contact with holding stand 412. It is therefore relatively easy to keep a distance between a recording element array and the photographic paper, compared with an occasion wherein a photographic paper is exposed to light while it is being conveyed by a roller or a belt.

Figure 37:
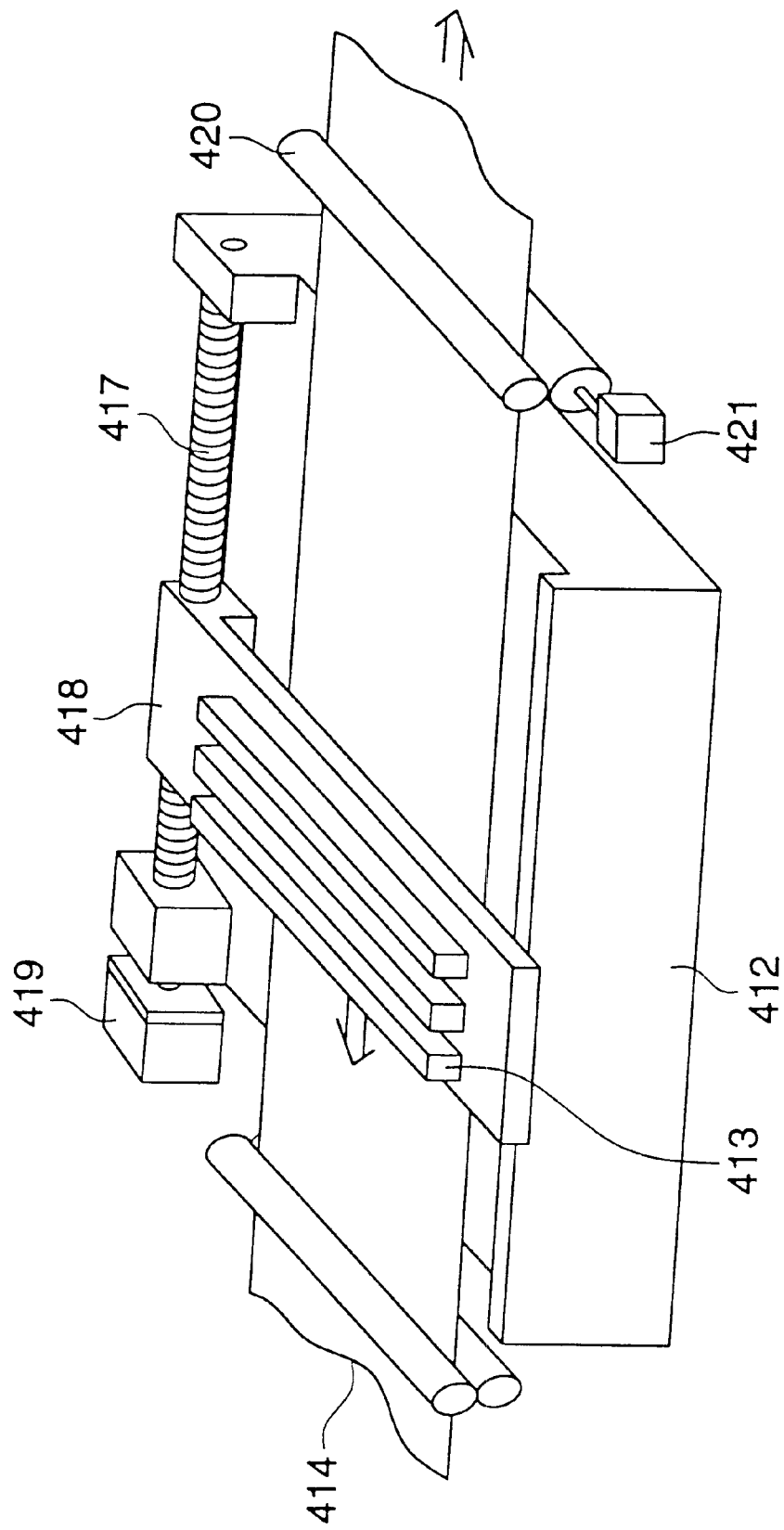
FIG. 37 is a perspective view showing the mechanism for moving both an array unit and a photographic paper.

As stated above, when keeping a distance between a recording element array and a photographic paper constant, it is preferable that the photographic paper is fixed to be exposed to light. When array unit 418 is moved in the direction opposite to the conveyance direction for the photographic paper in the structure shown in FIG. 36 while conveying a continuous sheet by pulling it with driving roller 420 driven by motor 421 as shown in FIG. 37, it is possible to shorten the exposure time per one image.

In the structure of the foregoing, a recording element array and a photographic paper are moved relatively in the direction perpendicular to the longitudinal direction of the recording element array, namely to the primary scanning direction, and an arrangement to move the recording element array, an arrangement to move the photographic paper, and an arrangement to move the recording element array and the photographic paper are shown. However, for example, it is also possible to employ an arrangement wherein the conveyance direction for the photographic paper and the longitudinal direction of the recording element array cross obliquely each other in the structure to expose the photographic paper to light while conveying it, or an arrangement wherein the conveyance direction for the photographic paper and the longitudinal direction of the recording element array are made to be in parallel with each other and the recording element array is caused to expose while it is moving in the direction perpendicular to its longitudinal direction, or an arrangement wherein the recording element array and the photographic paper are moved relatively in the longitudinal direction of the recording element array. Further, the structure can be of a type wherein a photographic paper is fed to or ejected from a holding stand in the direction different from the direction of relative movement of the recording element array and the photographic paper in the course of exposure in the structure wherein the photographic paper is held on the holding stand to be exposed to light.

Figure 38:
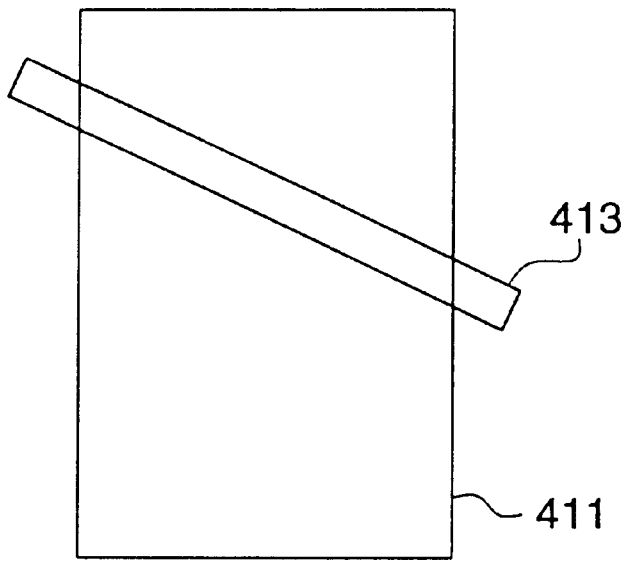
FIGS. 38 (a) and 38 (b) represent a diagram showing that an array unit is arranged obliquely on a photographic paper.
Figure 38:
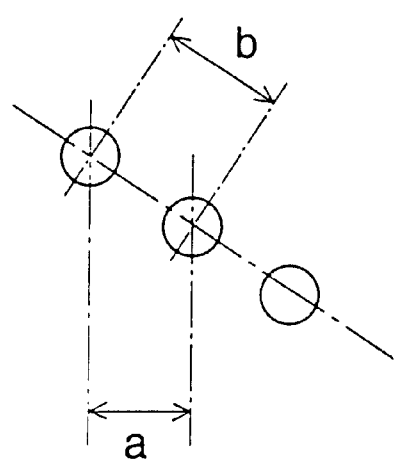

For example, if the structure is made to be of a type wherein a photographic paper is exposed to light while it is being conveyed obliquely for the longitudinal direction of a recording element array as shown in FIG. 38, pixel interval a in the direction perpendicular to the conveyance direction for the photographic paper is shorter than pixel interval b in the longitudinal direction of the recording element array, and the number of recording pixels per a unit length in the direction perpendicular to the conveyance direction for the photographic paper is increased.

Figure 39:
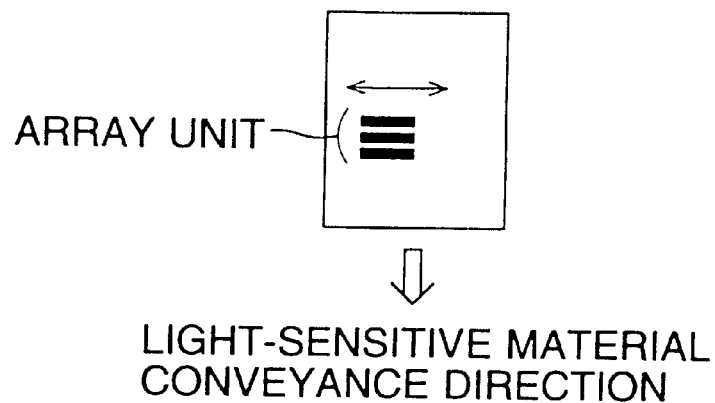
FIGS. 39 (a) and 39 (b) represent a perspective view showing the mechanism for moving an array unit in the direction of a row of elements.
Figure 39:
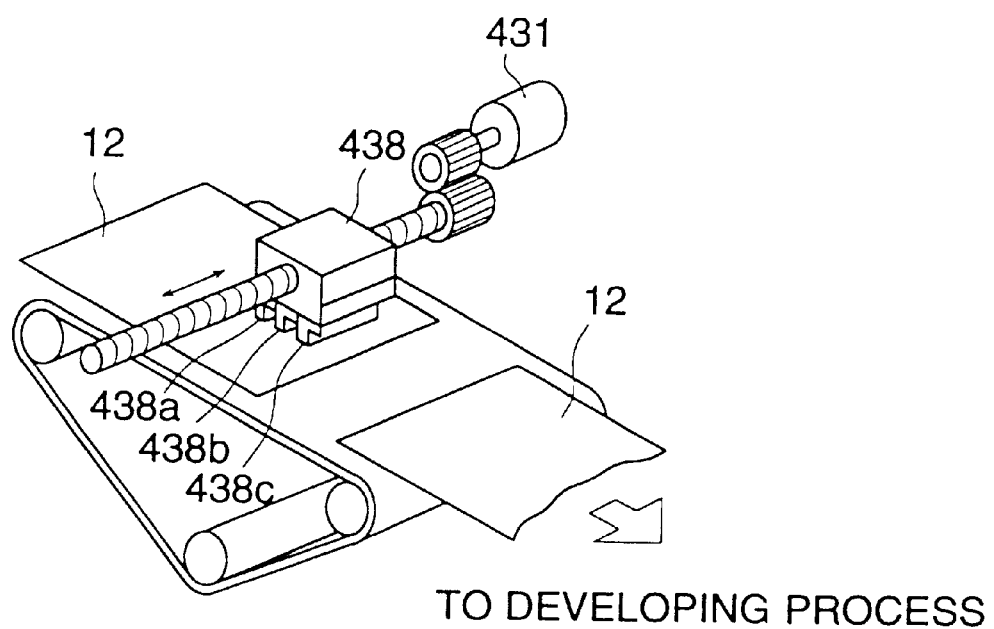

Further, if the recording element array is made to conduct exposure while it is moving in its longitudinal direction in the structure wherein a photographic paper is exposed to light while it is being conveyed in the direction perpendicular to the longitudinal direction of the recording element array as shown in FIG. 39, an array that is shorter in length can expose a large-sized photographic paper to light, and it is possible to double the recording density by moving the recording element array in the longitudinal direction by a half of the pixel interval.

In the structure shown in FIG. 39, it is possible to expose the total width of wide photographic paper 12 to light with small width recording heads 438a, 438b and 438c by moving, in lateral direction, head carrier 438 equipped with small width recording heads 438a, 438b and 438c respectively for red, green and blue with conveyance screw 435 driven by motor 431.

It is also possible to cause a recording element array to conduct exposure while it is moving in the direction perpendicular to its longitudinal direction in the structure wherein a photographic paper is exposed to light while it is being conveyed in the direction that is in parallel with the longitudinal direction of the recording element array as shown in FIG. 40.

In this case again, an array that is shorter in length can expose a large-sized photographic paper to light, which is advantageous.

If a range and a direction of the movement of a recording element array are made to be variable depending on image data, various advantages including reduction of exposure time can be brought on.

Figure 41:
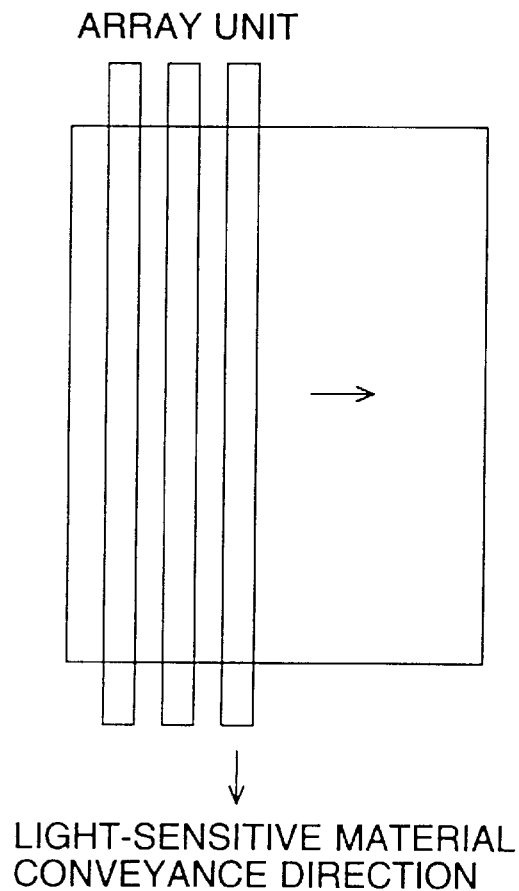
FIG. 41 is a diagram showing an example of recording operations in the mechanism wherein the direction for conveying a photographic paper is in parallel with the direction of a row of array unit elements.

Further, in the exposure system shown in FIG. 40, when a length in the longitudinal direction of a recording element array is greater than that of a photographic paper in the conveyance direction for it as shown in FIG. 41, it is possible to complete exposure in a short period of time while conveying the photographic paper stably. Namely, it is advantageous from the viewpoint of stability that a photographic paper is conveyed in its longitudinal direction, and if sub-scanning is conducted in the lateral direction of the photographic paper, the exposure time can be shortened, thus the structure wherein a length of a recording element array in its longitudinal direction is greater than that of a photographic paper in the conveyance direction therefor in the structure shown in FIG. 40 is also acceptable.

Figure 42:
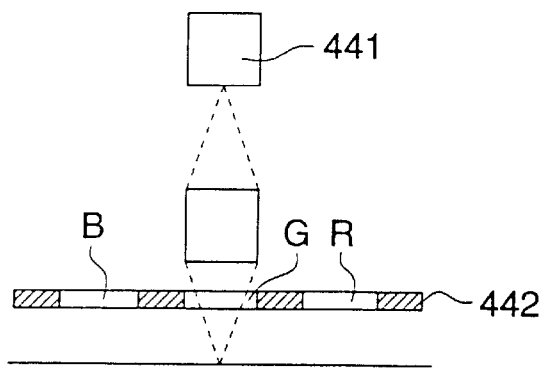
FIG. 42 is a diagram showing the mechanism for inserting a filter selectively into an optical path of a white light source array.

Though recording element arrays respectively for the three primary colors are provided in the foregoing structure, it is possible to make the structure to be of a type wherein filters 442 respectively for three colors are selectively put on an optical path of white light source array 441 as shown in FIG. 42 and exposure for a color image is conducted by replacing the filter 442. In this structure, only one recording element array is enough, and thereby an apparatus which is low in cost and small in size can be offered, and positional adjustment for parallelism and intervals of arrays which is needed in the case of using plural recording element arrays is not required.

Figure 43:
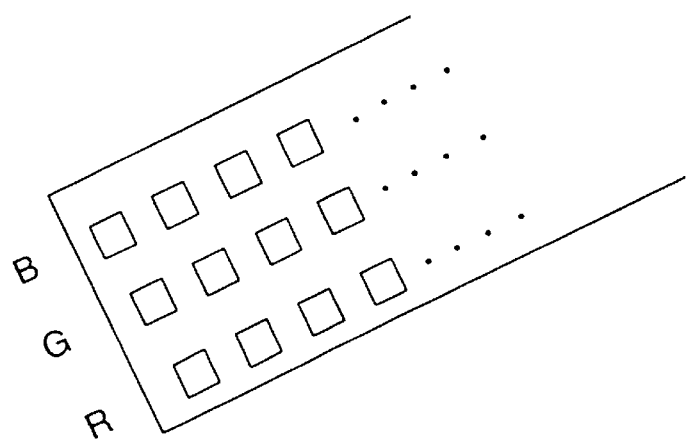
FIG. 43 is a diagram showing a print head of a B/G/R integral type.
Figure 44:
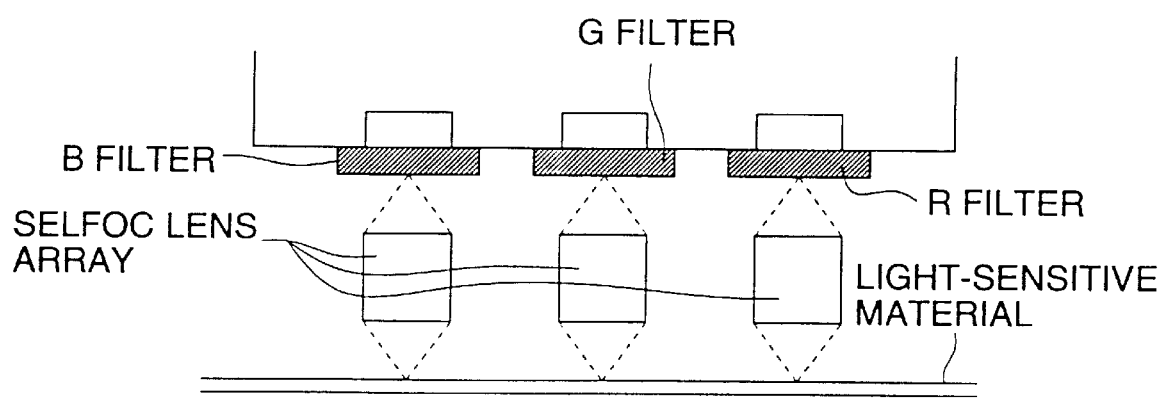
FIG. 44 is a diagram showing a print head of a B/G/R integral type.

When an array wherein all recording elements are integrated solidly as a device as shown in FIGS. 43 and 44 is used, an interval of a recording element array can be shortened to the utmost, and whereby an apparatus can be made small and an exposure interval can be shortened, resulting in a small capacity for storage of image data and a short exposure time, which is preferable.

Figure 45:
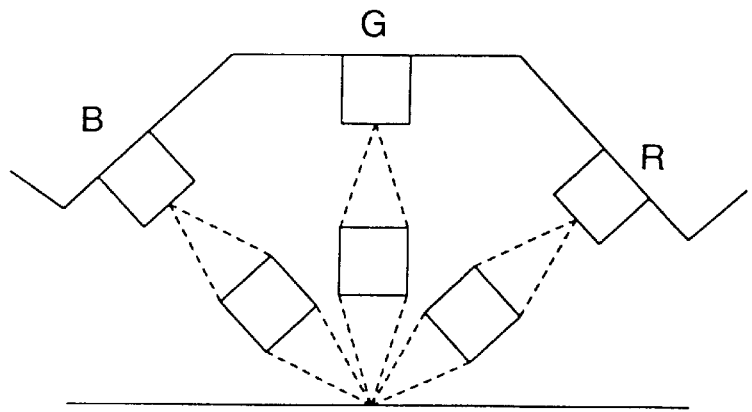
FIG. 45 is a diagram showing an example of the mechanism wherein the same line is exposed to light by means of a 3-color light source array provided integrally.
Figure 46:
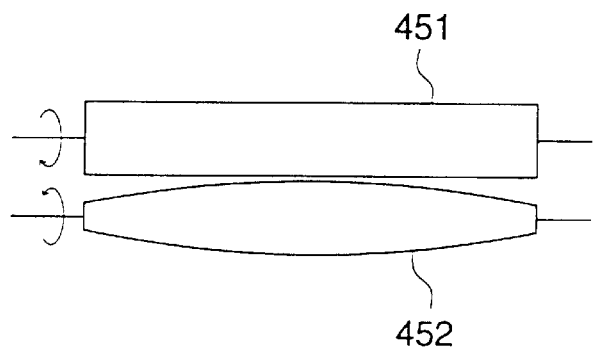
FIG. 46 is a diagram showing the structure for giving curling characteristics to a photographic paper.

When an exposure point for each array is made to be the same in the structure as shown in FIG. 45, a portion exposed by a certain array does not need to be adjusted accurately in terms of position to the exposure portion for the following array to be conveyed. Therefore, conveyance control in the sub-scanning direction is simple, and occurrence of color-doubling caused by fluctuation in conveyance can be prevented, which is preferable.

When a holding stand is flat, it is preferable that a photographic paper is not curled. When a drum or the like is used, however, if a photographic paper having curling characteristics matching the curvature direction of the drum is used, the photographic paper can be held and conveyed properly. For example, when a photographic paper is held on the outer circumferential surface of the drum to be exposed from the outside, it is preferable to use an emulsion-side-out winding roll sheet whose emulsion layer faces outside, while when a photographic paper is held on the outer circumferential surface of the drum to be exposed from the inside, it is preferable to use an emulsion-side-in winding roll sheet.

Further, the structure for giving curling characteristics positively to a photographic paper is acceptable, and if a photographic paper is interposed between roller 451 having a constant diameter and relatively low hardness and roller 452 having a diameter growing toward the center portion and a relatively high hardness to be conveyed in a manner that a central portion of the photographic paper is depressed to the roller 451 side, curling characteristics to roll the photographic paper in the roller 452 side can be given to the photographic paper.

Further, it is possible to give a photographic paper the curling characteristics which roll a photographic paper in its side where no emulsion is coated by passing the photographic paper through a humidifying section where humidity is high. It is further possible to give curling characteristics in the opposite direction by passing the photographic paper through a drying section.

Though an LED array is used as a red light source and VFPH is used as a green light source and a blue light source in the foregoing, an arrangement to use an LED array for all of a red light source, a green light source and a blue light source is also acceptable.

Figure 47:
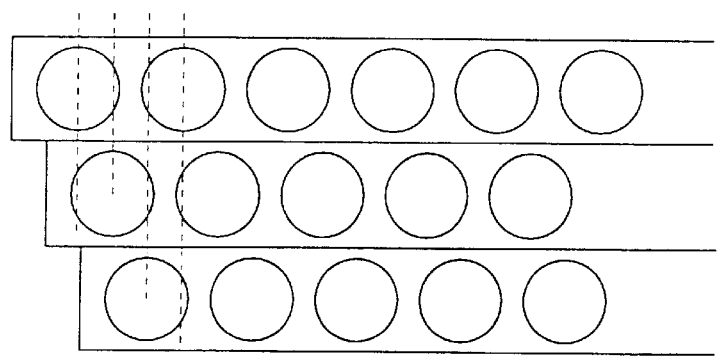
FIG. 47 is a diagram showing the structure for enhancing the resolution by combination of plural array units.

Using an LED array as light sources for all colors makes a light source to be durable and stable, and stable exposure capacity can be obtained, which is preferable. In some cases, however, an LED array as a green light source and a blue light source has only the capacity of 100 dpi when an LED array as a red light source has the capacity of 300 dpi, for example. If three LED arrays are arranged on a staggered basis with an interval of ⅓ pixels for each of the green light source and the blue light source as shown in FIG. 47 in this case, exposure equivalent to 300 dpi which is the same as that of the LED array of the red light source can be conducted, which is preferable.

Here, since deterioration of image quality is relatively less even when the resolution is relatively low in the case of blue, if three LED arrays each being 100 dpi are arranged to be staggered as stated above as the green light source and one LED array of 100 dpi. is used as the blue light source when an LED array of 300 dpi. is used as the red light source in an arrangement, the arrangement is preferable with less arrays without deteriorating image quality, employing only stable LED arrays.

Further, it is possible to use VFPH of 300 dpi in place of ensuring resolution equivalent to that of the LED array of the red light source by using plural LED arrays in the green light source, and to combine 300 dpi LED array of the red light source and a 100 dpi LED array of the blue light source.

Further, when employing the structure wherein a recording element array for black is provided in addition to the array arrangement in which resolution is lowered for only B, a problem of yellow blurring caused in the case where black characters are outputted with B, G and R light sources can be solved by recording characters with a recording element array for black, which is preferable.

As the recording element array for black, it is possible to use an array which is a light source having a wavelength at B, G and R sensitivity areas of a photographic paper and is capable of outputting black (gray) by using a filter. It is also possible to employ the structure wherein an infrared light-sensitive layer color-forming to be black is provided and an LED array having light emission primary wavelength at 780 nm, for example, is used for exposure of aforesaid light-sensitive layer as the recording element array for black.

For example, black components (black characters, under color removal in printing) are prepared from image signals of R, G and B in the following method to be outputted to a recording element array for black in the structure, and when characters are recognized to be neutral (achromatic color), signals are made unconditionally to be coloring signals only for black.

R: 255, G: 255, B: 255→K: 255, R: 0, G: 0, B: 0
R: 40, G: 40, B: 40→K: 40, R: 0, G: 0, B: 0
R: 230, G: 120, B: 130→K: 120, R: 110, G: 0, B: 10
or→K: 100, R: 130, G: 20, B: 30

Incidentally, a method for preparing black components from image signals of R, G and B is not limited to the foregoing, and various methods can be used.

In the structure wherein a light source having a wavelength at B, G and R sensitivity areas is used as a recording element array for black as stated above, it is possible to prevent occurrence of color-doubling caused by fluctuation of exposure positions of a red light source, a green light source and a blue light source, and thereby to reproduce black characters which require high resolution at high quality without any color-doubling. In the structure introducing therein a black coloring layer, it is possible to easily reproduce, as black, the black characters which have made it very difficult to keep coloring balance for cyan, magenta and yellow, and it is possible to obtain images with total sharp density even when the coloring density for each of cyan, magenta and yellow is low.

Though the structure wherein a black coloring layer is an infrared light-sensitive material is shown in the foregoing, the structure wherein an infrared light-sensitive material is for all coloring layers for R, G and B is also acceptable, and a light-sensitive material with the following structure, for example, can be used.

660 primary wavelength→yellow coloring layer
720 primary wavelength→magenta coloring layer
780 primary wavelength→cyan coloring layer In the case of the light-sensitive material mentioned above, it is possible to use an LED array having a long life as a recording element array for three colors, and in the case of the LED ray, it is easy to manufacture a long array, and when manufacturing an apparatus with large size output, it is possible to lessen complicated staggered arrangement.

Incidentally, it is apparent that the correlation between the primary wavelength of a light source for exposure for infrared area and a coloring layer is not limited to the foregoing, and it is possible to allot 720 nm primary wavelength to yellow, and allot 660 nm and 780 nm respectively to magenta and cyan in the structure, for example.

Next, there will be explained an example of controlling the exposure time, namely the driving pulse width of each light-element in gradation control with combination of plural exposures for each pixel data. Gradation control (including non-driving) of m1×m2 x . . . x mn=M steps is expressed by the following driving control of n times;

Pulse width driving of unit length t1, m1 step (including non-driving)

[0, t1, 2t1, . . . , (m1−1) t1]

Pulse width driving of unit length t2=t1×m2, m2 step (including non-driving)

[0, t2, 2t2, . . . , (m2−1) t2]

Pulse width driving of unit length tn=tn−1×mn, mn step (including non-driving)

[0, tn, 2tn, . . . , (mn−1) tn] provided that the following relation is satisfied.

(mn−1) M/mn<maximum value of image data<M

Driving pulse width in the aforesaid driving control of n times for image data x is the following whose order is free.

$$(x \bmod m1)t1 | (x \bmod m1\ m2) - (x \bmod m1)|t1 =$$

$$([x/m1] \bmod m2)t2 | (x \bmod m1\ m2\ m3) - (x \bmod m1\ m2)|t1 =$$

$$([x/m1\ m2] \bmod m3)t3 \ldots$$

$$|(x \bmod m1\ m2 \ldots mn) - (x \bmod m1\ m2 \ldots mn - 1)|t1 =$$

$$([x/m1\ m2 \ldots mn - 1] \bmod mn)tn$$

In this case, [a] represents the maximum positive number which does not exceed "a". Incidentally, an adjustment width in a range of ±10% of the period of time of driving or ±5% of m1 x m2 x . . . x mn x t1, whichever greater, is allowed for a period of time of one driving.

Owing to the control system mentioned above, multi-step gradation recording control is possible through repetition of several times of gradation recording step controls in a small number, and multi-step gradation recording control is possible through external control in the recording system where the number of gradations is limited.

Incidentally, in the example mentioned above, driving intensity is constant, and only a length of driving time is controlled. However, the same effect can be obtained even by making "driving effect" to be the aforesaid rate by controlling the driving intensity with aforesaid rate or by controlling both the driving intensity and driving time.

More preferably, m1=. . . can be taken out of binary data of each pixel through m1=m2=. . . mn=2k.

More preferably, it is easy, through m1=m2=. . . mn=2, to apply to the recording system which accepts only binary driving that is most common.

Further, when the gradation step is represented by M=m1 x m2 x . . . x mn>256, the maximum value of a difference of recording density between levels can not be discriminated by human eyes, thus smooth and continuous gradation recording is possible.

As shown in the example stated above, smooth gradation image recording was realized in an LED array print head of binary control, with m=4096 under 12 bits of m1=m2=. . . m12=2.

Further, in the control system mentioned above, it is preferable that aforesaid minimum unit length t1 is in a range from 10 nano sec to 10 micro sec. This is based on the following. When t1 is less than 10 nano sec, an influence of the reciprocity law failure is remarkable on a recording medium, and thereby an exposure effect per unit time in its pulse driving is small. While, when t1 is greater than 10 micro sec, an exposure effect by the minimum unit is too great, resulting in big difference in density at one level, which generates discontinuity in gradation expression. Examples will be shown below.

Let it be assumed that t1=100 nano sec in LED (R light source), and t1=375 nano sec in VFPH (B, G light sources).

By setting like this, it was possible to record color images whose gradation characteristics are smooth.

In the present control system, when W represents the radiant flux at an image forming position per one element, and e represents a scanning pixel interval, it is preferable that a value of WMt1/e, namely the maximum exposure amount per pixel is established as follows.

R light source 0.05–10 microjoule/meter

G light source 0.01–2 microjoule/meter

B light source 0.005–1 microjoule/meter

Incidentally, a color silver halide material is used as a recording medium.

Further, it is preferable that a value of Mt1/e is set as follows.

R light source 0.1–20 sec/meter

G light source 1–200 sec/meter

B light source 0.5–100 sec/meter

Namely, when the aforesaid value is less than the lower limit value of each range mentioned above, it is not possible to enhance the maximum density fully even when the driving is conducted with the maximum pulse width data, while when the value is greater than the upper limit value of each range, remarkable blurring is caused when the driving is conducted with the maximum pulse width data. Therefore, setting the value within the aforesaid ranges makes it possible to enhance the maximum density fully and to prevent occurrence of blurring. Examples are shown below. In the following recording conditions;

R light source LED array (approx. 600 nW/dot)

G light source VFPH (approx. 40 nW/dot)+Y filter (transmission factor approx. 33%)

B light source VFPH (approx. 40 nW/dot)+B filter (transmission factor approx. 28%)

Recording density in sub-scanning direction 300 lines/inch (approx. 84.7 micrometer/line)

Recording density in primary scanning direction 30 millimeter/sec (approx. 2.8 millisecond/line)

with M=4096, t1=100 nano sec at R light source (Mt1/e 4.84 sec/meter, WMt1/e 2.90 microjoule/meter)

t1=375 nano sec at G light source (Mt1/e 18.1 sec/meter, WMt1/e 0.239 1microjoule/meter)

t1=375 nano sec at B light source (Mt1/e 18.1 sec/meter, WMt1/e 0.203 microjoule/meter)

By setting each value as stated above, sufficient density values were obtained at the maximum density area, and it was possible to output natural images with less blurring.

Figure 49:
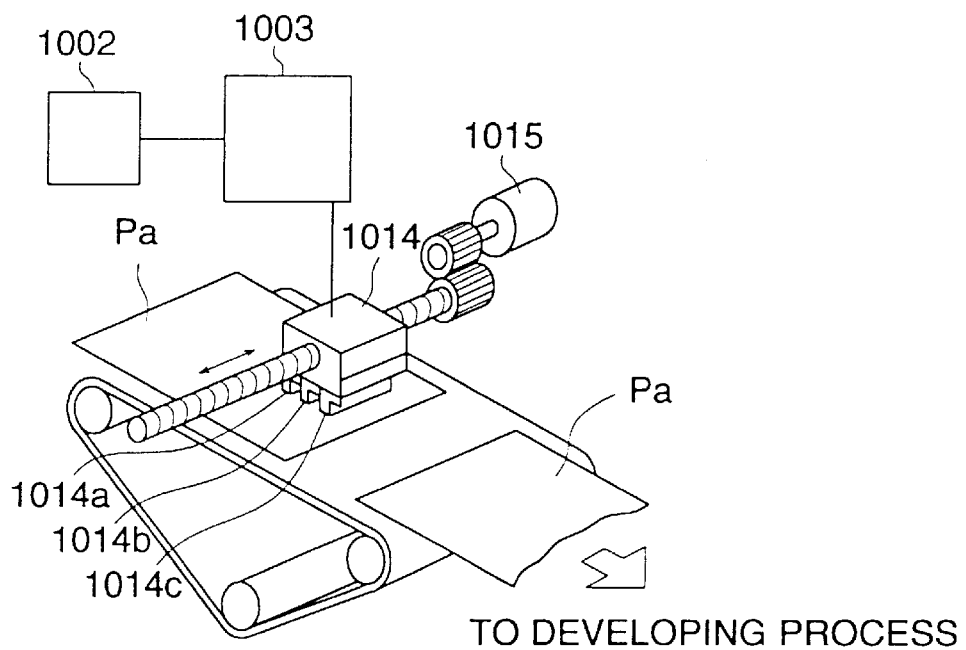
FIG. 49 is a perspective view showing another example of an exposure section where the correction between pixels is made.

FIGS. 48 and 49 show other examples of an image forming apparatus employing the correcting method mentioned above. Among them, an apparatus in FIG. 48 is one for obtaining the same effect wherein light of a single white light source 1011 is divided by optical fiber 1012 and is respectively guided to each of PLZT recording heads 1013*a*, 1013*b* and 1013*c* being equipped with a color filter, and thereby photographic paper Pa that is a silver halide light-sensitive material conveyed by a pressing conveyance roller is subjected by the recording heads 1013a, 1013b and 1013c to the exposure which is the same as that by recording heads 130a, 130b and 130c for red, green and blue of the above-mentioned image forming apparatus. Therefore, correction for each recording element is conducted for each element of PLZT recording heads 1013a, 1013b and 1013c.

An apparatus in FIG. 9 is one wherein exposure to be made for the entire width of wide photographic paper Pa by small-width recording heads 1014a, 1014b and 1014c is conducted by moving head carrier 1014 equipped with small-width recording heads for red, green and blue 1014a (structured with LED array), 1014B (structured with VFPH and Y filter) and 1014c (structured with VFPH and B filter) laterally with conveyance screw 1016 driven by motor 1015, and whereby images with high image quality which are the same as those formed by the image forming apparatus in FIG. 11 or FIG. 48 are formed. Therefore, correction for each recording element is either conducted for each recording element of small-width recording heads 1014a, 1014b and 1014c regardless of a position of head carrier 1014, in the same way as that for each recording element of recording heads 130a, 130b and 130c in FIG. 11, or conducted after obtaining a correction amount depending on a position of head carrier 1014 so that the correction may vary in accordance with a position of head carrier 1014.

On the other hand, it is possible to expand a color reproduction area by using four colors by adding K to R, G and B, and thereby to reproduce deep colors.

When making prints in a black and white mode, it is possible to provide a special head exclusively for black (gray) and to use a recording head (preferably adjusted by a filter) having a wavelength matching a light-sensitive material to be used as a special recording head other than that for R, G and B, thus excellent images with high reproducibility can be obtained, which is preferable.

Now, available combination of light sources for recording heads will be enumerated. With regard to R, G and B, in addition to a combination of an LED recording head for R and VFPH recording head for G and B, a combination of LED recording heads for all of R, G and B, a combination of VFPH recording heads for all of R, G and B, a combination of LED recording heads for two and a VFPH recording head for one, and a combination of LED recording heads for all of R, G and B are available.

In addition, any number of any recording head wherein plural recording elements are provided and each recording element can be turned on and off independently, such as PLZT recording head employing an appropriate backlight, an optical shutter array such as a liquid crystal shutter array, and a laser array recording head wherein semiconductor arrays are arranged in a shape of an array, can be used.

What is claimed is:

1. An apparatus for recording an image based on digital image signals onto an image recording medium and for cutting the image recording medium into a requested print size, comprising:

first input means for inputting print request information including at least one of print size, a number of prints and printing order;

second input means for inputting the digital image signals;

calculating means for determining layout of the image on the image recording medium on the basis of the print request information and the digital image signals;

recording means for recording the image based on the digital image signals in accordance with the layout on the image recording medium;

cutting means for cutting the image recording medium;

conveying means for conveying the image recording medium to the cutting means;

the calculating means calculating cutting sizes on the basis of the layout and outputting X-direction-cutting information to cut the image recording medium in X-direction perpendicular to the conveying direction of the conveying means and Y-direction-cutting information to cut the image recording medium in Y-direction perpendicular to the X-direction; and the cutting means comprising a X-direction cutter to cut the image recording medium in the X-direction in accordance with the X-direction-cutting information, and a Y-direction cutter to cut the image recording medium in the Y-direction in accordance with the Y-direction-cutting information.

2. The apparatus of claim 1, further comprising processing means for outputting image recording data based on the digital image signals and the layout of the image, wherein the recording means records the image based on the image recording data.

3. The apparatus of claim 2, wherein the image recording medium is a silver halide light-sensitive material, the image recording data are imagewise exposure data base on which the recording means imagewise exposes the silverhalide light-sensitive material, and wherein the recording means comprises exposure means for imagewise exposing the silverhalide light-sensitive material based on the exposure data and development processing means for developing and processing the exposed silverhalide light-sensitive material.

4. The apparatus of claim 3, wherein the conveying means conveys the image recording medium from the development processing means to the cutting means.

5. The apparatus of claim 4, wherein the exposure means comprises a print head having an array in which a plurality of recording elements are aligned.

6. The apparatus of claim 5, wherein a plurality of images are arranged on the silver halide light-sensitive material in the aligned direction of the plurality of recording elements in accordance with the layout.

7. The apparatus of claim 1, wherein the cutting means comprises a X-direction cutting controller to control the X-direction cutter and a Y-direction cutting controller to control the Y-direction cutter.

8. The apparatus of claim 7, wherein the X-direction cutting controller and the Y-direction cutting controller act as the calculating means.

9. The apparatus of claim 1, wherein the conveying means conveys the image recording medium from the recording means to the cutting means.

10. The apparatus of claim 1, wherein the calculating means calculates layout of the image on the image recording medium on the basis of the print request information and the digital image signals.

11. The apparatus of claim 1, wherein the conveying means comprises a conveying direction changing means for changing the conveying direction from a first direction to a second direction perpendicular to the first direction after the recording medium is cut in one of the X-direction and the Y-direction.

12. The apparatus of claim 1, wherein the X-direction cutter and the Y-direction cutter are combined in a box-shaped punching cutter having fixed-cutting sizes.

13. The apparatus of claim 1, wherein the Y-direction cutter comprises a slit blade capable of shifting in a direction perpendicular to the conveying direction of the conveying means in accordance with the Y-direction-cutting information and capable of cutting the image recording medium at a requested Y-cutting position.

14. The apparatus of claim 1, wherein the X-direction cutter acts as the Y-direction cutter.

15. An apparatus for recording an image in an image frame on a silver halide light sensitive material by exposing the silver halide light sensitive material in a primary scanning direction on the basis of digital image data and by conveying the silver halide light sensitive material in a secondary scanning direction, comprising:

first inputting means for inputting print request information including at least one of a print size and a number of prints;

second inputting means for inputting the digital image data;

calculating means for determining a layout of plural image frames along the primary scanning direction in accordance with the print request information;

exposing means for exposing the silver halide light sensitive material in the primary scanning direction in accordance with the determined layout on the basis of the digital image data so that plural images are formed on the plural image frames arranged along the primary scanning direction on the silver halide light sensitive material;

conveying means for conveying the silver halide light sensitive material relative to the exposing means in the secondary scanning direction; and cutting means for cutting the silver halide light sensitive material in accordance with the determined layout.

16. The apparatus of claim 15, wherein the exposing means comprises plural recording elements arranged to form an exposing array in the primary scanning direction.

17. The apparatus of claim 16, wherein the exposing means comprises the exposing array for each color of red, blue and green.

18. The apparatus of claim 15, wherein the calculating means has a magnification changing expression to change the number of pixels in the lateral and longitudinal direction on the image frame.

* * * * *

UNITED STATES PATENT AND TRADEMARK OFFICE
CERTIFICATE OF CORRECTION

PATENT NO.: 6,072,596
DATED: June 6, 2000
INVENTORS: Tuyoshi HATTORI et al.

It is certified that an error appears in the above-identified patent and that said Letters Patent is hereby corrected as shown below:

Claim 3, Column 38, line 26, "silverhalide" should read --silver halide--.

Claim 3, Column 38, line 29, "silverhalide" should read --silver halide--.

Claim 3, Column 38, line 31, "silverhalide" should read --silver halide--.

Signed and Sealed this

Seventeenth Day of April, 2001

*Attest:*

NICHOLAS P. GODICI

*Attesting Officer*      *Acting Director of the United States Patent and Trademark Office*